United States Patent [19]
Snow et al.

[11] Patent Number: 6,089,892
[45] Date of Patent: Jul. 18, 2000

[54] TELECOMMUNICATIONS CABLING ARRANGEMENT

[75] Inventors: Richard Herbert Snow, Deer Trail; Timothy James Pickles, Aurora, both of Colo.; Ross S. Johnson, Hudsonville, Mich.; Ralph Reddig, Grand Rapids, Mich.; David E. Emery, North Muskegon, Mich.

[73] Assignees: Haworth, Inc., Holland, Mich.; Krone Aktiengesellschaft, Berlin-Zehlendorf, Germany

[21] Appl. No.: 09/067,070

[22] Filed: Apr. 27, 1998

[51] Int. Cl.$^7$ ...................................................... H01R 4/60
[52] U.S. Cl. ............................................... 439/217; 174/49
[58] Field of Search ..................................... 439/215, 502, 439/225, 701, 211, 210; 174/48, 49

[56] References Cited

U.S. PATENT DOCUMENTS

| | | |
|---|---|---|
| 3,958,850 | 5/1976 | Ayer . |
| 4,103,985 | 8/1978 | Krolak et al. . |
| 4,220,391 | 9/1980 | Krolak et al. . |
| 4,227,764 | 10/1980 | Fiske . |
| 4,290,644 | 9/1981 | Fiske . |
| 4,290,664 | 9/1981 | Davis et al. . |
| 4,303,296 | 12/1981 | Spaulding . |
| 4,516,818 | 5/1985 | Johnston et al. . |
| 4,595,799 | 6/1986 | Krob et al. . |
| 4,662,701 | 5/1987 | Lane . |
| 4,675,900 | 6/1987 | Temkin . |
| 4,748,541 | 5/1988 | Nozick . |
| 4,761,811 | 8/1988 | Zetena, Jr. . |
| 4,874,322 | 10/1989 | Dola et al. . |
| 4,952,163 | 8/1990 | Dola et al. . |
| 5,160,276 | 11/1992 | Marsh et al. . |
| 5,217,190 | 6/1993 | Reed et al. . |
| 5,228,869 | 7/1993 | Below . |
| 5,272,277 | 12/1993 | Humbles et al. . |
| 5,302,139 | 4/1994 | Starsja . |
| 5,303,320 | 4/1994 | Duffie . |
| 5,318,454 | 6/1994 | Deer et al. . |
| 5,326,934 | 7/1994 | LeMaster et al. . |
| 5,451,714 | 9/1995 | Duffie . |
| 5,460,545 | 10/1995 | Siemon et al. . |
| 5,530,435 | 6/1996 | Toms et al. . |
| 5,593,317 | 1/1997 | Humbles . |
| 5,597,714 | 1/1997 | Johnson et al. ......................... 439/215 |
| 5,620,335 | 4/1997 | Siemon . |
| 5,634,817 | 6/1997 | Siemon et al. . |
| 5,676,566 | 10/1997 | Carlson, Jr. et al. . |
| 5,682,301 | 10/1997 | Kraft . |
| 5,719,933 | 2/1998 | Welch . |
| 5,816,836 | 10/1998 | Snow et al. . |
| 5,938,462 | 8/1999 | Wilson et al. ........................... 439/215 |
| 5,941,720 | 8/1999 | Byrne ....................................... 439/215 |
| 5,964,609 | 10/1999 | Wilson et al. ........................... 439/215 |

OTHER PUBLICATIONS

U.S. Patent Application Ser. No. 08/846 622, filed Apr. 30, 1997 (Atty. Ref.: Haworth Case 164B), and drawings attached hereto.

U.S. Patent Application Serial No. 09/067 508, filed Apr. 27, 1998.

*Primary Examiner*—Khiem Nguyen
*Assistant Examiner*—J. F. Duverne
*Attorney, Agent, or Firm*—Flynn, Thiel, Boutell & Tanis, P.C.

[57] ABSTRACT

A communication cabling system wherein elongate communication distribution assemblies (CDAs) are joined serially together by connector units at opposite ends thereof. The interconnected CDAs include access ports or openings into which a tap unit may be inserted and connected to a circuit which is accessible through the access port. Each CDA can be adapted to carry a selected number of circuits wherein each connector unit at an opposite end of a CDA includes a block-like shielded housing having a predetermined number of mounting sockets on a back end thereof. A plurality of modular cable assemblies are provided which have plugs that plug into a respective one of the mounting sockets of the shielded housing so as to assemble a CDA. This system provides for the ready construction, installation and reconfiguration of the communication cabling system.

22 Claims, 35 Drawing Sheets

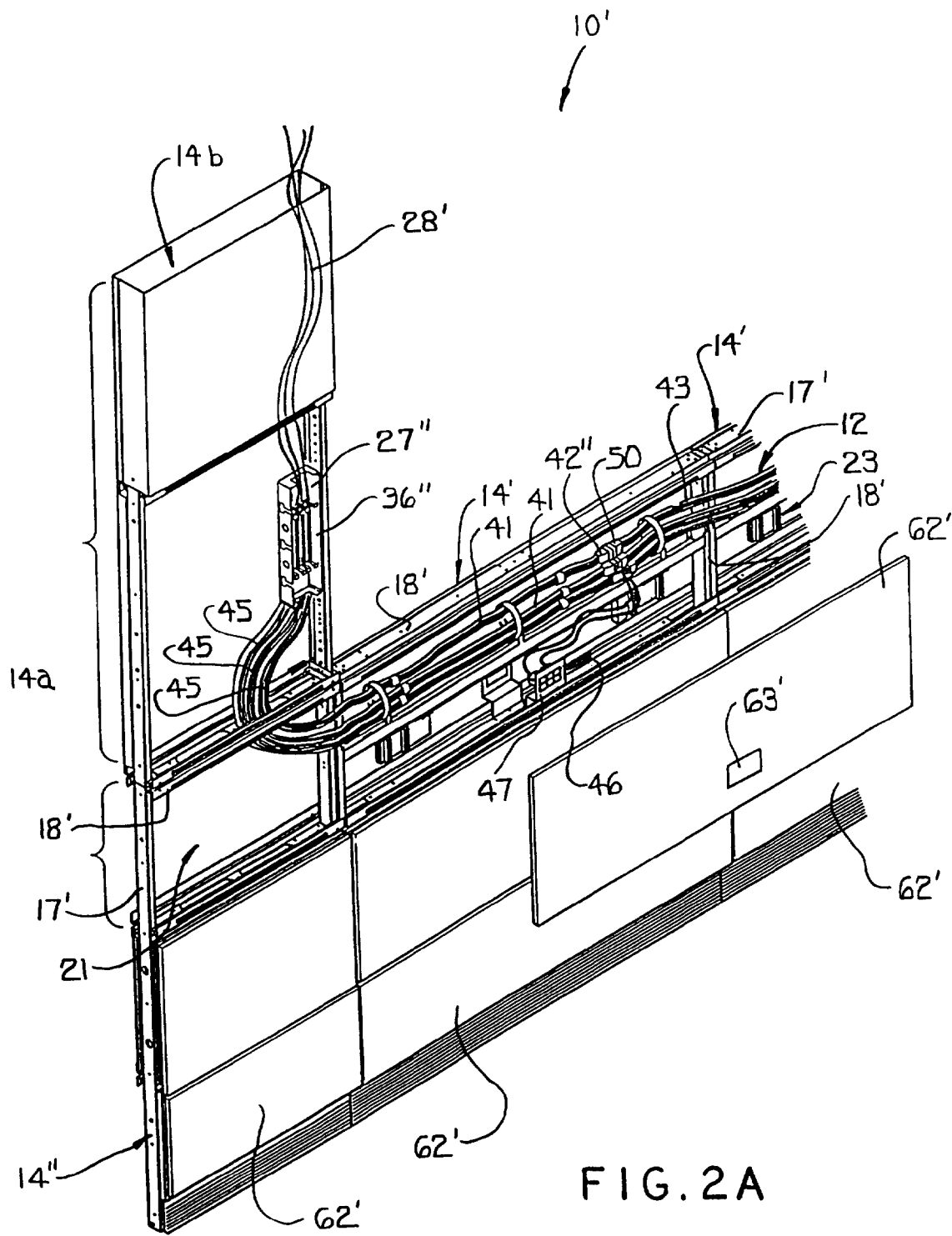

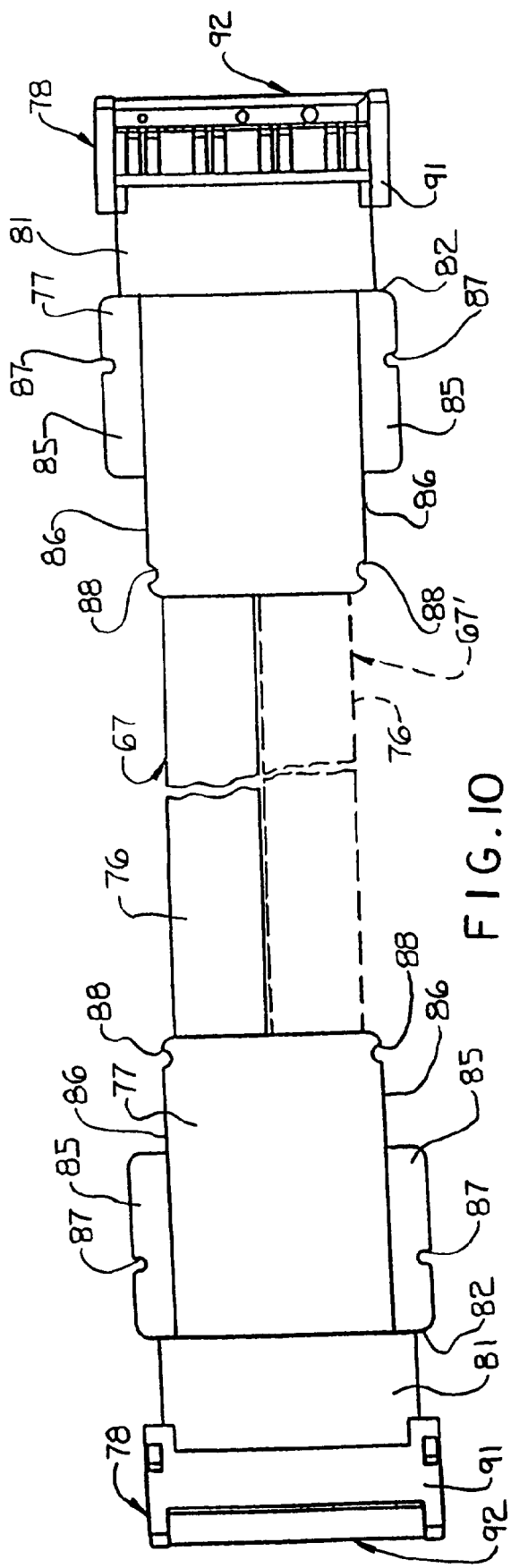
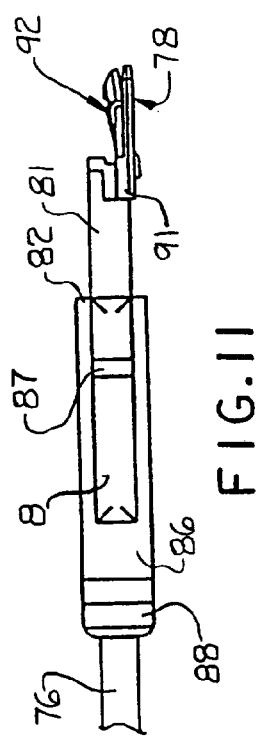

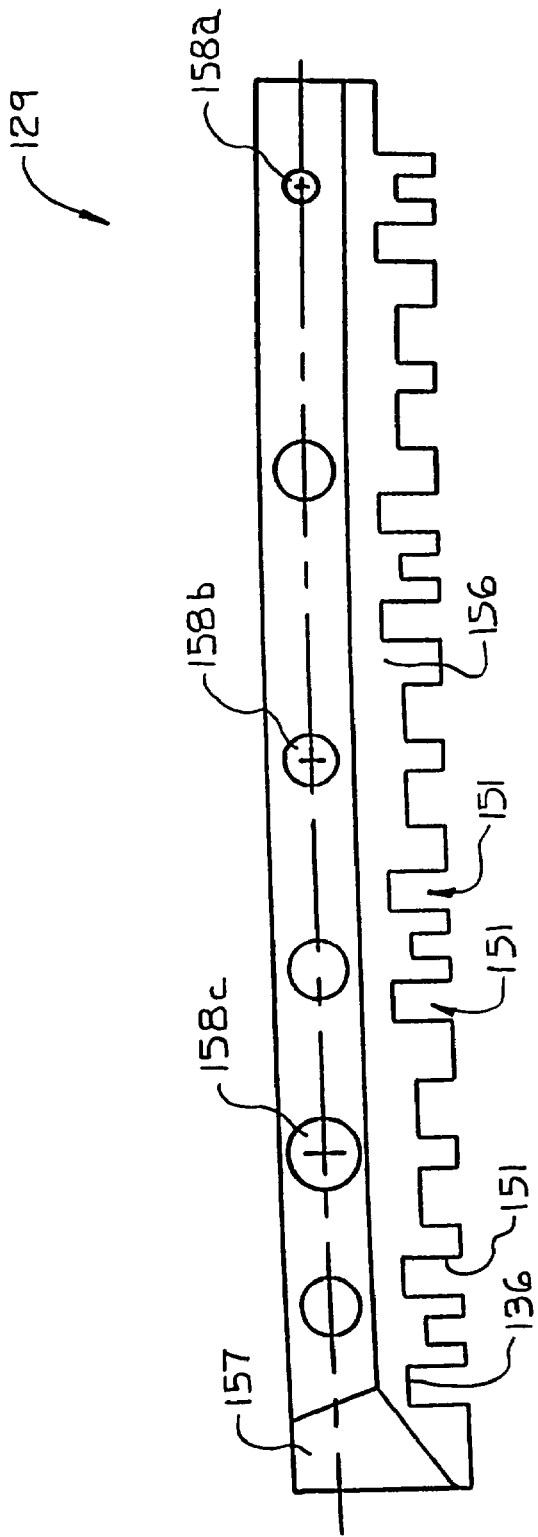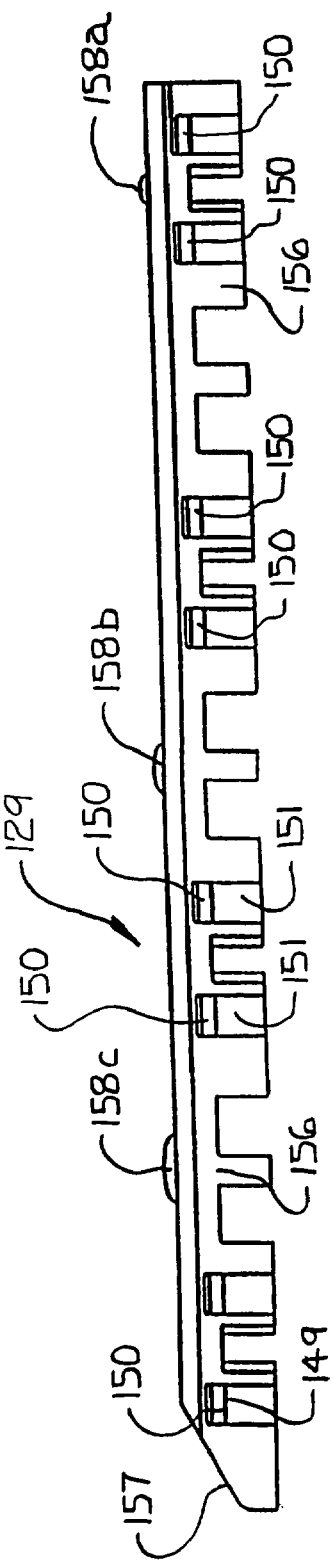

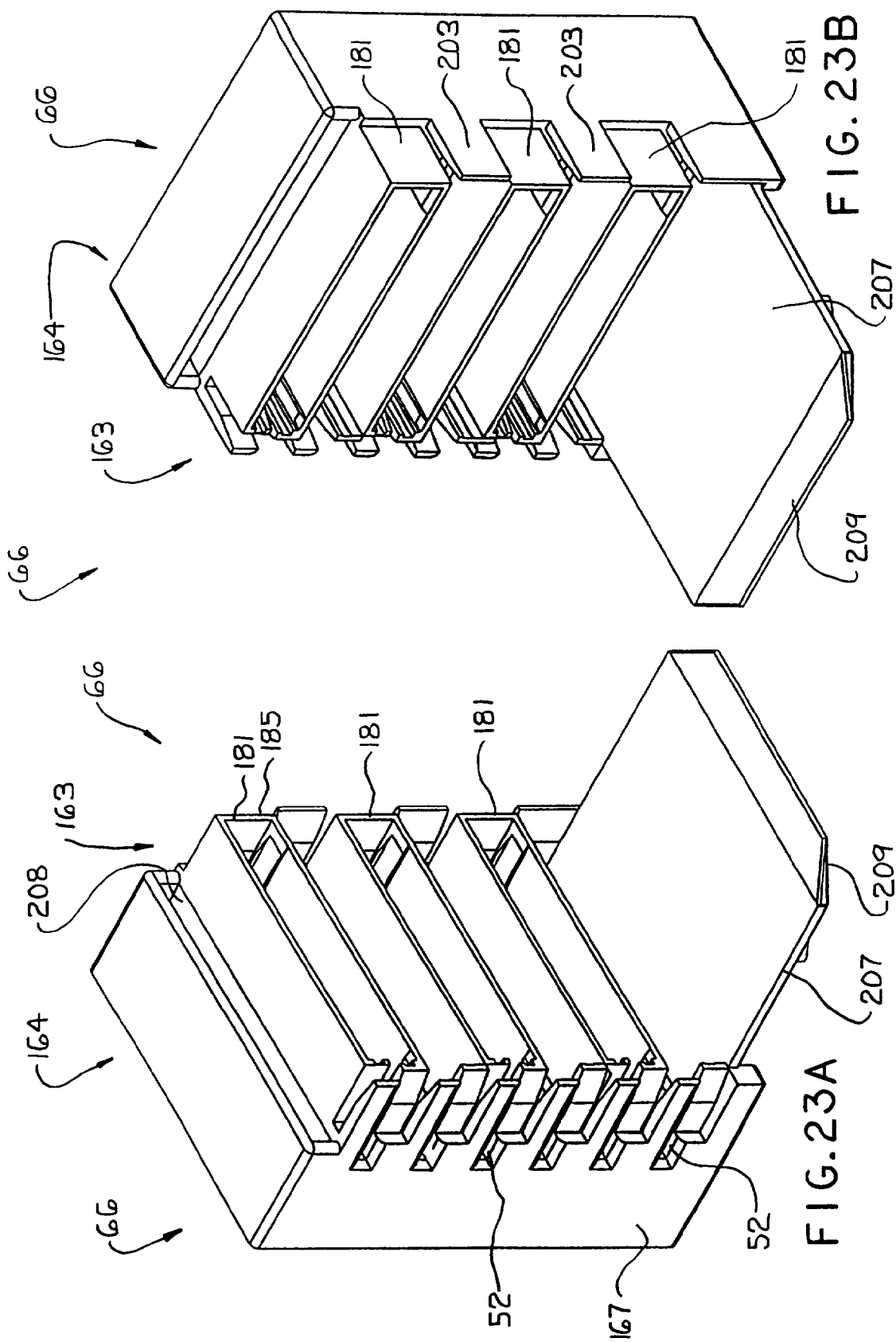

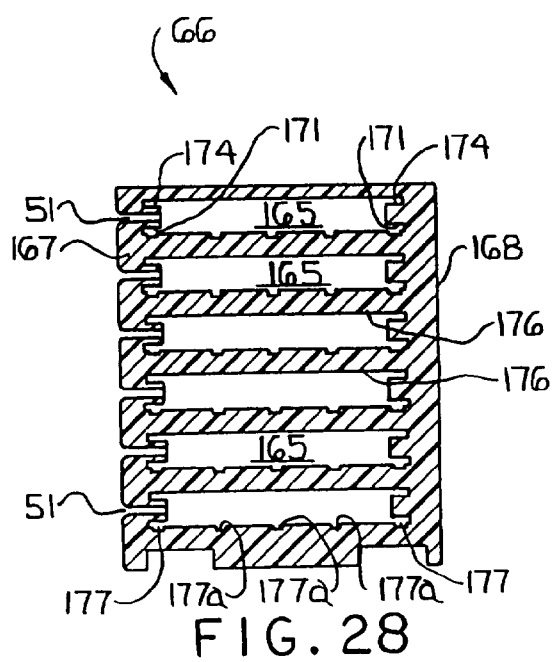
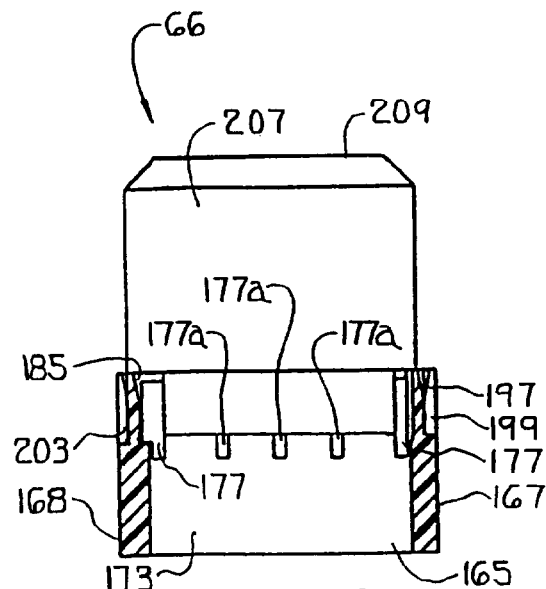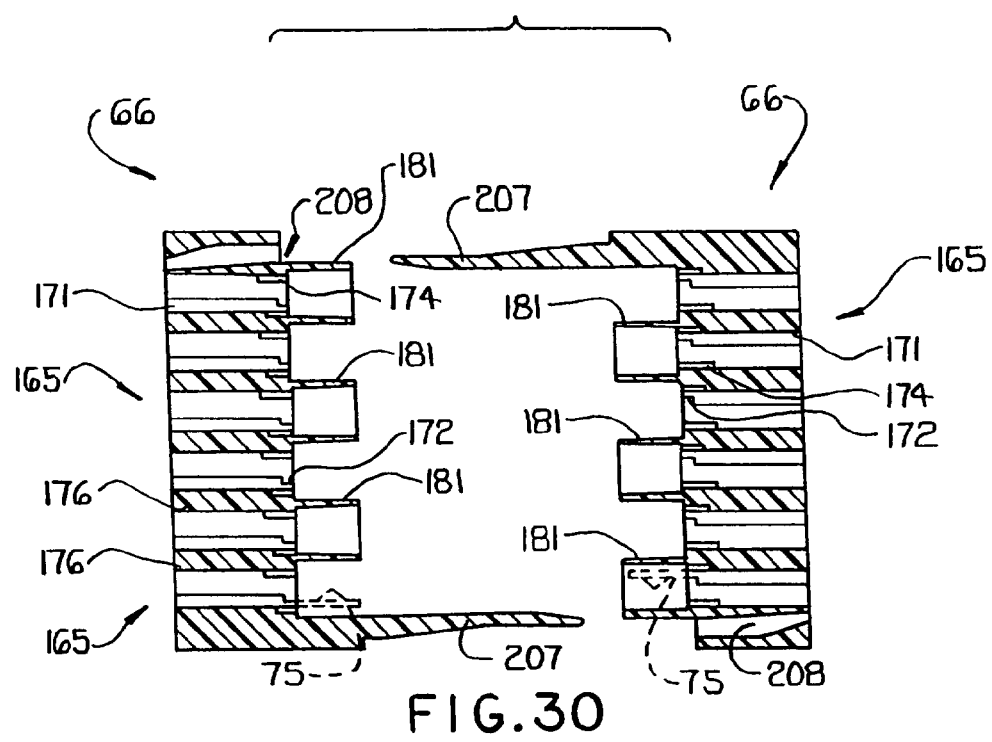

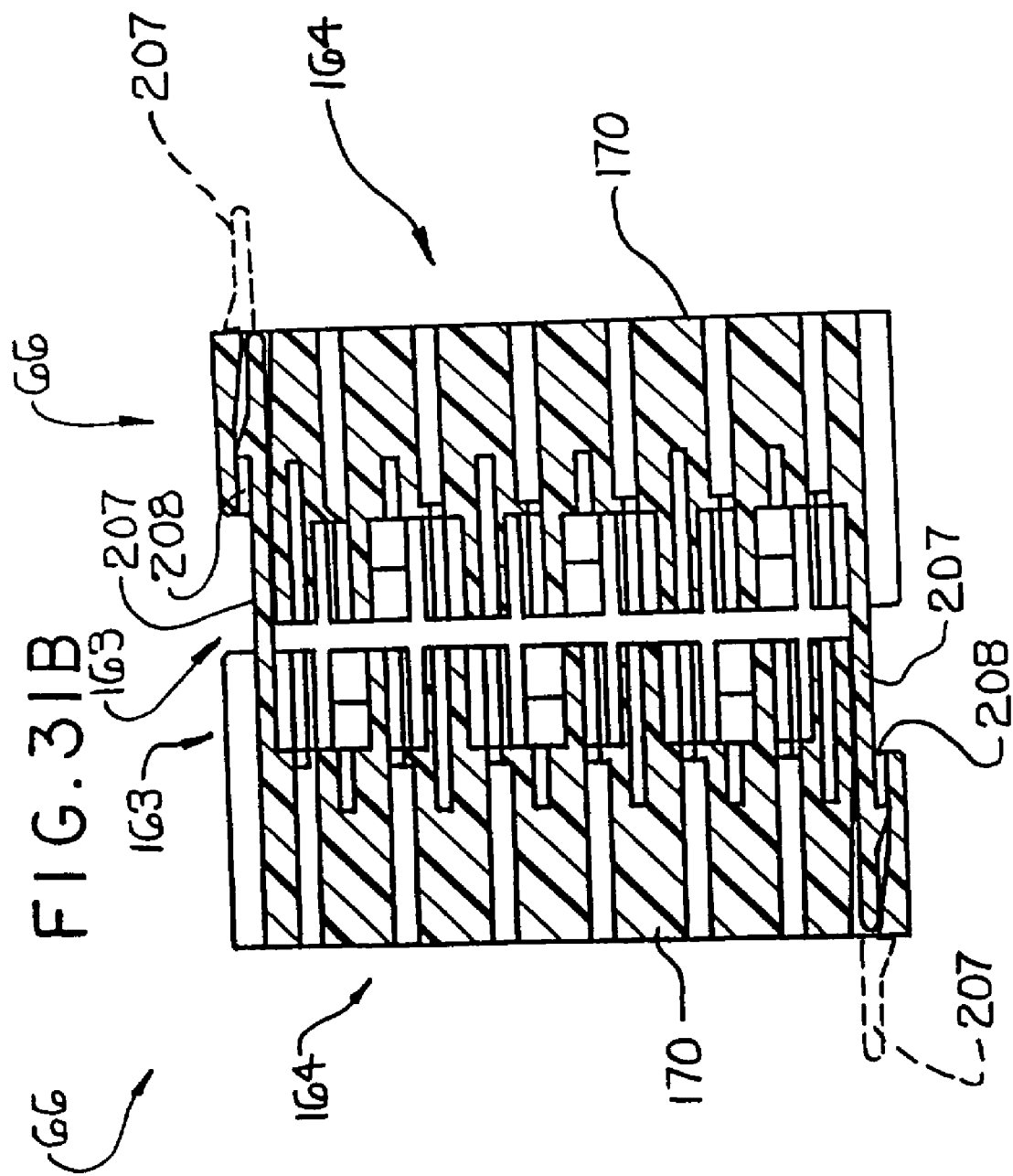

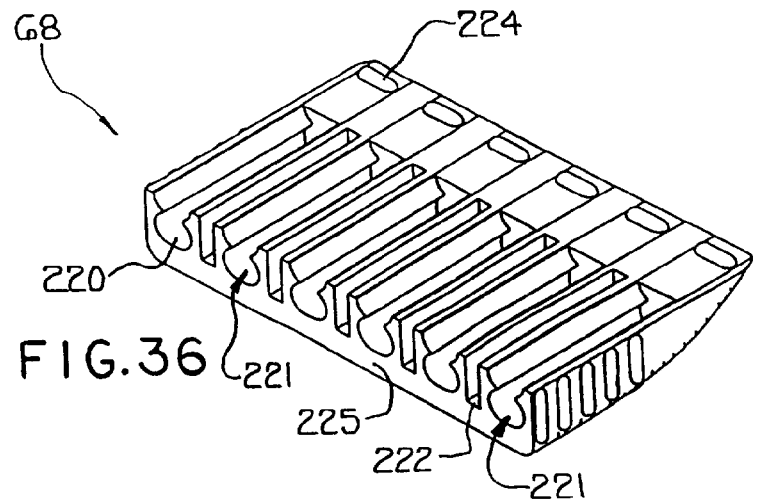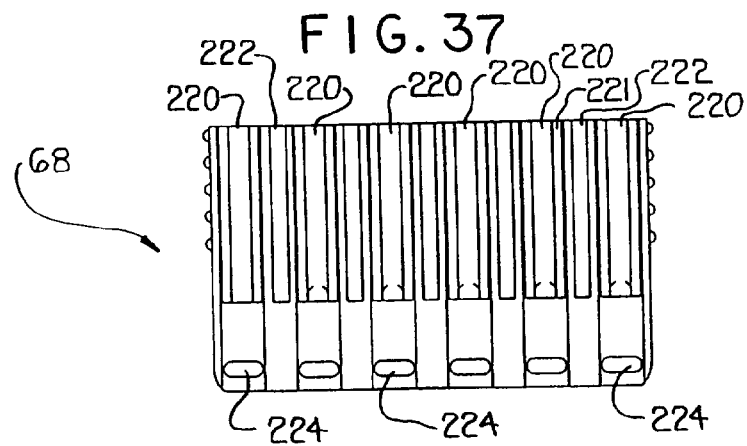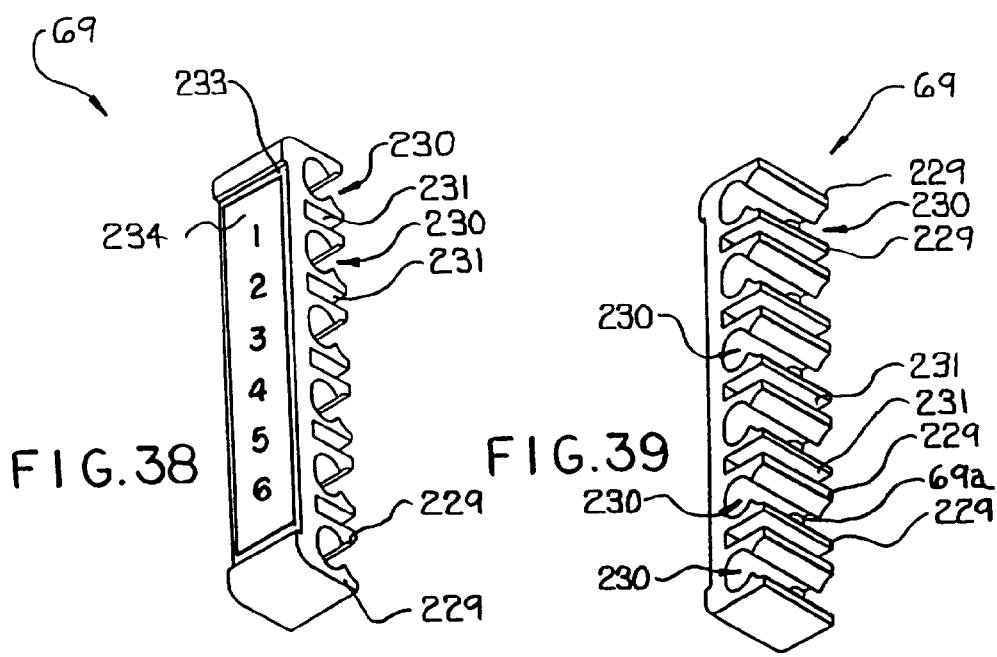

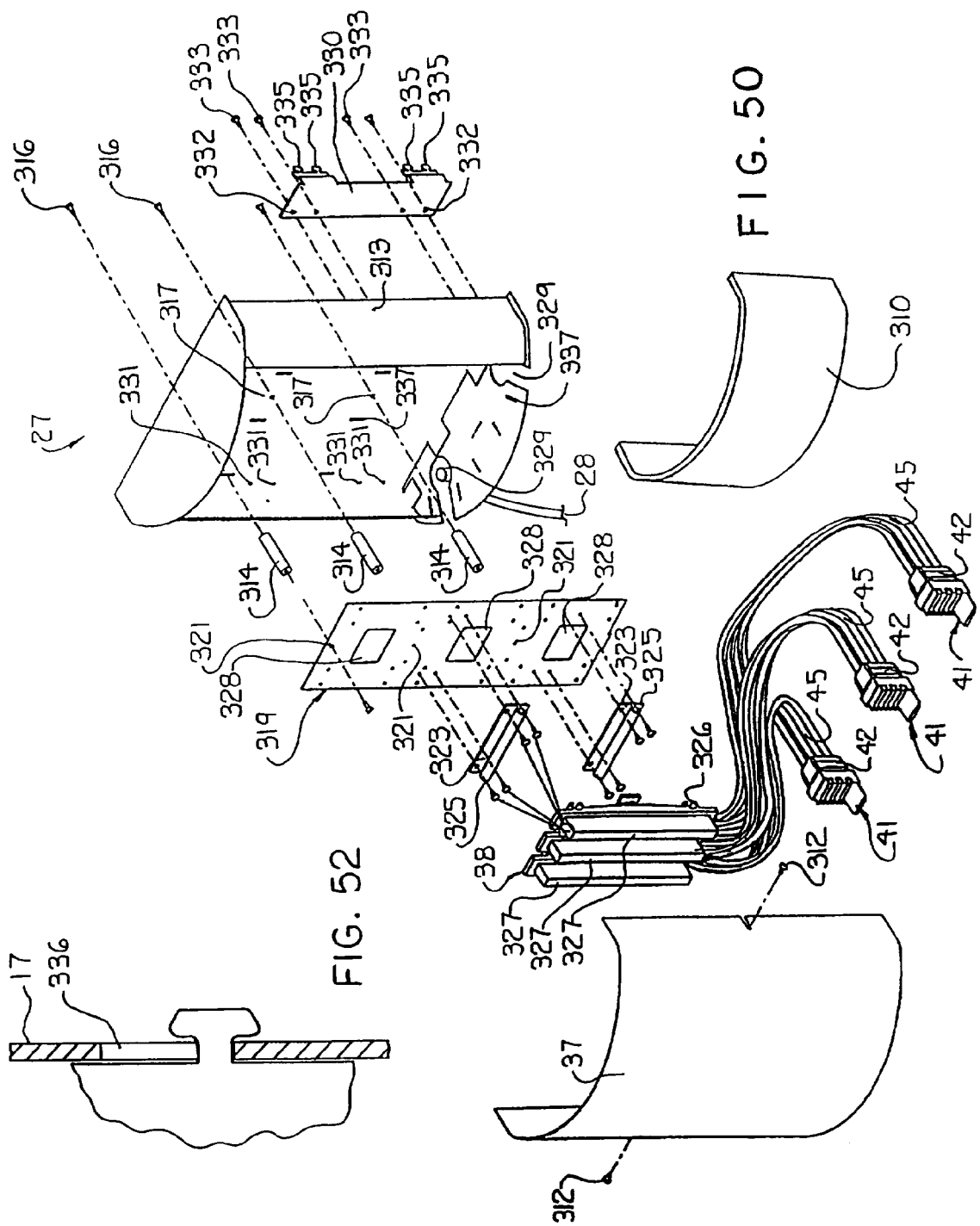

TELECOMMUNICATIONS CABLING ARRANGEMENT

FIELD OF THE INVENTION

This invention relates to an improved modular communication cabling system for use in buildings and office areas, such as within office furniture components having raceways therethrough, to route a plurality of communications circuits or links to working areas wherein selected circuits can be accessed.

BACKGROUND OF THE INVENTION

Commercial buildings typically include large open floor areas which are subdivided into a selected arrangement of workstations or working areas, such as by space-dividing furniture components, for example portable wall panels. The wall panels generally are connected end-to-end, either in straight or corner configurations, to define a large number of workstations. Each workstation is outfitted with additional furniture components such as storage cabinets, worksurfaces or the like which are either supported on the wall panels or are freestanding. Additionally, freestanding furniture components such as tables and desks may also be used to subdivide office areas into open workstation areas.

Such furniture is commonly referred to as "systems" furniture, and is used extensively due to its flexibility in defining a wide variety of office configurations depending upon the specific requirements of an office area. Since these requirements can change over time, such systems furniture also can be reconfigured, for example, to change the arrangement, number and/or size of the workstations.

Such workstations also include equipment and components which may require both power and communications connections. For example, workstations may include computers having modem or LAN connections, telephones, facsimile machines or the like, all of which may require connection to separate power and/or communications circuits. The number and type of components may vary over time, or from one workstation to the other.

With respect to electrical power, modular electrical power systems have been developed which are readily mountable within wall panels to supply power thereto. These modular electrical systems also are reconfigurable to readily accommodate changes in the arrangement of workstations. These power systems, however, do not supply communication circuits.

Thus, the routing of communications circuits continues to be a problem. In particular, the communications circuits provided to each workstation typically are defined by cabling which extends throughout the office area from a cabling closet of the building. The telecommunications cabling is often routed to the individual workstations through floor and/or ceiling spaces, as well as through beltline and floor raceways defined within the wall panels or other furniture components.

More specifically, long lengths of cabling are fed throughout the raceways and clearance spaces to the individual workstations and typically terminate in standard connectors, such as six or eight position modular jacks or amphenol connectors. Additional short lengths of communication cables commonly referred to as patch cords or station cords are mated to these standard connectors by one end thereof, while the other end thereof has a conventional jack which is accessible from the workstation.

Due to the large number of workstations in a typical office area and the amount of equipment in each workstation requiring communications connections, a significant amount of cabling and installation time is required to wire an office area. Furthermore, when the configuration of the workstations is modified or the equipment being used is changed, these existing cabling systems may require significant changes thereto. However, existing communications systems have limited flexibility to accommodate changes in configuration or capacity. For example, if a workstation is moved farther away from a wiring closet, the old cable often is removed and a new longer cable is provided.

To overcome these limitations, an earlier version of the communication cabling system of the present invention is disclosed in U.S. patent application Ser. No. 08/814 280, and WO 96/73339 which corresponds thereto. The disclosure of these applications in their entirety are incorporated herein by reference.

The present invention disclosed herein is a communication cabling system wherein multi-circuit communication distribution assemblies (hereinafter CDAs) are joined serially together at the opposed ends thereof by connector units. The CDAs define a plurality of separate communication circuits, and the connector units which are serially-connected together include access ports or openings which each provide access to at least one of the circuits. A tap module may be inserted into a selected one of the access ports to connect to the circuit corresponding to this port.

While the system disclosed herein is structurally and functionally similar to the system disclosed in aforementioned U.S. patent application Ser. No. 08/814 280, the system disclosed herein includes improvements and modifications, particularly to facilitate the construction and use thereof.

More particularly, each CDA of this invention can be readily adapted to carry a selected number of circuits therethrough. To accomplish this result, the connector unit at each end of the CDA includes a block-like shielded housing which includes a predetermined number of mounting sites such as separate sockets at a back end thereof. The mounting sockets define the number of circuits which can be accommodated through the housing.

Each CDA also includes a plurality of cable assemblies such as six in a preferred embodiment, which plug into the housings. Each cable assembly preferably defines one circuit of four twisted conductor pairs although two or more circuits could be defined by a single cable assembly. Each cable assembly includes plug-like contact assemblies at opposite ends of an elongate flexible cable. The contact assembly plugs into one of the mounting sockets of the housing, and includes a plurality of exposed contacts which extend through the housing for later connection to the contacts of another CDA.

The housing defines a predetermined number of mounting sockets wherein at least one, and preferably six cable assemblies are connected thereto. Each cable assembly is independently supported by the housing such that selected ones of the mounting sockets may be used which provides flexibility in designing the overall system to accommodate the specific needs of each workstation.

When two housings are joined together, the contact assemblies of one housing matingly engage the corresponding contact assemblies of the other housing such that the circuits pass through the housings. To facilitate the connection of two housings, each housing also includes a tongue projecting forwardly therefrom for snap fitting engagement with a corresponding slot on the other of the housings. The tongues provide for preliminary alignment of the housings and contacts and lock the housings together by simply plugging two connector units together.

To also facilitate installation of the communication cabling system in wall panels, the cables which extend rearwardly from a housing are staggered or offset relative to each other. This staggered arrangement allows the cables to be pressed horizontally together by a suitable strap into a narrow vertical stack, or alternatively pressed vertically together into two parallel side-by-side half stacks which define a wider but shorter cross-sectional size. This allows the CDAs to be readily fitted into different size raceways and passages, such as provided in different wall panels and other office furniture components.

Each connector unit also includes a support block which ties all of the contact assemblies together to strengthen the connector unit. The support block also is preferably color coded to readily identify a 6-circuit set or group of CDAs from another 6-circuit set of CDAs which may be routed through the same raceway or clearance space.

With this cabling arrangement as disclosed in more detail herein, communications circuits can be readily routed to and/or through office areas. The system provides significant flexibility when reconfiguring office areas or adapting to the changing requirements of individual workstations.

Other objects and purposes of the invention, and variations thereof, will be apparent upon reading the following specification and inspecting the accompanying drawings.

BRIEF DESCRIPTION OF THE DRAWINGS

FIG. 2A is a perspective view of the communication cabling arrangement as mounted in a second space-dividing wall panel arrangement.

FIG. 10 is a plan view of the cable assembly of FIG. 9.

FIG. 11 is a partial side elevational view of a contact plug at one end of the cable assembly of FIG. 10.

FIG. 18A is a plan view of a contact alignment body of the contact assembly.

FIG. 18B is an end elevational view of the front leading edge of the contact alignment body.

FIGS. 23A and 23B are perspective views of an outer access side and an inner side, respectively, of a shielded housing for the connector unit.

FIG. 28 is a cross-sectional view of the housing as taken along line 28—28 of FIG. 27.

FIG. 29 is a cross-sectional view of the housing as taken along line 29—29 of FIG. 25.

FIG. 30 is a cross-sectional view of the two housings as taken along line 30—30 of FIG. 25.

FIG. 31B is a cross-sectional view of the housings of FIG. 31A in a partially engaged position.

FIG. 36 is a perspective view of an inner face of a connector block for the connector unit of the CDA.

FIG. 37 is a plan view of the inner face of the connector block.

FIG. 38 is a perspective view of an outer side of a circuit-identifying keying block.

FIG. 39 is a perspective view of an inner side of the keying block.

FIG. 50 is an exploded perspective view of an infeed unit.

FIG. 52 is an enlarged fragmentary view of a mounting hook for the infeed unit of FIG. 50.

Figure 1A:
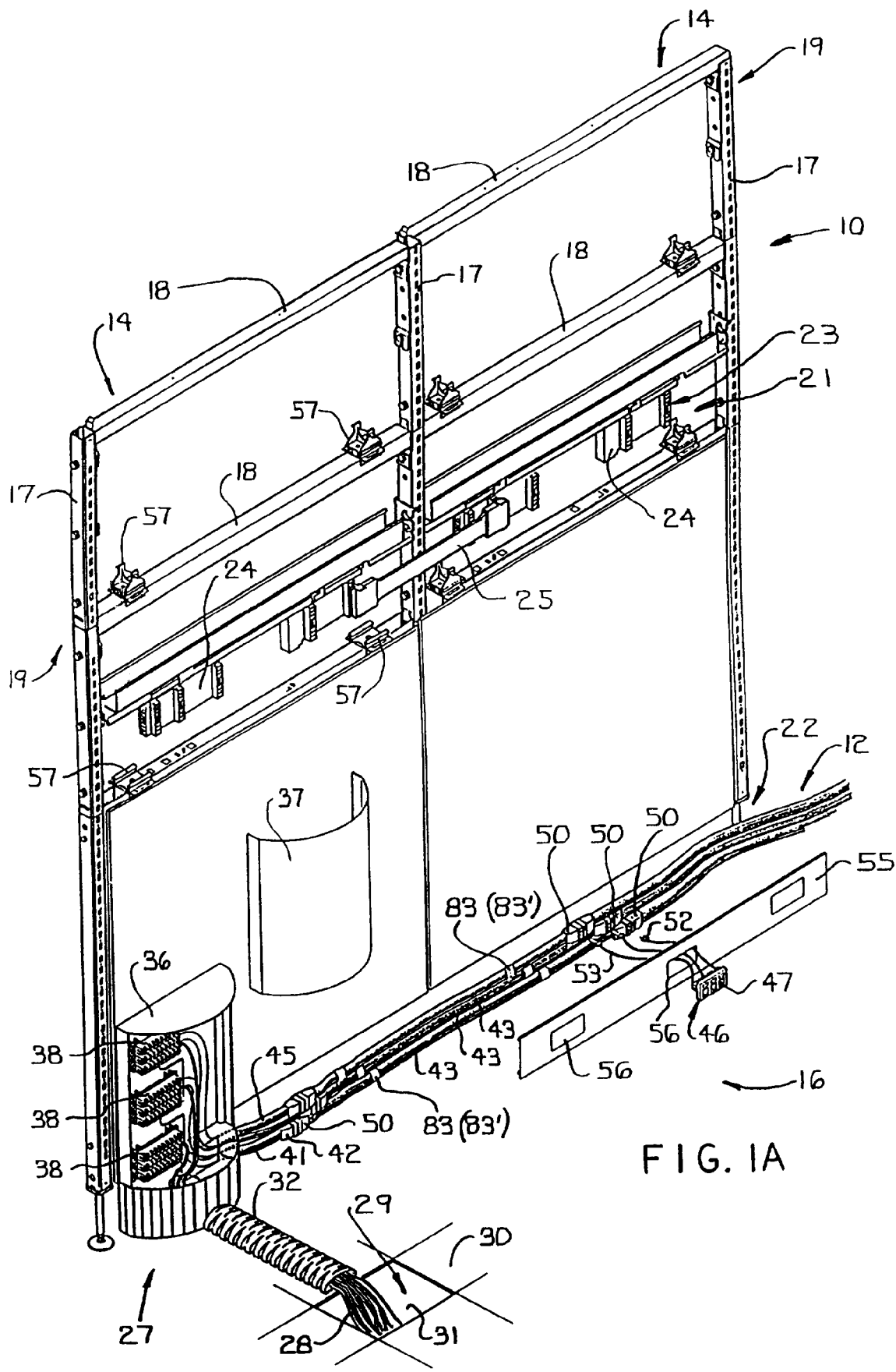
FIG. 1A is a perspective view of a communication cabling arrangement of the invention as mounted in a first space-dividing wall panel arrangement.

Certain terminology will be used in the following description for convenience in reference only, and will not be limiting. For example, the words "upwardly", "downwardly", "rightwardly" and "leftwardly" will refer to directions in the drawings to which reference is made. The word "forward" will be used to designate the direction of the telecommunication link as it extends from the closet to the user equipment. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 1B:
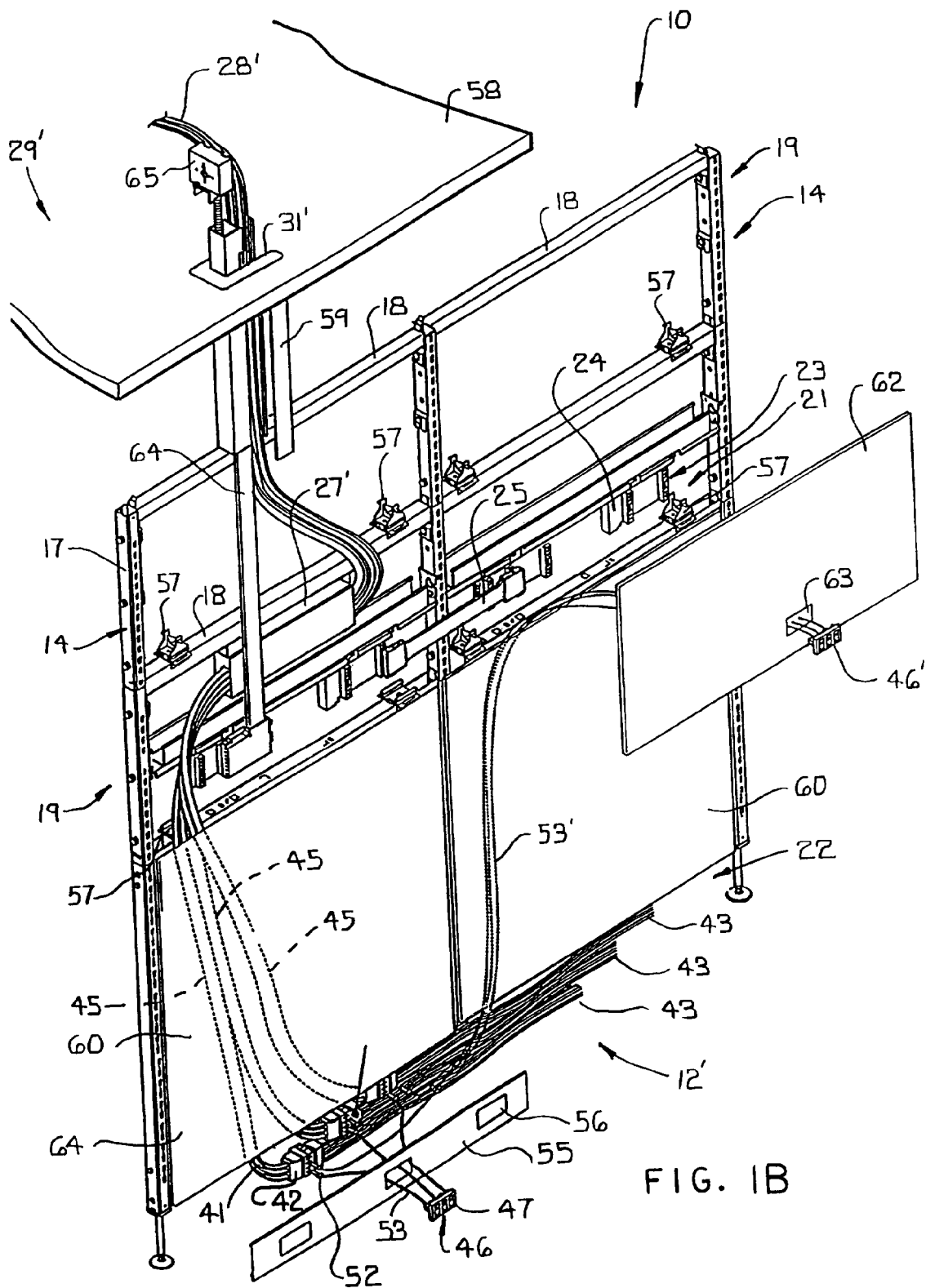
FIG. 1B is a perspective view of an alternative configuration for the communication cabling arrangement as mounted in the wall panels of FIG. 1A.
Figure 2B:
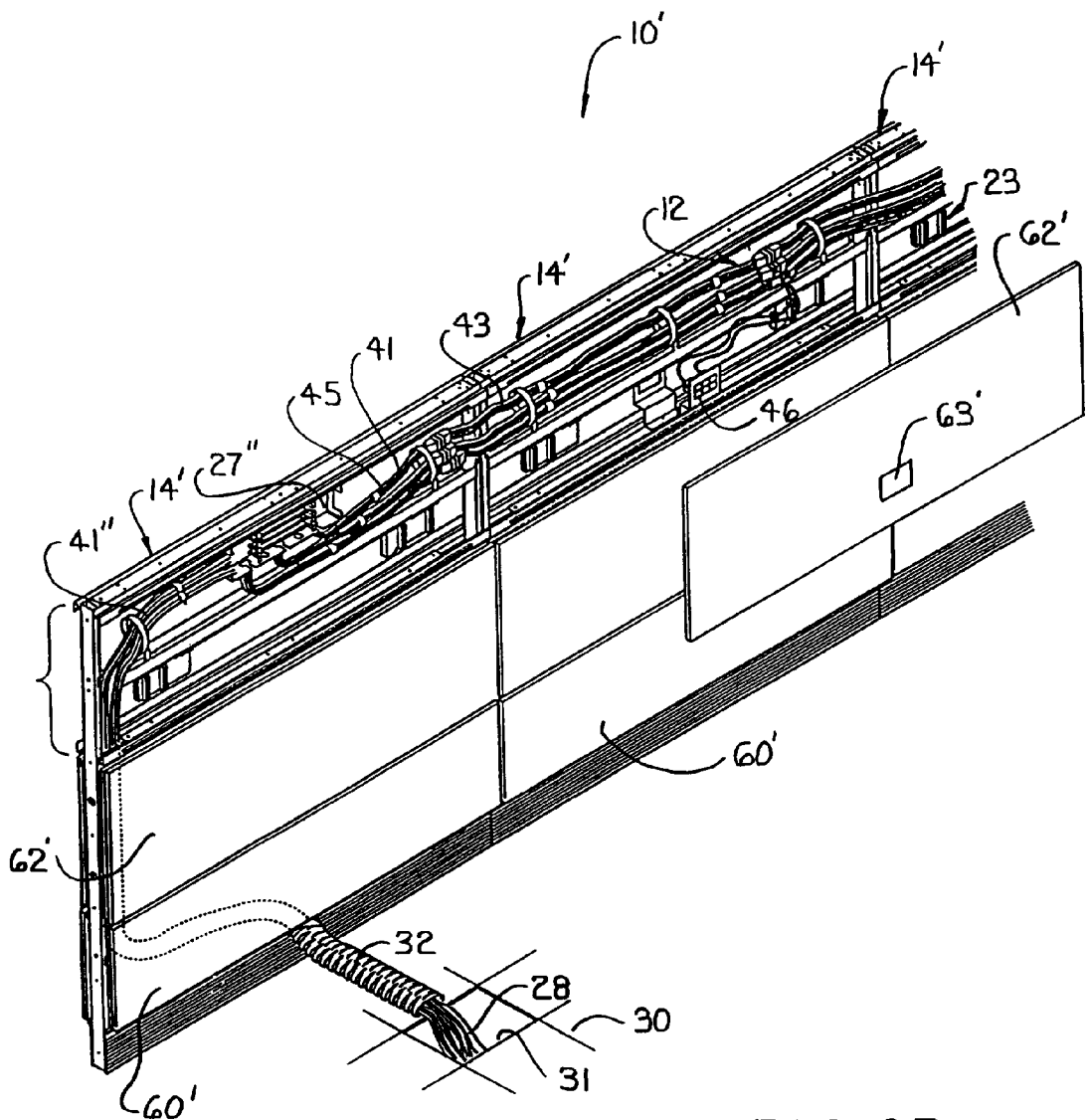
FIG. 2B is a perspective view of an alternative configuration for the wall panels of FIG. 2A and of the communication cabling arrangement disposed therein.

Referring to FIGS. 1A and 1B, a conventional furniture arrangement 10 is illustrated having a communication cabling arrangement 12 of the invention mounted therein. The illustrated furniture arrangement 10, in particular, is a wall system defined by a plurality of interior space-dividing wall panels 14 which are serially connected in end-to-end relation. The wall panels 14 are arranged so as to subdivide relatively large open office areas into smaller work areas such as a workstation 16 which is generally defined adjacent to the wall panels 14. An alternative arrangement of wall panels 14' is illustrated in FIGS. 2A and 2B. The following discussion describes use of the communication cabling arrangement 12 within a wall panel system although the communication cabling arrangement 12 can also be used in other suitable locations such as clearance spaces in a floor or ceiling or raceways of other furniture components such as linking desks.

With respect to the wall panels 14 (FIGS. 1A and 1B), they include vertical posts 17 and horizontal cross members 18 which are rigidly joined to define a rectangular panel frame 19. These wall panels 14 are of any conventional construction. The specific wall panels 14 and 14' of FIGS. 1A, 1B, 2A and 2B are illustrated for environmental purposes only. Other examples of such wall panels are provided in U.S. patent application Ser. Nos. 08/660 504 and 08/736 512, the disclosures of which are incorporated herein by reference.

The wall panels 14 include open areas therein that define a beltline raceway 21 and/or a base raceway 22 which extend horizontally. In FIG. 1A, the communication cabling arrangement 12 is installed within the base raceway 22 while a power distribution arrangement 23 is illustrated in the beltline raceway. The power distribution arrangement 23 uses conventional power distribution assemblies 24 which are connected together by intermediate jumpers 25 to thereby supply power to the various workstations 16.

The furniture arrangement 10 further includes the communication cabling arrangement 12 which can be installed either in the base raceway 22 or the beltline raceway 21. As disclosed herein, the communication cabling arrangement 12 serves to provide the necessary connections for various components of office equipment such as computers, telephones or the like which are typically used in workstations 16.

Generally, the communication cabling arrangement 12 includes an in-feed unit 27 (FIG. 1A) which is connected to building cabling 28. The building cabling 28 extends from a main wiring closet (not illustrated) of the building to the in-feed unit 27, and the actual laying of the building cabling 28 will vary depending upon the specific arrangement of each office area. For example, FIG. 1A illustrates the building cabling 28 being routed from a clearance space 29 below the floor 30, with the cabling 28 passing through a floor opening 31 and laid horizontally across the floor 30. The exposed building cabling 28 is protected by a tubular cable cover 32 and enters the in-feed unit 27 through a skirt 33.

The in-feed unit 27 itself is exteriorly mounted to the wall panels 14, and is particularly suitable if there is insufficient space within the hollow areas of a wall panel 14 for the connection of the cabling. The in-feed unit 27 includes a hollow enclosure 36 having a removable access cover 37. The hollow interior of the in-feed unit 27 includes a connector panel having connector hardware 38 thereon such as an arrangement of conventional punch blocks or other suitable electrical connectors thereon. Besides punch blocks, the connector hardware 38 also could be a plurality of amphenol connectors or eight position modular jacks which each supply one or more communication circuits. The connector hardware 38 allow for the connection of the building cabling 28 to the communication cabling arrangement 12 as described herein.

The communication cabling arrangement 12 also includes elongate lengths of cabling harnesses 41 which are connected to the punch blocks 38 at one end of an infeed cable 45 and have a connector unit 42 at a preterminated opposite end of the cable 45. Thereafter, modular communication distribution assemblies 43 (hereinafter CDAS) are connected to the end connector units 42 of the harnesses 41. A selected number of the CDAs 43 are serially connected together and routed longitudinally throughout the furniture arrangement 10. The CDAs 43 define a plurality of, and preferably at least six communication circuits which extend throughout the workstation area. As illustrated in FIG. 1A, three separate lengths or runs of CDAs 43 are provided together in the raceway 22 such that eighteen separate communications circuits are carried along the base raceway 22.

Figure 3:
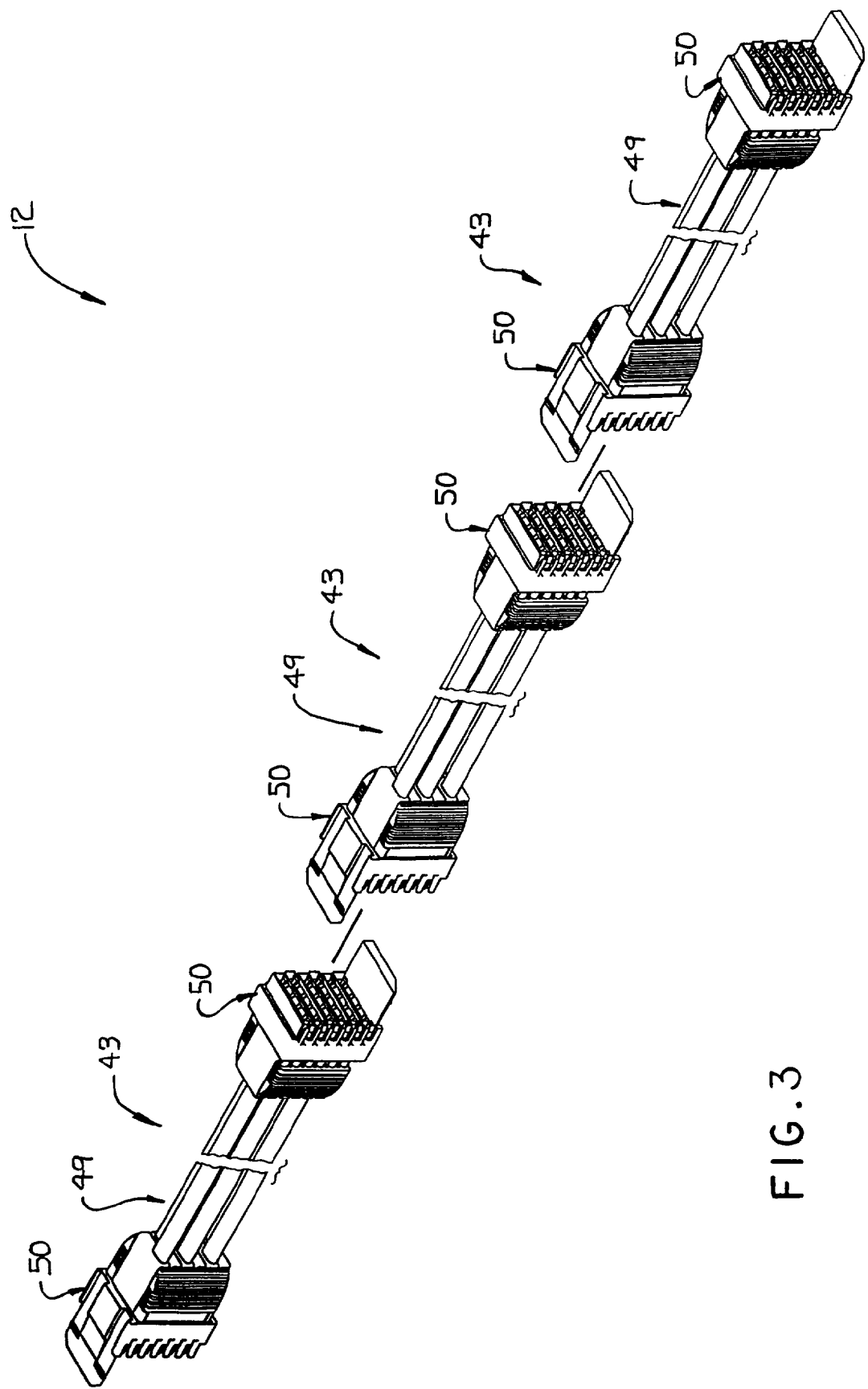
FIG. 3 is an exploded perspective view of a series of communication distribution assemblies of the communication cabling arrangement of this invention.
Figure 4:
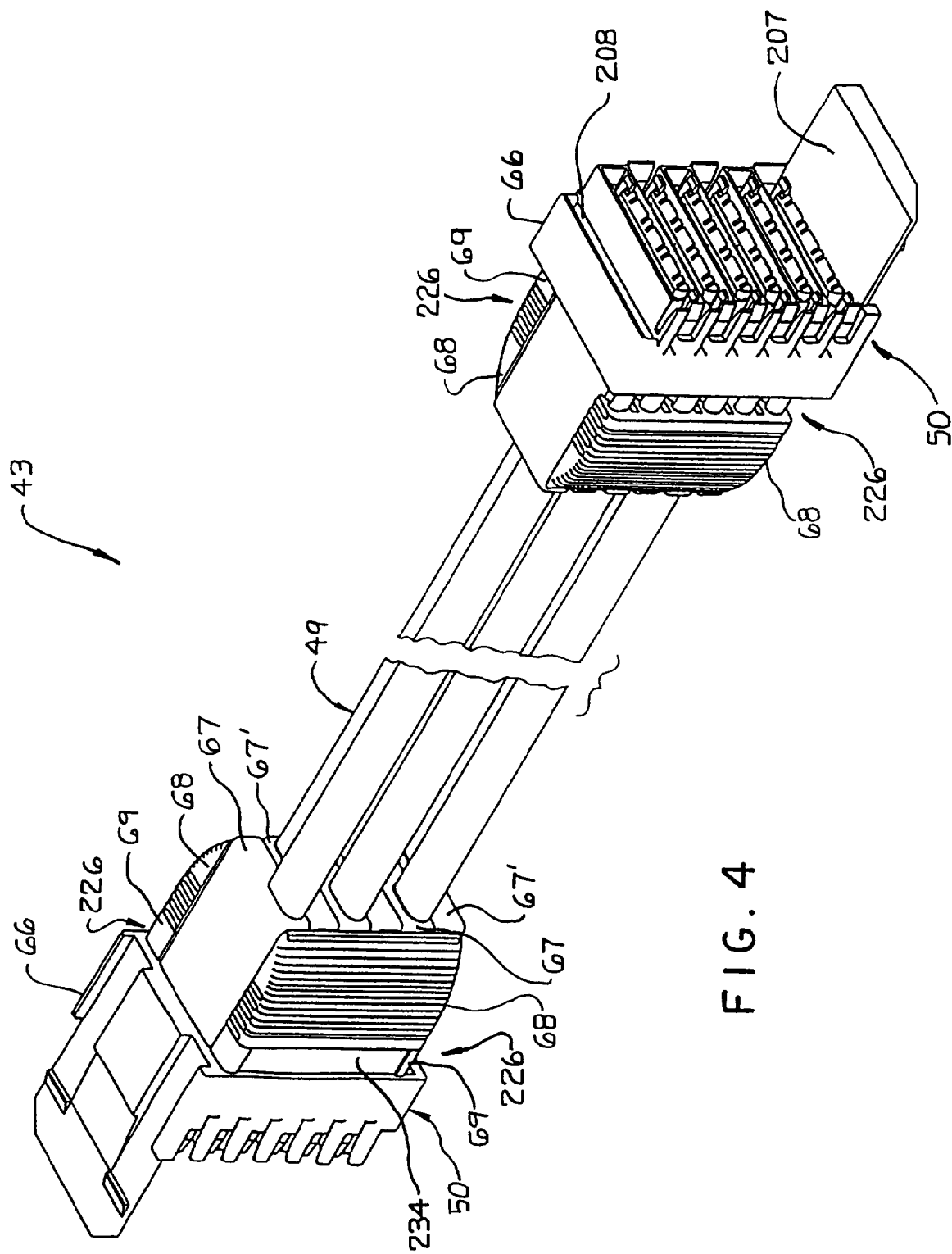
FIG. 4 is an enlarged perspective view of a single communication distribution assembly (CDA).

Referring to FIGS. 3 and 4, each CDA 43 has a modular construction in that it includes a flexible length of an intermediate cable 49 which has connector units 50 at the opposite ends thereof. To facilitate the connection of the CDAs 43 together, the CDAs are non-handed in that the connector unit 50 at the right end of a CDA 43 is adapted to be connected to a corresponding connector unit 50 on the left end of a serially adjacent CDA 43. Since the CDAs 43 are non-handed, a CDA 43 can be flipped end to end and still be connected to a serially-adjacent CDA 43 without any modifications thereto.

The serially adjacent connector units 50 slide axially into engagement with each other so as to mechanically and electrically connect the circuits of one CDA 43 with the circuits of an adjacent CDA 43. The CDAs 43 therefore can be connected in end-to-end relation and can extend longitudinally along the raceways of the wall panel system or other furniture components.

The CDAs 43 illustrated in FIG. 3 define one group of six four-pair UTP circuits. Preferably, the CDAs 43 are provided in a plurality of different lengths, preferably from twenty-four inches to one hundred twenty inches so that the lengths of the CDAs can match the modular widths of the individual wall panels 14 or match the widths of individual offices to meet the needs of the layout for the facility. Still further, each CDA 43 also could have a length which is greater than a workstation width to bypass a workstation and position a connector unit 50 in another workstation. As described in more detail herein, each series or length of CDAs 43 which are serially connected together preferably are color coded so as to differentiate the group of circuits defined by these serially-connected CDAs 43 from those circuits defined by other parallel lengths of serially-connected CDAs 43 as disposed in the same raceway.

To connect office equipment to the circuits, the communication cabling arrangement 12 also includes tap modules 46 as seen in FIGS. 1A and 1B which define an outlet part 54 that can include any number of jacks 47 for the connection of workstation equipment thereto. In the illustrated arrangement of FIG. 1A, the outlet part of the tap module 46 includes three jacks 47 which each can be connected to a respective one of the circuits. The jacks 47 thereby define outlets to which equipment can be connected and are supported on a jack housing 239 which mounts to the wall panel 14.

To allow for the connection of the tap modules 46, each connected pair of connector units 50 defines an access location, and in particular, includes an access port 51 for each circuit. Each jack 47 is connected to a plug-like tap 52 (FIGS. 1A and 40) which inserts into a selected one of the access ports 51 and connects the jack 47 to the associated circuit by a tap cable 53. As a result, the tap module 46 can be connected to any access port 51 and can be moved to an alternative access site if the workstations 16 are reconfigured or the equipment of the workstations is moved within the office area.

Further, the three taps 52 of the tap module 46 can be used to access one circuit from each of the three parallel lengths of CDAs 43, or alternatively, the three taps 52 can be connected to three different access ports 52 of a single connector unit 50. Once the tap module 46 is connected to selected circuits, the base raceway 22 can be enclosed by a raceway cover 55 with the jacks 47 being mounted within an opening 56 formed therethrough.

In a further configuration of the communication cabling arrangement (FIG. 1B), the building cabling 28' extends from the main wiring closet through a clearance space 29' defined above a ceiling grid or tile 58. The cabling 28' passes downwardly through an opening 31' into a vertical ceiling column or top feed 59. A box-like in-feed unit 27' is supported entirely within the interior of the wall panel 14 on a horizontal cross member 18 thereof. The interior of the in-feed unit 27' is hollow and includes a connector panel having connector hardware 38 thereon such as punch blocks or other suitable connectors therein.

Within the in-feed unit 27', the cables 45 of the wiring harnesses 41 are connected to the building cabling 28' by way of the connector hardware 38. Thereafter, the harnesses 41 pass vertically downwardly over the exterior of the wall panel frame 19 through a space or passage defined behind a removable cover panel or tile 60. The end connectors 42 of the harnesses 41 are disposed within the base raceway 22 and are connected to three separate CDAs 43. Additionally, cover panels 62 are mounted to the panel frame 19 and enclose the beltline raceway 21 and open areas located above the raceway 21.

Figure 1C:
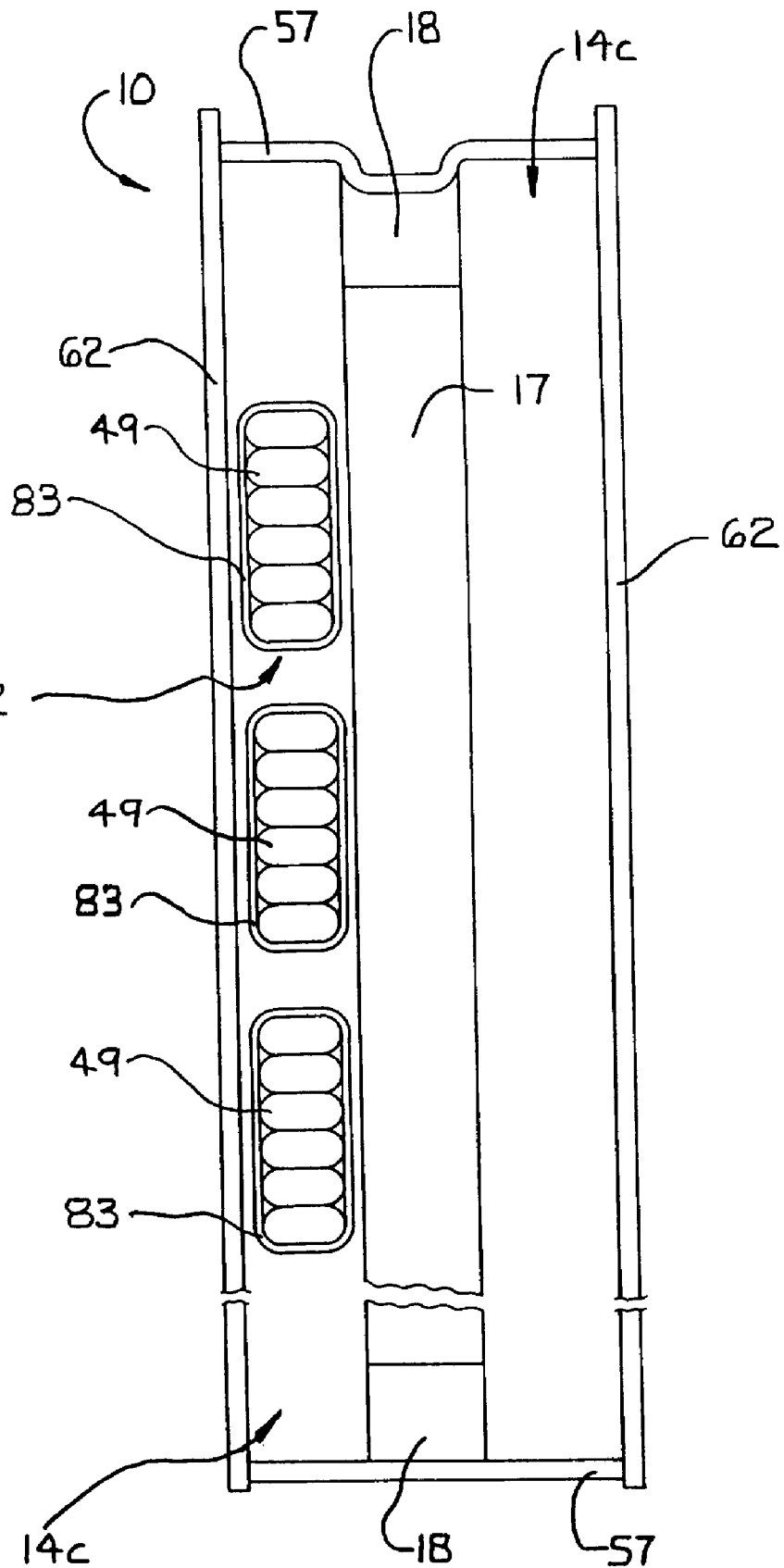
FIG. 1C is an enlarged fragmentary side elevational view of passages defined in the wall panels of FIGS. 1A and 1B.

More particularly, the wall panel 14 includes brackets 57 on the cross rails 18 which support the cover panels 60 and 62 outwardly of the panel frame 19 such that the cover panels 60 and 62 are spaced outwardly of the panel frame to define this space. At the opposite ends of each wall panel 14, the outward spacing of the cover panel 60 as well as cover panels 62 by the brackets 57 thereby defines passages 14c between the vertical post 17 and the interior surfaces of the panels 60 or 62 as seen in FIG. 1C.

To supply outlets for the circuits at base height, one of the tap modules 46 is connected to the raceway cover 55 as seen in FIGS. 1A or 1B. Additionally, another tap module 46' (FIG. 1B) may also be connected to the communication cabling arrangement 12 at the same mounting site as the aforementioned tap module 46. The tap module 46', however, passes vertically between the base raceway 22 and the beltline raceway 21 through a space or passage, for example, as defined behind the base cover panel 60. The tap module 46 has a significantly longer length for the cabling 49' between the jacks 47 and the taps 52 such that the taps 52 can be connected to the access ports 51 at base height and the jacks 47 positioned in the beltline cover tile 62. The beltline cover tile 62 is removably connected to the wall panel 14 so as to enclose the hollow interior thereof, and includes a port 63 to which the jacks 47 are mounted. Accordingly, the tap modules 46 and 46' not only can be positioned at any mounting site in the office area, but also can be arranged at either base or beltline height without moving the CDAs 43.

In the wall panels of FIG. 1B, a power distribution arrangement 23 also is provided in the beltline raceway 21, and includes a power infeed assembly 64. The power in-feed assembly 64 connects to a power junction box 65 in the ceiling space 29' and extends downwardly through the passageway defined by the ceiling column 59. Thus, power and communications can be routed through the same passageway.

In a further wall panel arrangement 10' (FIG. 2A), wall panels 14' are serially connected together. These wall panels 14' include vertical posts 17' and horizontal cross members or rails 18' that define open base and beltline raceways 21' and 22' respectively which extend horizontally therethrough. The panel system 10' in FIG. 2A also includes an in-feed panel 14" which is of shorter length than the wall panels 14' but includes a vertical extension 14a which extends vertically to the ceiling and is hollow to define an in-feed passage 14b for the entry of cabling therein.

A further configuration for the wall panels 14' is illustrated in FIG. 2B wherein three wall panels 14' are serially connected together.

Figure 2C:
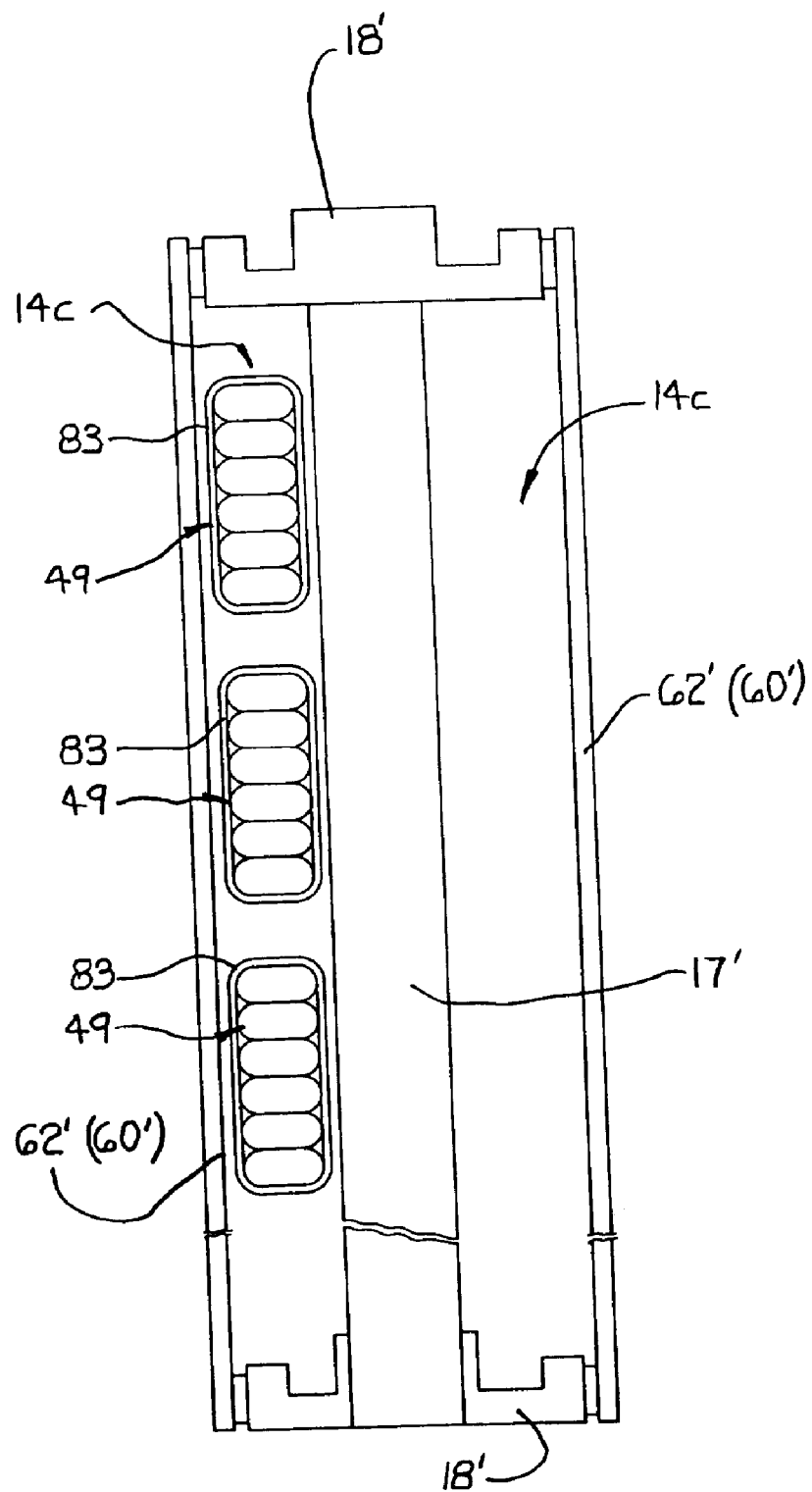
FIG. 2C is an enlarged fragmentary side elevational view of passages defined in the wall panels of FIGS. 2A and 2B.

To define cable passages which open horizontally from one end of a wall panel 14' to a serially-adjacent end of another wall panel 14', the horizontal rails 18' are wider then the vertical posts 17' as seen in FIGS. 2A to 2C. The cover panel 62' is supported on the horizontal rails 18' such that the cover panels 62' on opposite sides of each wall panel 14' are spaced outwardly of the vertical posts 17' as seen in FIG. 2C. Thus, in the region between the vertical posts 17', the raceways 21' and 22' have a width defined by the distance between the cover panels 62', while smaller width passages 14c' as defined between the post 17' and the rear faces of the cover panels 62' open horizontally from the opposite ends of the individual wall panels 14' to provide communication between the raceways of adjacent panels. The cables 49 of the CDAs 43, however, can pass through the passages 14c', preferably stacked vertically one above the other.

As can be seen, the dimensions of the passages such as 14c and 14c' through which the CDAs 43 pass can vary within one wall panel arrangement or between different wall panel arrangements. Additionally, besides the constraints provided by the dimensions and structure of a wall panel frame, additional components may be installed in the raceways such as power components which further limit the space available for cabling. The communication cabling system 12, however, is flexible in that it can be adapted to pass through different size passages whether they are tall and narrow as seen in FIGS. 1C and 2C or short and wide.

As generally described herein, the communication cabling arrangement 12 has three primary components, namely the in-feed unit 27 or 27', the CDAs 43 and the tap modules 46 or 46'. In use, the in-feed unit 27 or 27' connects to building cabling 28 or 28', the CDAs 43 are routed throughout the office area, and the tap modules 46 are selectively connected to the circuits being supplied by the CDAs 43.

Figure 5:
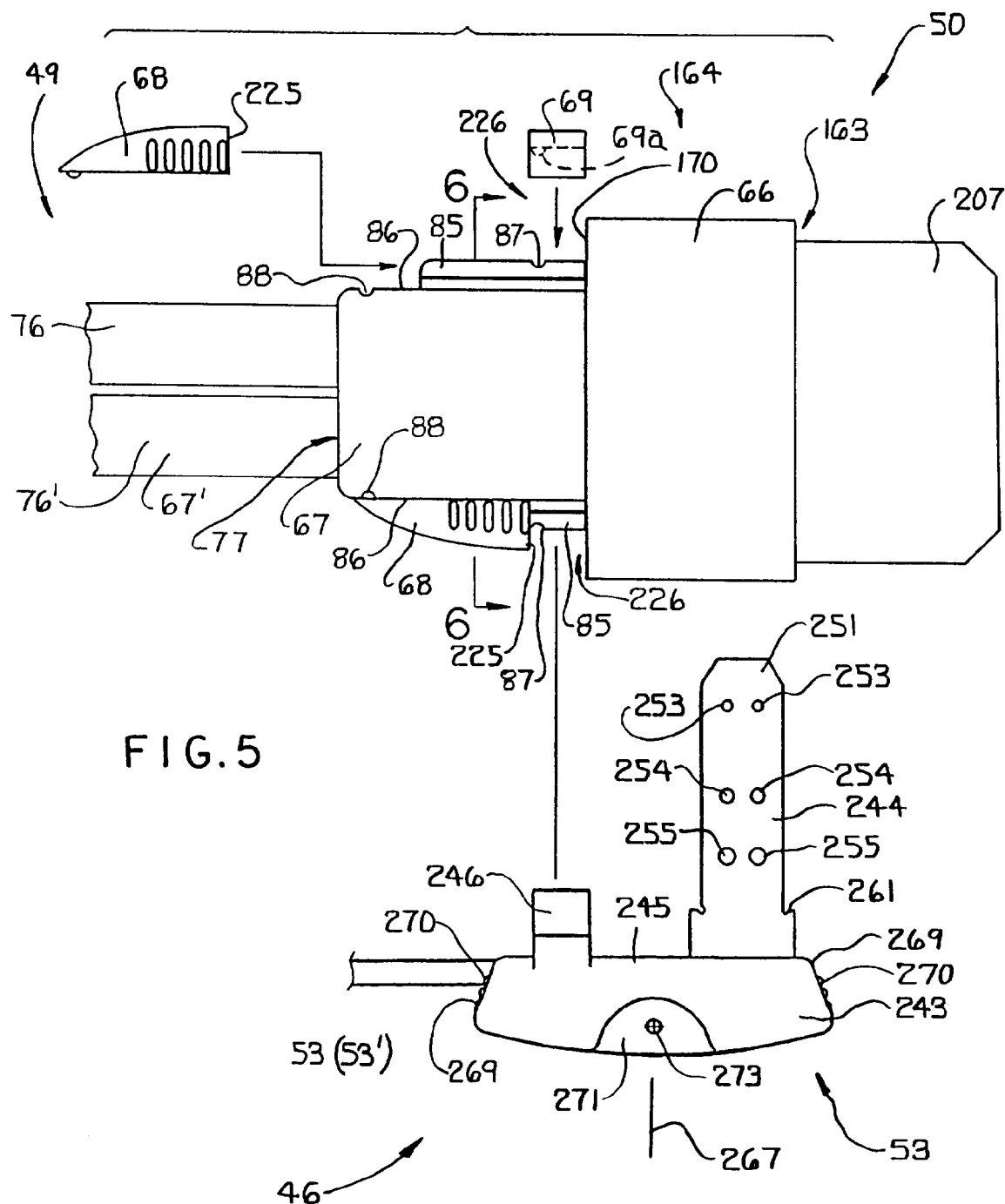
FIG. 5 is a fragmentary plan view of a connector unit on one end of a CDA.

More particularly, referring to FIGS. 4 and 5, each CDA 43 is formed of a number of modular components. In particular, each CDA 43 is constructed from a pair of housings 66, a plurality of parallel cable units or assemblies 67 or 67' having opposite ends connected to the housings 66, connector blocks 68 and a plurality and preferably three keying blocks 69. All of these components are assembled together to form the cabling 49 and the connector units 50 of each CDA 43.

Generally, each cable assembly or unit 67 or 67' defines at least one of the circuits therethrough, and a selected number of the cable assemblies 67 and 67' are plugged into the back end of the housing 66. The cable assemblies 67 and 67' extend through the housings 66 for releasable engagement with serially adjacent cable assemblies of a serially adjacent CDA 43.

The connector blocks 68 mount to the cable assemblies 67 and 67' to rigidly tie all of the cable assemblies 67 and 67' together, while the keying blocks 69 snap onto the cable assemblies 67 and 67' to provide support thereto and serve a keying function as defined in detail herein.

The following is a detailed description of each of the component parts of the CDA as well as a description of the tap module 46 and the wiring harnesses 41 (41').

Cable Assembly

Referring generally to FIGS. 6–9, each housing 66 is adapted to receive a plurality of the cable assemblies 67 and 67' therein so as to mechanically connect the cable assemblies 67 and 67' and the housing 66 together. Each cable assembly 67 or 67' includes a relatively flat plate-like contact plug 75 at the opposite ends of a length of flexible multi-conductor cable 76 wherein the plugs 75 are plugged into the housing 66. The cable 76 preferably has four twisted pairs of wires therein which serve to define at least one communication circuit and thus, the number of cable assemblies 67 and 67' determines the number of circuits being provided in each CDA 43.

The opposite ends of the cable 76 are fixedly connected to a molded plastic support section 77 of the plug 75. The forward end of the support section 77 is formed integrally with an engagement section 81 which plugs into the housing 66, and the engagement section 81 includes a contact unit 78 thereon that supports a plurality of parallel, horizontally extending electrical contacts 79. As described herein, the contacts 79 are electrically connected to the individual wires 94 of the cable 76.

Figure 21:
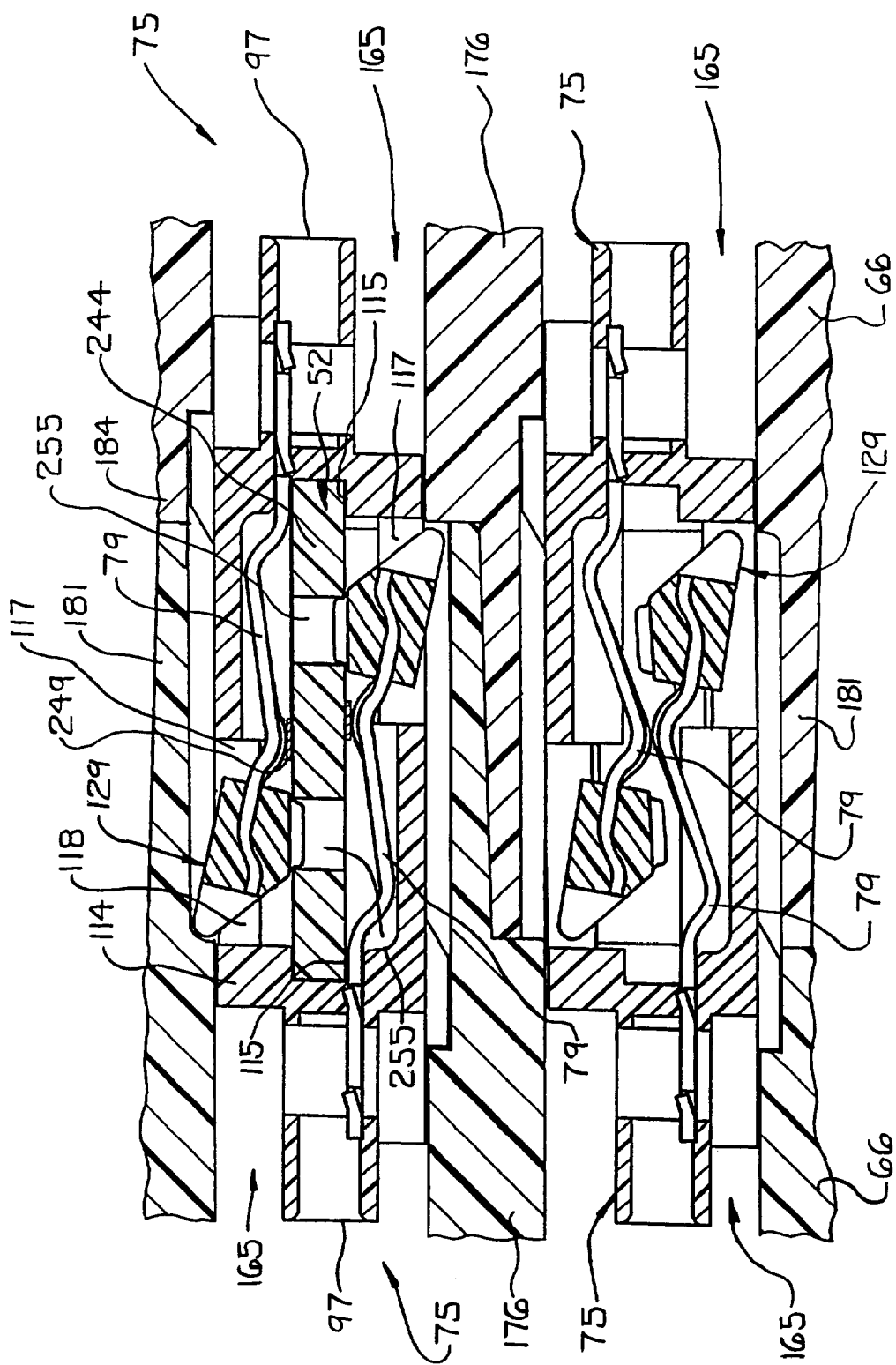
FIG. 21 shows the contact groups of FIG. 20 which are separated by a tap unit.
Figure 24A:
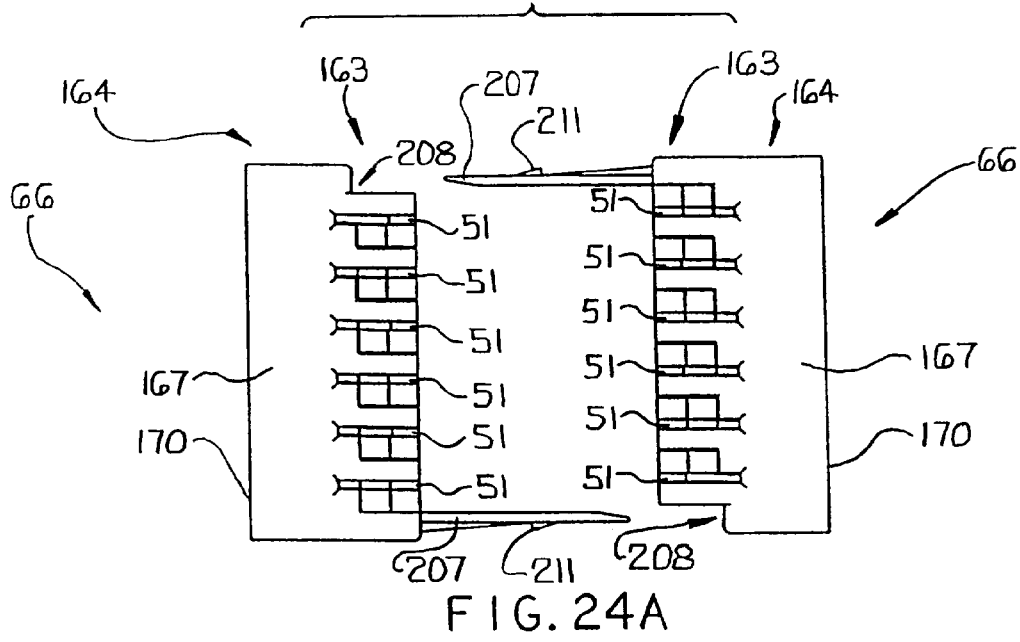
FIGS. 24A and 24B are respectively outer and inner side elevational views of two housings prior to being joined together.
Figure 24B:
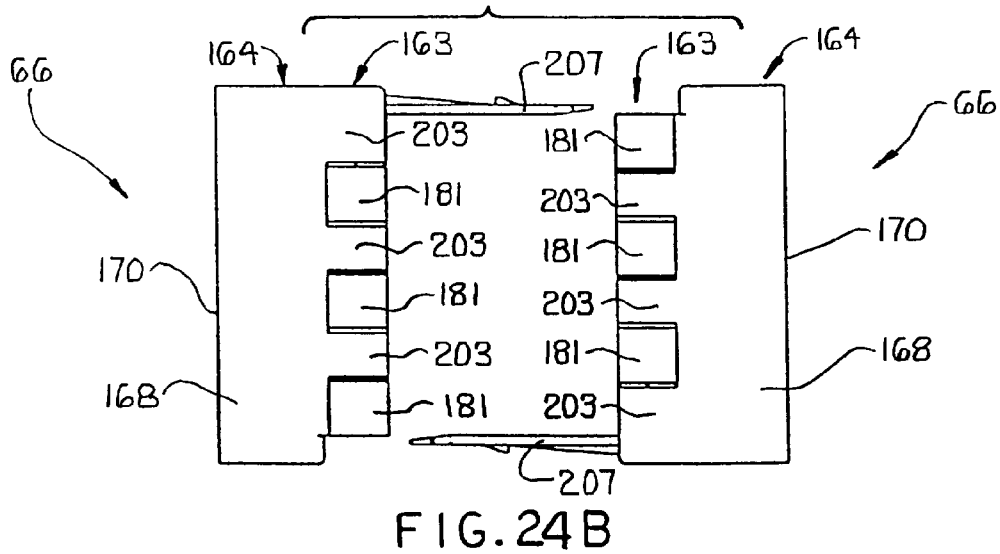
Figure 27:
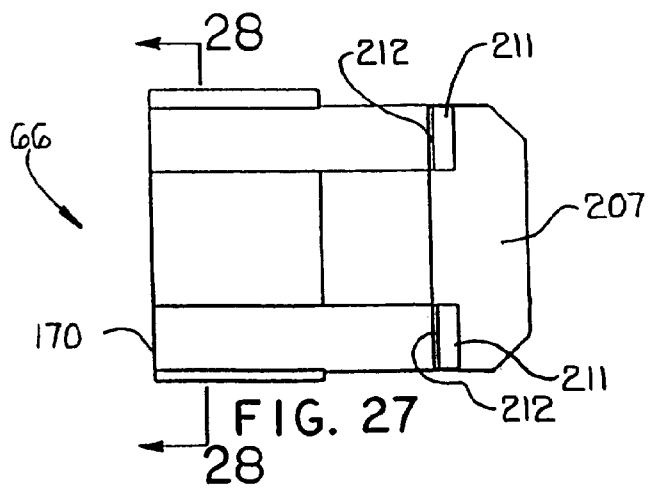
FIG. 27 is a bottom view of the left-side housing of FIG. 24A.

The plugs 75 at the opposite ends of each cable 76 or 76' are inverted relative to each other. As a result, the contacts 79 at one end of a cable face upwardly while the contacts 79 at the opposite end face downwardly. Thus, when two serially-adjacent connector units 50 are joined together, the respective contacts 79 of the units 50 are disposed in opposing contacting relation as generally seen in FIG. 21.

Figure 6:
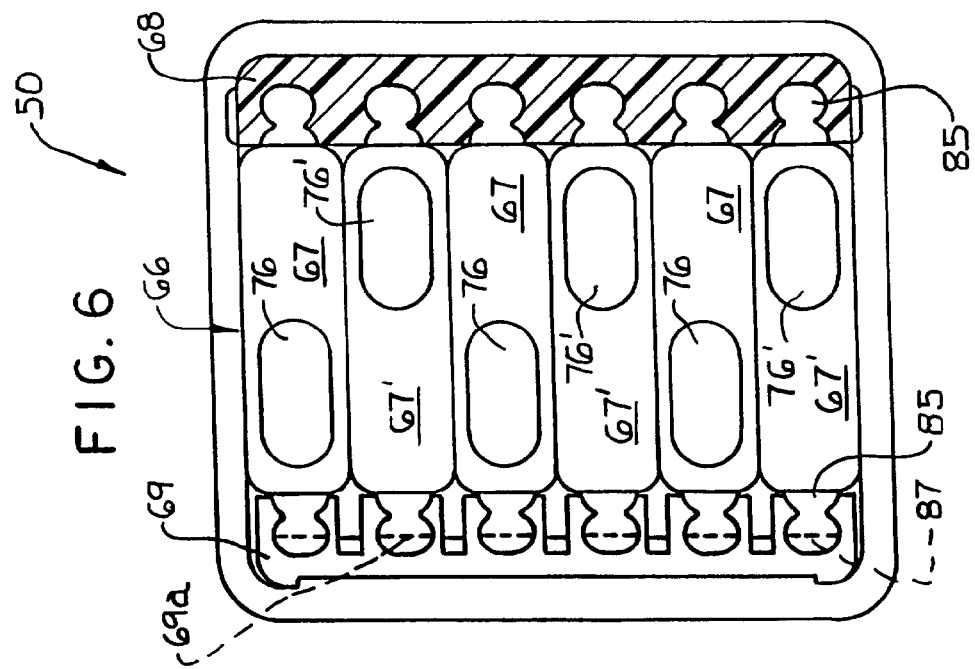
FIG. 6 is an end elevational view of the connector unit in cross-section as taken generally along line 6—6 of FIG. 5.
Figure 9:
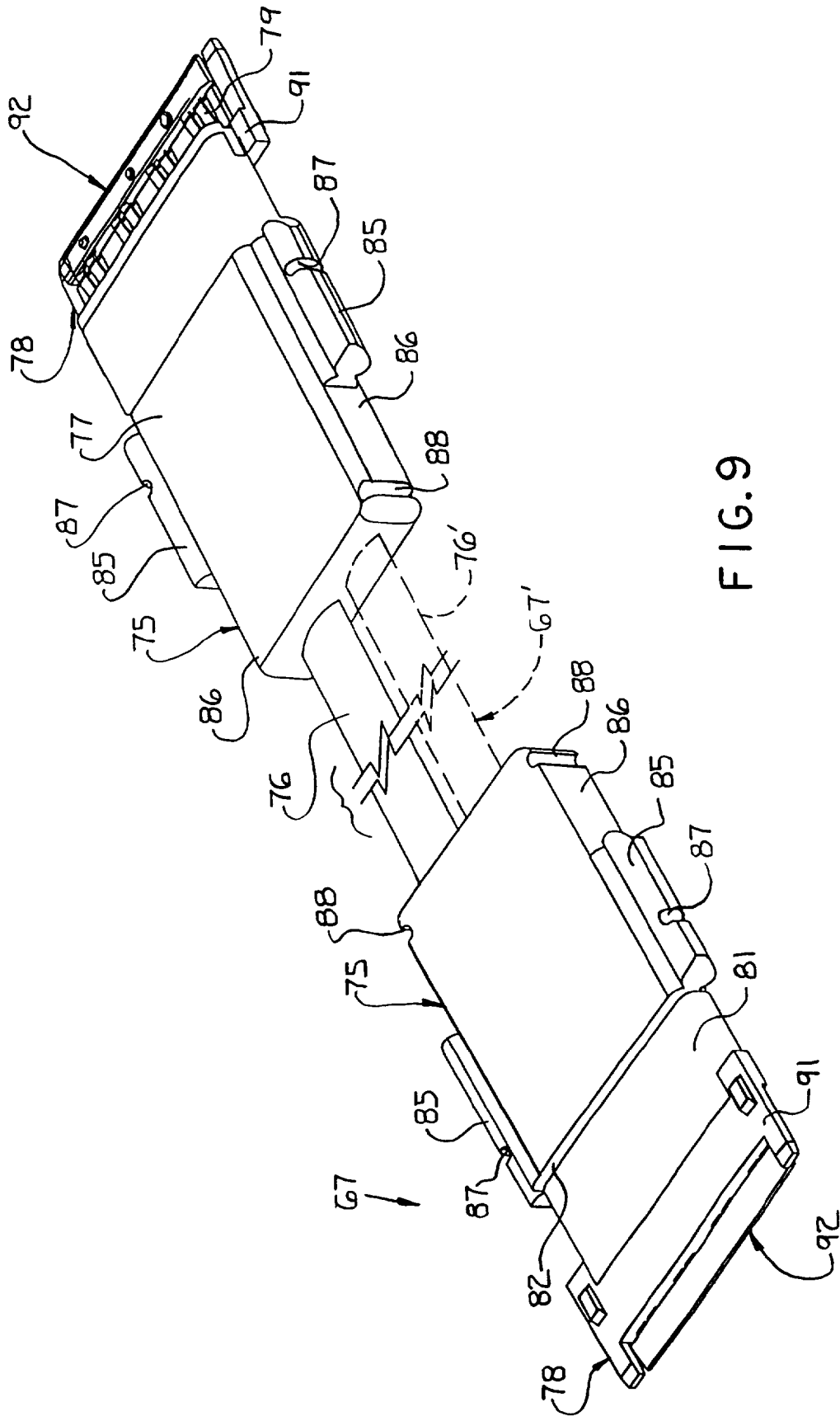
FIG. 9 is a perspective view of a cable assembly.

More particularly as shown in FIG. 6, the housing 66 preferably includes six cable assemblies connected thereto, namely three cable assemblies 67 and three cable assemblies 67'. The cable assemblies 67 and 67' are identical except that the cable 76 of the cable assembly 67 is disposed to the left of the longitudinal center line as seen in FIGS. 6 and 9, while the cable 76' (illustrated in phantom outline in FIG. 9) of the cable assembly 67' is disposed to the right of the longitudinal center line.

Figure 8:
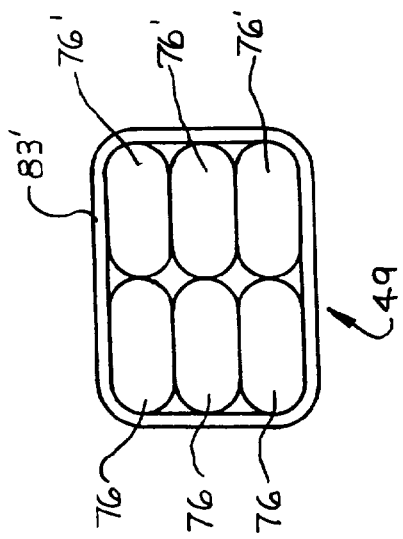
FIG. 8 is an end elevational view illustrating the individual cables of the CDA arranged in a parallel pair of stacks.
Figure 7:
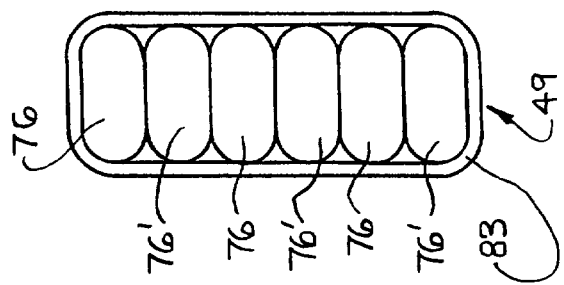
FIG. 7 is an end elevational view illustrating individual cables of a CDA arranged in a vertical stack.

With this staggered or offset arrangement of cables 76 and 76', the individual cables 76 and 76' can be moved vertically and sidewardly relative to each other. Thus, the elongate flexible middle sections of the cables 76 and 76' located between the plugs 75 can be pressed either into a single vertical stack of cables (FIG. 7) or into a pair of adjacent parallel stacks (FIG. 8). The group or bundle of cables 76 and 76' connected between the housings 66 thereby define the cabling 49 of each CDA 43. These two stacking arrangements provide flexibility in fitting the cabling 49 within the space requirements of each individual wall panel or other furniture arrangement.

To form the vertical stack of cables 76, 76' (FIG. 7), a generally rectangular strap 83 may be used which extends about the periphery of the bundle of cables 76, 76' and presses the cable 76, 76' horizontally together into the single vertical stack. The strap 83 has sufficient rigidity so as to maintain these cables 76, 76' in this arrangement.

An alternative strap 83' (FIG. 8) can also be provided which tends to press the cables 76, 76' in a vertical direction so that the left and right cables 76, 76' are pressed together into a parallel pair of cable stacks. This arrangement is wider but shorter than the single vertical stack (FIG. 7) and provides flexibility in routing the cables 76, 76' throughout the different size passages.

In each cable assembly 67 or 67', the individual wires of the cable 76 or 76' are first connected to the contacts of the contact unit 78, and thereafter plastic is over molded onto the wires 94 and the contact unit 78 such that the support section 77 and the engagement section 81 are integrally formed as a single plastic piece. As a result, the support section 77 also provides strain relief to the cable 76, 76' since each end of the cable is embedded in a support section 77.

Once the cable assemblies 67, 67' are connected to the housing 66 in an alternating vertically stacked relation, the support sections 77 thereof project exteriorly of the housing 66 in a generally vertical stack (FIG. 5 and 6). To provide rigidity to the connector unit 50, each of the support sections 77 includes a horizontally elongate rib 85 along opposite side edges 86. When the cable assemblies 67 are mounted in position, the ribs 85 extend away from the housing 66 approximately two-thirds of the horizontal length of the support section 77 and are oriented parallel to each other.

As shown in FIG. 6, the ribs 85 generally have an hourglass shape. Generally, the keying block 69 and the connector block 68 are slid forwardly thereon although the keying block 69 may be snap fit into engagement therewith if the connector block 68 is already secured in position. As described in more detail hereinafter with respect to the connector block 68 and the keying block 69, these components serve in part to rigidly connect all of the support sections 77 of the stack of cable assemblies 67, 67' together.

The ribs 85 also include a transverse notch 87 therein for the connection of the keying blocks 69. Still further, the side surface 86 of the support section 77 adjacent its rearward end includes a notch 88 rearwardly of the notch 87 for locking the connector block 68 in place.

The forward end of the support section 77 preferably includes the generally rectangular engagement section 81 which has a reduced width and thickness relative to the support section 77. The engagement section 81 is insertable into the housing 66, and is stepped at the juncture between the support section 77 and the engagement section 81 such that a forward facing stop surface 82 is defined therebetween. The forward facing surface 82 is disposed closely opposite to and may contact the housing 66 when the plug 75 is inserted therein.

The forward end of the engagement section 81 of the plug 75 further includes the contact unit 78 thereon. The contact unit 78 is generally formed from a plastic contact support or contact alignment body 91 and a contact assembly 92 which are joined together in cantilevered relation so as to permit flexing of the contact assembly 92 relative to the contact support 91. When the plug 75 is plugged into the housing 66, the contact support 91 therefore is slidably supported in the housing 66 while the contact assembly 92 is able to float vertically into and out of engagement with the corresponding contact assembly 92 of the serially adjacent CDA 43.

Figure 12:
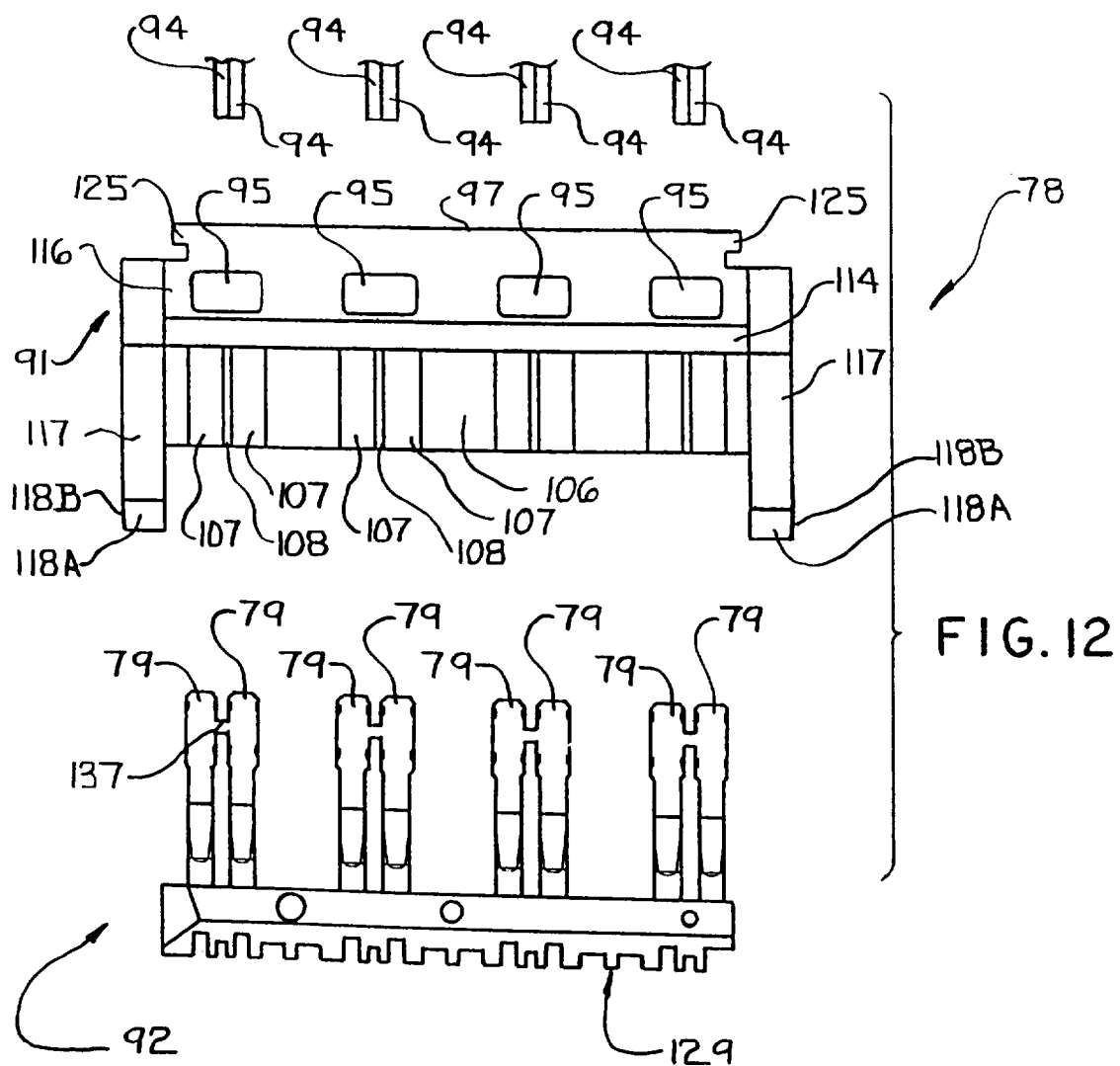
FIG. 12 is an exploded plan view of a contact support and a contact assembly prior to being joined together.

With respect to the contact support 91, the contact support 91 is generally U-shaped as seen in FIG. 12, and is connected to the engagement section 81 during the over molding process as will be described herein.

Figure 13:
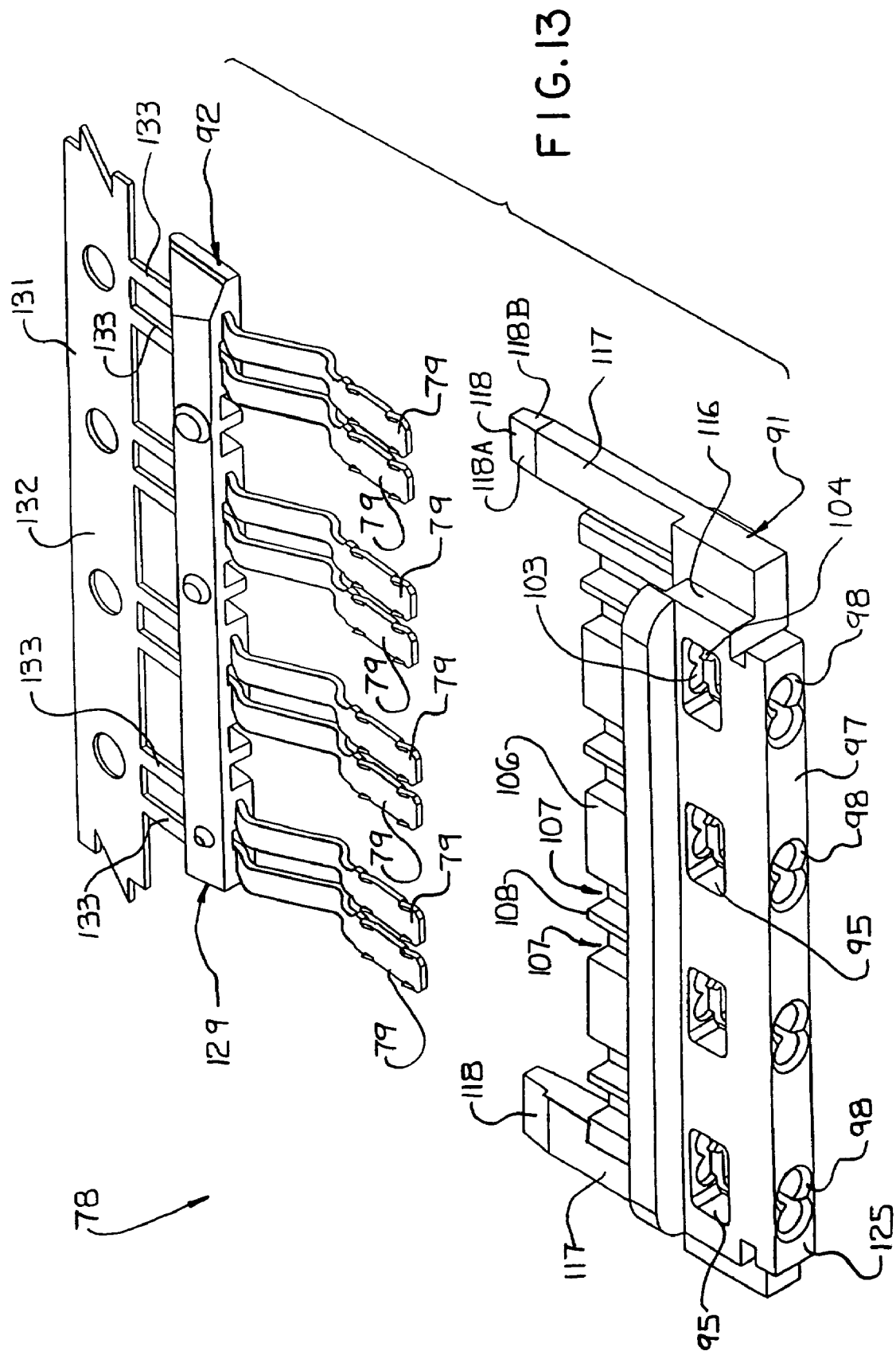
FIG. 13 is a perspective view of the components of FIG. 12 illustrating an additional contact carrier joined to the contact assembly.
Figure 14:
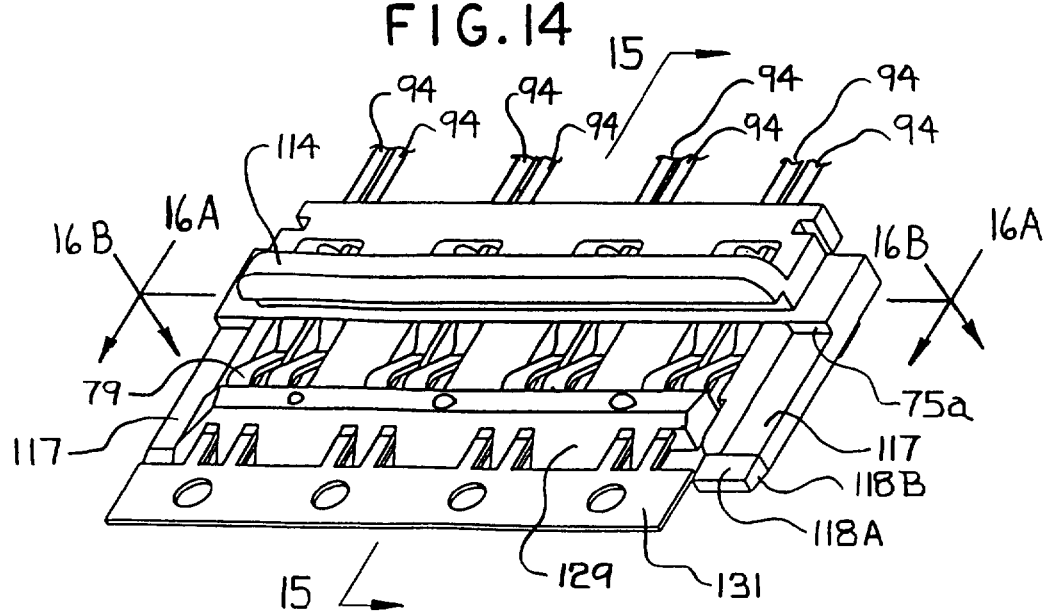
FIG. 14 is a front perspective view of the components of FIG. 13 assembled together.

Referring to FIGS. 12–14, the contact support 91 serves to support the contact assembly 92 while providing for the connection of the cable 76 thereto. In particular, the four twisted pairs of wires or conductors 94 of the cable 76 extend through the length of the contact plug 75 and into one side of the contact support 91. The contact assembly 92 inserts into the opposite side of the contact support 91 until the conductors 94 are positioned adjacent thereto so as to be electrically connected thereto, such as by ultrasonic welding.

More particularly, the contact support 91 includes four welding ports 95 which extend vertically through the entire thickness of the contact support 91. Ultrasonic welding equipment therefore can be inserted into these welding ports 95 from above and below the contact support 91 for electrically connecting the conductors 94 to the contact assembly 91.

Figure 16A:
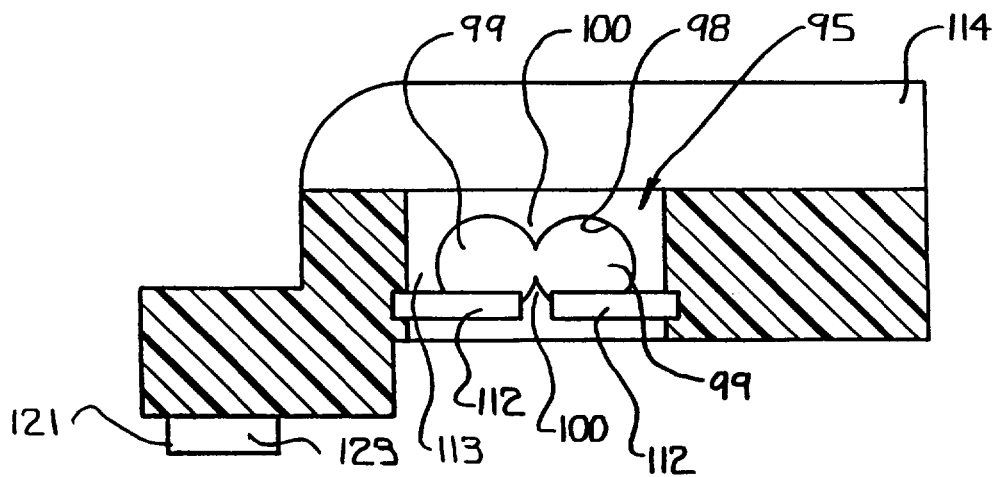
FIG. 16A is an enlarged cross sectional view of the contact support in cross section as taken generally along line 16A—16A of FIG. 14.

To permit insertion of the conductors 94 into these welding ports 95, a rear face 97 includes four passages 98 which pass horizontally into respective welding ports 95. As seen in FIG. 16A, each conductor passage 98 preferably has two generally side-by-side partially-circular orifices 99 which define upwardly and downwardly extending peaks 100 therebetween. While the insulation of each pair of conductors 94 is joined together, the peaks serve to orient each pair of conductors 94 so as to be relatively flat.

The passage 98 also includes a portion or bore 103 on the forward side of the welding port 95 such that the terminal end of the conductor 94 is seated therein while a portion of the conductor 94 spaced away therefrom is accessible through the welding port 95. An additional peak 104 (FIG. 13) is disposed adjacent to the passage portion 103 to maintain the distal ends of the conductors 94 separated.

Figure 15:
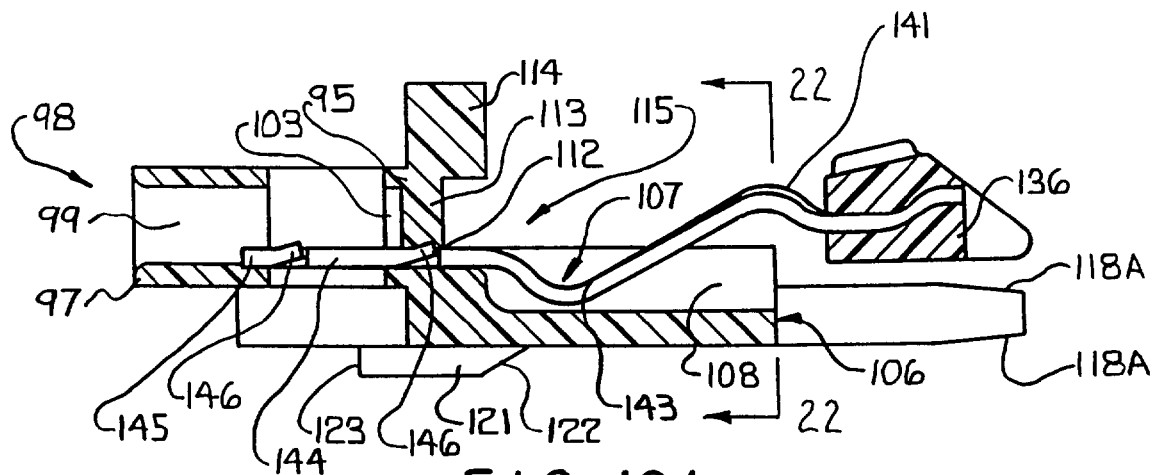
FIG. 15 is an enlarged cross-sectional view of the contact support and contact assembly as taken generally along line 15—15 of FIG. 14.
Figure 16B:
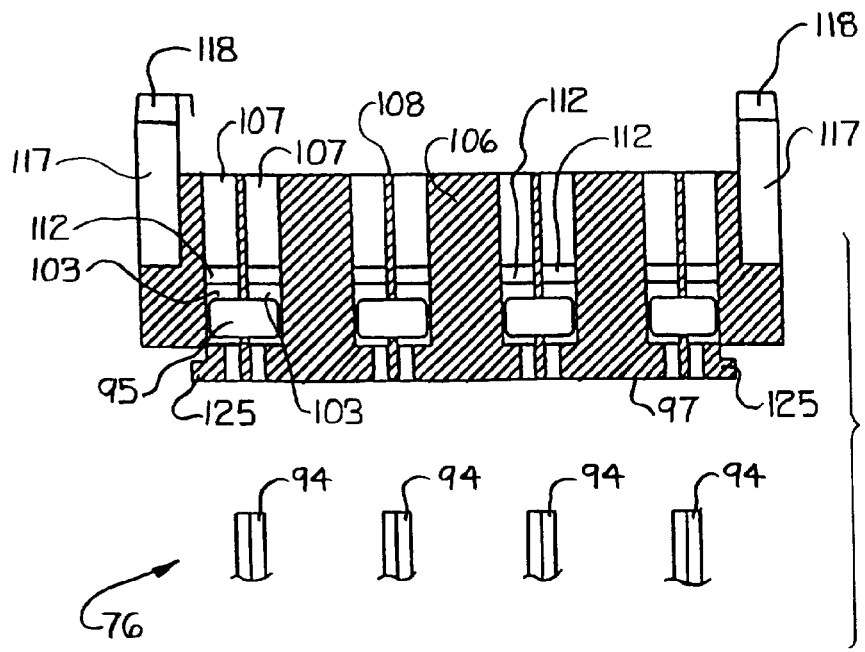
FIG. 16B is a top cross-sectional view of the contact support as taken generally along line 16B—16B of FIG. 14.
Figure 17:
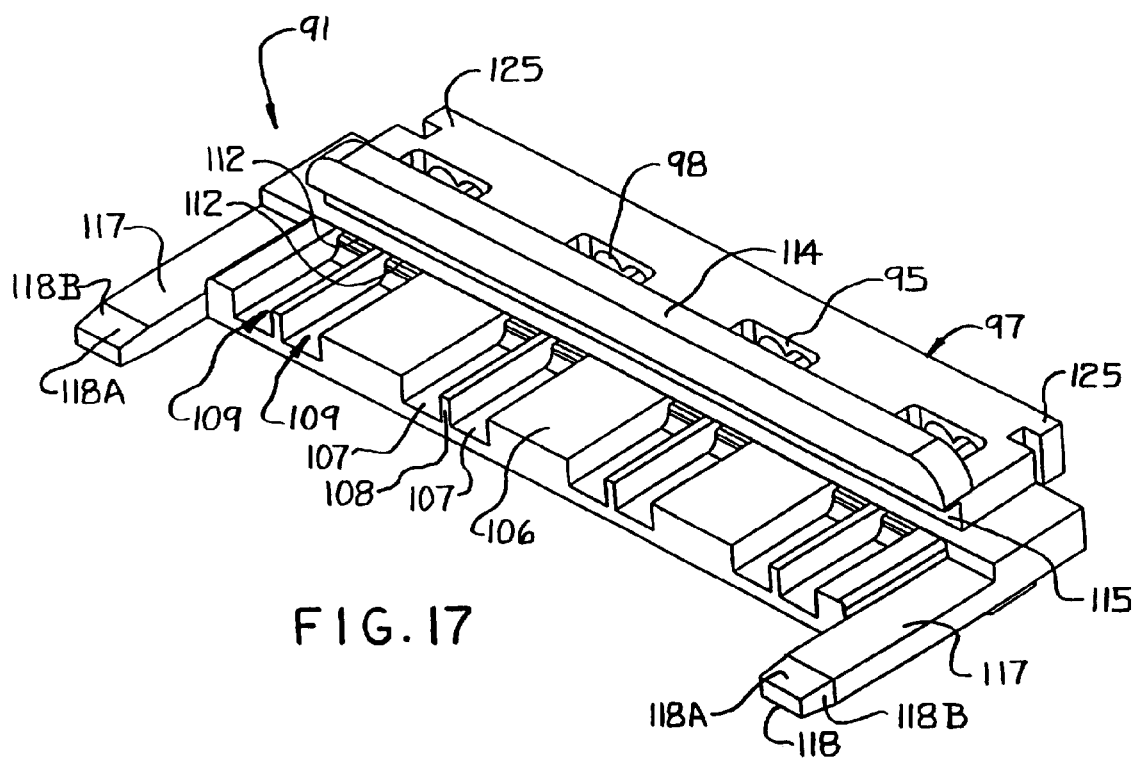
FIG. 17 is a perspective view of the front leading end of the contact support.

As seen in FIGS. 12, 13 and 17, the leading edge of the contact support 91 includes a channel section 106 having four pairs of horizontal, upward-opening channels 107 wherein each pair of channels 107 is separated by an upstanding dividing wall 108 disposed therebetween. The channels 107 have an open front end 109 and the opposite end of the channel 107 is substantially enclosed except for slot-like passages 112 (FIGS. 15 and 16B) which extend rearwardly through an intermediate wall 113 (FIG. 15). These passages 112 open into the welding ports 95 so as to permit insertion of the contact assembly 92 into the welding ports 95 adjacent to the conductors 94.

The intermediate wall 113 projects upwardly an additional distance to define an overhanging flange 114. The flange 114 also projects forwardly to define a transverse guide slot 115 (FIG. 15) which opens transversely and forwardly for receiving a side edge of the tap unit 240 as will be described herein as seen in FIG. 21.

The flange 114 also defines a sideward facing stop surface 116 (FIG. 13). The stop surface 116 limits insertion of the tap unit 240.

The contact support 91 further includes generally rectangular prongs or extensions 117 which extend forwardly beyond the channel section 106 and have a reduced thickness relative thereto. The prongs 117 serve to guide sliding of the contact support 91 into the housing 66 as described herein, and also protect the contacts 79 disposed sidewardly therebetween.

The prongs 117 have tapered ends 118. In particular, the tapered ends 118 include tapered upper and lower surfaces 118A and tapered side surfaces 118B all of which converge in a forward direction such that the surfaces 118A facilitate vertical positioning while the side surfaces 118B facilitate lateral positioning relative to the housing 66. As described herein, the prongs 117 are adapted to slide into and guide the insertion of the contact support 91 into the housing 66.

The bottom surface of the contact support 91 further includes a pair of downwardly projecting locking tabs 121 (FIGS. 15 and 16A) which have an inclined front surface 122 and an abrupt step 123 on the rear side thereof. The inclined front surface 122 facilitates sliding of the contact support 91 into the housing 66, while the step 123 snap-lockingly slides over a corresponding step to prevent withdrawal of the contact support 91 from the housing 66.

To strengthen the connection between the contact support 91 and the engagement section 81 during the over molding process, the rear face 97 includes sidewardly projecting flanges 125 (FIG. 12). When the engagement section 81 and the support section 77 are molded, the mold material, which preferably is a plastic, flows around the flanges 125 as well as around and into the welding ports 95 such that the engagement section 81 and the contact support 91 are fixedly joined together.

With respect to the contact assembly 92 (FIGS. 12, 13 and 15), a plurality and preferably four pairs of the elongate electrically conductive contacts 79 are formed in side by side relation and rigidly joined together at the forward ends thereof by a contact opening device 129.

Referring to FIGS. 12–15, the individual contacts 79 initially are formed from a sheet of copper material so as to provide the general outline and shape of the individual contacts 79. At this time, a group or set of the individual contacts 79 remain temporarily connected to a contact carrier 131 on the front end thereof. The contact carrier 131 is removed or broken off once the contact opening device 129 is molded onto the ends of the individual contacts 79.

More particularly, the contact carrier 131 includes a horizontal flat crosspiece 132 and a corresponding plurality of rearwardly-extending support pieces 133, the rear portions of which are formed and shaped into the contacts 79. The contact carrier 131 is used to hold the contacts 79, and thereafter the plastic contact opening device 129 is formed onto the distal ends of the individual contacts. The contact carrier 131 projects forwardly from a front face 136 of the contact opening device 129. Once the contact opening device 129 is formed, the contact carrier 131 is broken off of the contacts 79 with the individual contacts 79 continuing to be supported and separated in parallel relation with each other by the contact opening device 129.

As shown in FIG. 12, when the contacts 79 are being formed, an additional cross link 137 is provided between each adjacent pair of contacts 79 although the cross link 137 is thereafter removed after molding of the contact opening device 129 so as to electrically separate the contacts 79. The contacts 79 after removal of the cross link 137 are illustrated in FIG. 13.

Figure 20:
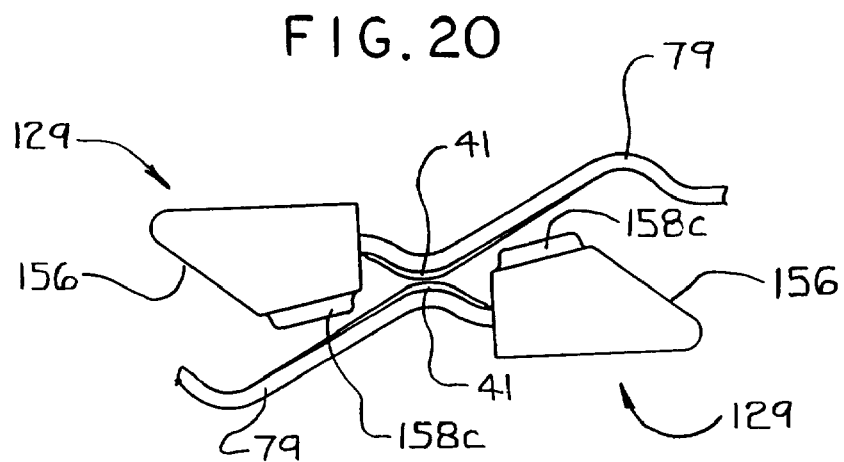
FIG. 20 is an enlarged fragmentary side elevational view of two contact groups disposed in contact with each other when serially adjacent connector units of two adjacent CDAs are joined together.
Figure 22:
FIG. 22 is an enlarged cross-sectional view of a contact as taken along line 22—22 of FIG. 15.

Referring to FIGS. 12, 13 and 15, each contact 79 is generally S-shaped when viewed from the side so as to define a convex contact area 141 on an upper peak thereof. This contact area 141 is adapted to abut against a corresponding contact of a serially adjacent CDA 43 as illustrated in FIG. 20. To provide point-to-point contact between the opposing contact areas 141 (FIG. 20), the contact area 141 not only convexly curves when viewed from the side but also has a convex curvature across the width of the contact 79 as shown in FIG. 22. Preferably, the contact area 141 has a nickel and gold plating applied thereto.

Each pair of contacts 79 is spaced apart a sufficient distance so as to provide one hundred ohm impedance while also minimizing "cross-talk" between the contacts 79.

As seen in FIGS. 15 and 21, each contact 79 further includes an additional curved section 143, and a rearwardly extending linear section 144 which is slidably fitted into the corresponding slot-like passages 112 of the contact support 91. In particular, the linear section 144 is slid rearwardly through the passages 112 into the area of the welding ports 95 and is positioned directly adjacent to the conductors 94. As a result, a set and preferably, four pairs of the contacts 79 are supported by the contact support 91 in cantilevered relation therewith and are free to flex vertically. The contacts 79 and the respective conductors 94 are thereafter connected together, preferably by ultrasonic welding wherein the prongs of a welding unit are inserted vertically through the opposite open ends of the welding ports 95.

To provide frictional engagement of the contact 79 with the contact support 91, the linear section 144 further includes a spaced apart pair of pointed barbs 145 on each opposite edge 146. The barbs 145 embed within the plastic of the contact support 91.

The forward ends of the contacts 79 are joined together by the contact opening device 129 (FIGS. 15, 18A and 18B) so as to generally move or float vertically together. In particular, the forward ends 149 of the contacts 79 extend through the passages 150 formed through the contact opening device 129 during molding thereof. Each passage 150 opens through the front face 136 which said front face 136 is defined by a forward opening slot 151. The slot 151 is provided to permit downward bending of the contact carrier 131 to break the contact carrier 131 off of the contacts 79. The contact opening device 129 is relatively thin to permit flexing across its transverse width. Thus, while the set of contacts 79 moves generally together, the contact opening device 129 can flex to ensure that each contact 79 is pressed vertically into complete engagement with an opposing contact 79. Thus, if there are variations in the shape of the contacts 79, some relative vertical movement between sidewardly adjacent contacts 79 is permitted.

During the connection of two serially adjacent connector units 50, the contact alignment bodies 129 as seen in FIGS. 20 and 21 move longitudinally toward and into contact with each other and cause vertical deflection of the contacts 79 near the contact support 91 to permit the contact alignment bodies 129 to pass by each other. When the housings 66 of the two connector units 50 are fully engaged, the contact areas 141 of the two sets of opposing contacts 79 are disposed in contacting relation as seen in FIGS. 20 and 21. To facilitate the deflection of the contacts 79, each contact opening device 129 includes an inclined front face 156 which causes the contact alignment bodies 129 to deflect vertically during their forward engaging movement.

Figure 19:
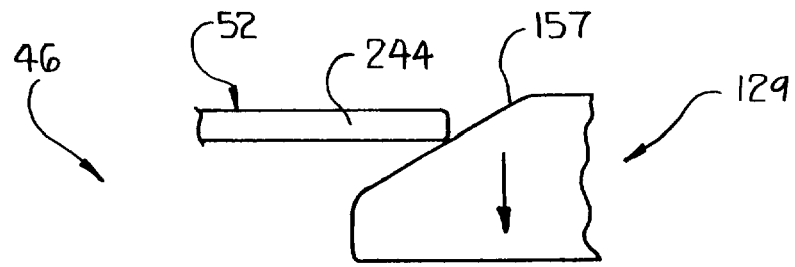
FIG. 19 is an enlarged fragmentary end elevational view of a tapered end of the contact alignment body and a tip of a tap unit.

The contact opening device 129 also serves to open or separate the contacts 79 upon the insertion of the tap module 46. In particular, an inclined end surface 157 is provided and is adapted for contact with the tap module 46 as will be described herein. Generally, the tap module 46 contacts the inclined surface 157 as seen in FIG. 19 and deflects the contacts 79 downwardly.

The contact alignment body also includes small, medium and large dimples 158a, 158b and 158c along the top surface thereof which maintain the contacts 79 in spaced relation from the tap module 46 until the tap module 46 is fully inserted as seen in FIG. 21. As a result, the tap module 46 serves to separate opposing sets of contacts 79 so as to disconnect the opposing contacts 79 from each other. An upstream set of the contacts 79 is electrically connected to the tap module 46 while the downstream set of contacts 79 is disconnected such that the associated circuit is dead downstream of the tap module.

With the above-described arrangement, the contacts 79 are electrically connected to the individual conductors of the cable 76. Preferably, the cables 76 and 76' and more specifically, the four twisted pairs of conductors 94 define a single circuit which, for example, may carry voice or data signals. These four twisted pairs of conductors 94 also may define a plurality of circuits, or additional conductors 94 may be provided for defining additional circuits or defining a single circuit with an increased amount of conductors. Once the cable assemblies 67 and 67' are mounted in the housing 66, the contacts project through the housing 66 so as to connect to corresponding contacts 79 of a serially adjacent CDA 43. When two sets of serially adjacent contacts 79 are connected together, each circuit passes through the joined connector units 50. If the tap module 46 is provided, the two sets of serially connected contacts 79 are separated such that the tap module 46 itself becomes connected to the circuit while the CDA 43 downstream of the tap module 46 is disconnected therefrom.

Housing

Referring generally to FIGS. 23–27, each housing or shield 66 is formed identical so as to be usable at either end of the elongate CDA 43. The housing 66 can be used in one position at one end of the CDA 43 or inverted for use on the opposite end thereof. Since the plugs 75 at the opposite ends of a cable assembly 67 or 67' are also inverted, the housing 66 can be connected to the cable assembly 67 or 67' in either orientation.

Generally, the front end of the housing 66 defines an engagement section 163 for engagement with a serially adjacent housing of another CDA 43. The back end of the housing 66 opposite the engagement section 163 defines a mounting section 164 which opens rearwardly for mounting the cable assemblies 67 and 67' thereto.

Figure 25:
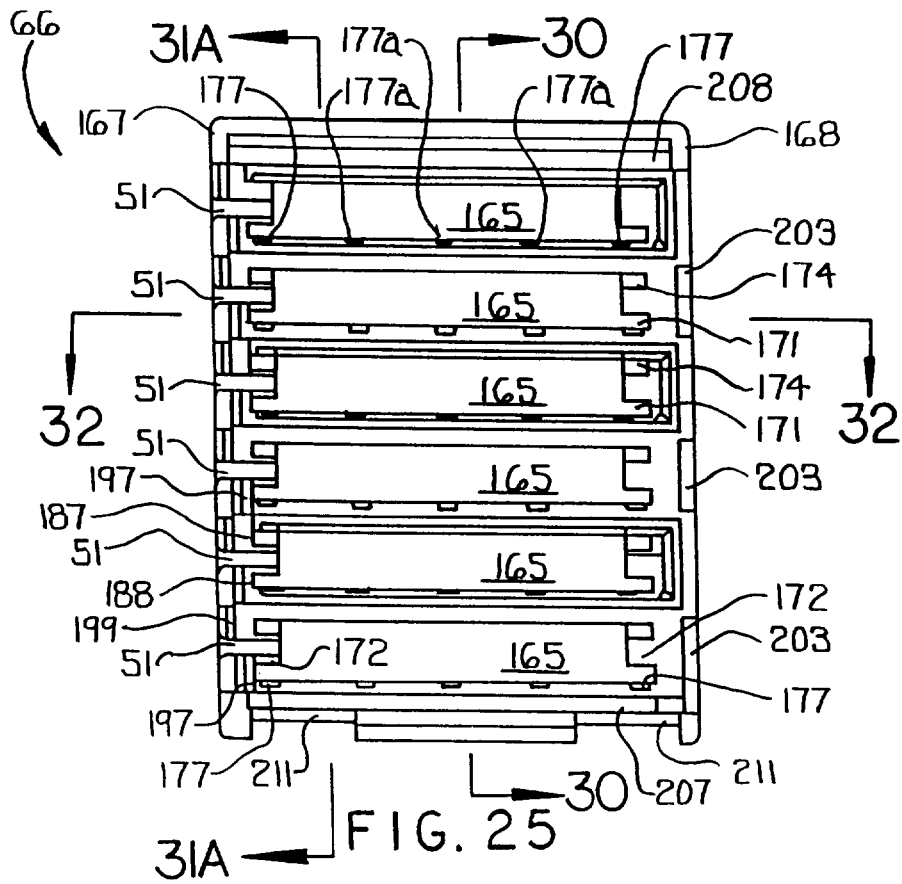
FIG. 25 is an elevational view of a front end of the housing.
Figure 26:
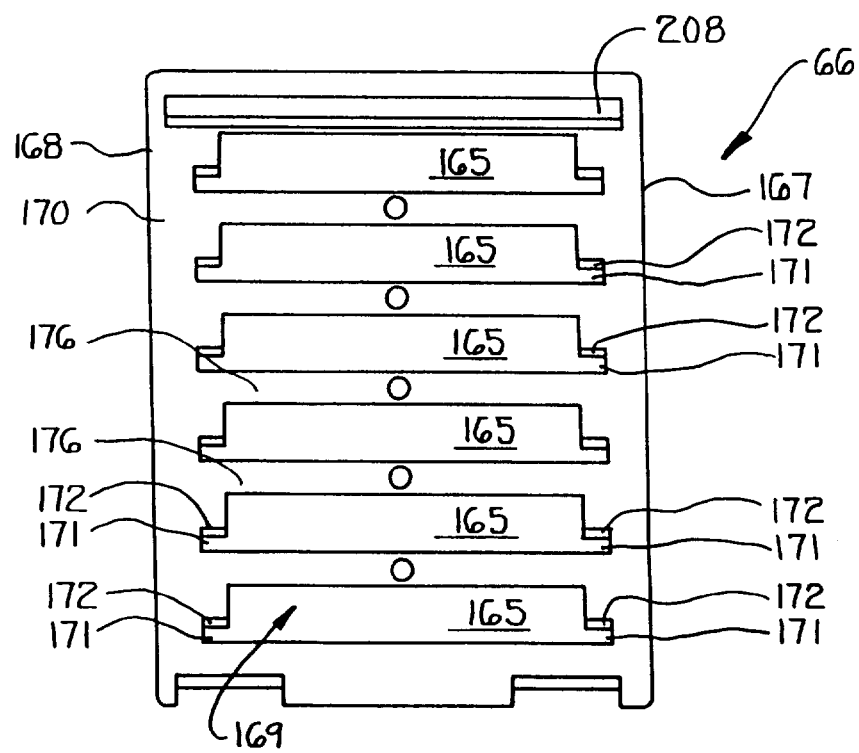
FIG. 26 is an elevational view of a back end of the housing.

As shown in FIGS. 25 and 26, each housing 66 opens horizontally therethrough and includes a plurality of mounting sites. Preferably, each housing 66 includes a plurality of horizontal passages 165 which are vertically spaced apart and pass entirely through the housing 66. The passages 165 permit the plug 75 of a cable assembly 67 or 67' to be inserted into the mounting section 164 and through the housing body so that it projects into the engagement section 163. Thus, each of the passages 165 defines a mounting site. The contact assembly 92 therefore projects forwardly from the engagement section 163 as seen in phantom outline in FIG. 30 so as to connect to an opposing contact assembly 92 of a serially adjacent CDA 43.

To provide access to the contact assemblies 92, an outer access side 167 of the housing 66 which faces outwardly includes a plurality and preferably six of the access ports 51, each of the access ports 51 being associated with at least one circuit as defined by the cable assembly 67 or 67' which is disposed adjacent thereto. Accordingly, each access port 51 permits access to the contact assembly 92 of a circuit. Thus, when two housings 66 are joined together, one access port 51 is provided adjacent to the contacts 79 of each circuit so as to permit the tap module 46 to be engaged with a selected one of the circuits defined by the CDA 43.

More particularly with respect to the housing 66, the housing 66 is molded as a single-piece component. Preferably, the material of the housing 66 is a molded plastic having stainless steel fibers embedded therein such that the housing 66 functions as a shield for the contacts 79. The back end of the housing 66 is a generally rectangular shape which defines the plug passages 165 extending horizontally therethrough. Each passage 165 has an opening 169 through the back end face 170 wherein each passage 165 effectively defines a socket which receives one of the plugs 75 of a cable assembly 67 or 67' therein.

Each opening 169 has a horizontally elongate rectangular shape with additional side grooves 171 being provided which are adapted to receive the prongs 117 of the plug 75 therein. Each plug 75 thereby is able to be slid into a respective opening 169. The tapered ends 118 of the prongs 117 serve to guide the prongs 117 into the corresponding side grooves 171 as the plug 75 is inserted into the respective passage 165.

Each housing 66 preferably has six of the openings 169 arranged vertically one above the other so as to accommodate six cable assemblies 67, 67'. Where each cable assembly 67, 67' defines one circuit, each housing 66 thereby has a six-circuit capacity, although less than six cable assemblies can still be inserted into the openings 169 if desired. The size of the housing 66 can be modified to accommodate more or less openings 169 or mounting sites which thereby increases or decreases the number of circuits which can be passed through the housing 66.

Figure 34:
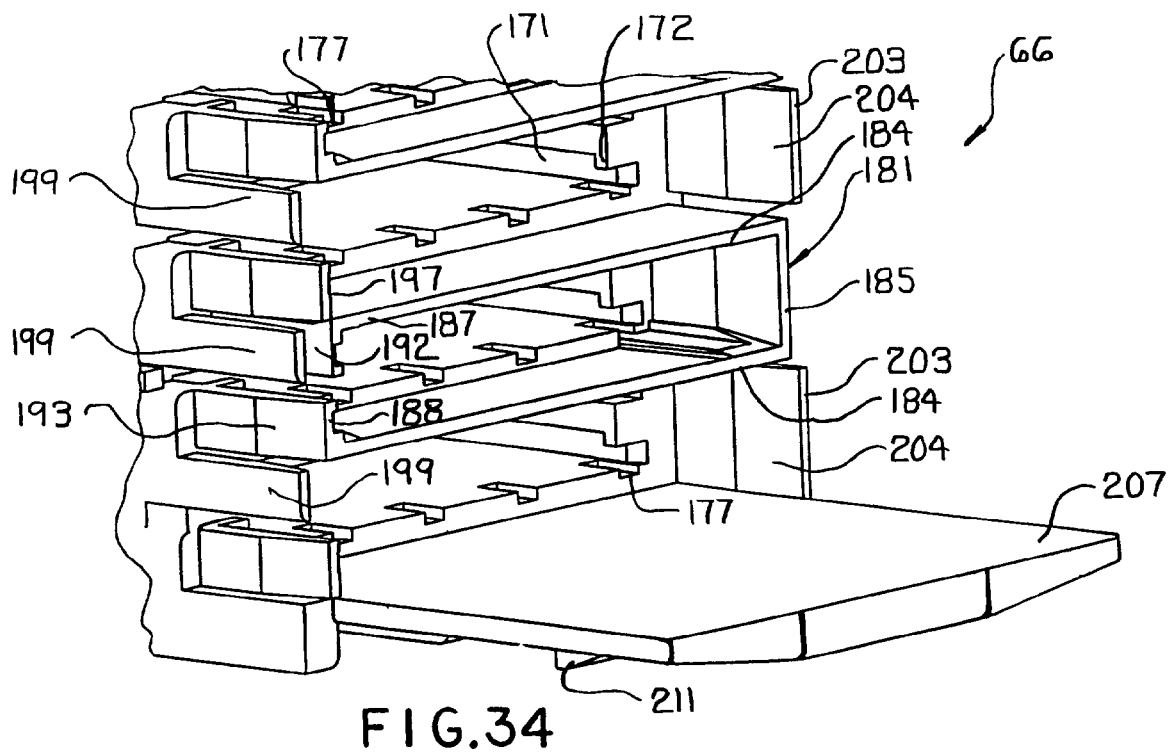
FIG. 34 is an enlarged, fragmentary perspective view of the bottom of the housing.

More particularly with respect to the arrangement of each passage 165, each passage 165 extends entirely through the housing 66 as seen in FIGS. 30 and 34. The side grooves 171 are formed in the side face of the passage 165 and include opposite open ends which open from the back and front ends of the housing 66. The front end of the side groove 171 further includes a stop 172.

During insertion of the contact plug 75 into the housing 66, the prongs 117 slide into the side grooves 171 through the opening 169 and are able to project forwardly from the front ends of the side grooves 171 as generally seen in phantom outline in FIG. 30. The front ends of the prongs 117 thereby are supported by the housing 66. The stop 172 formed in the side groove 171 serves to abut against an opposing surface 75a (FIG. 14) on the contact plug 75 so as to limit insertion thereof and precisely position the contact plug 75.

The side surface of each passage 165 also includes a short side groove 174 disposed vertically above but parallel to the side grooves 171 as seen in FIG. 30. This short side groove 174 aligns with a corresponding side groove of a serially-adjacent housing 66, and is adapted to receive the tapered end 118 of the prongs 117 of a plug 75 which is disposed in the serially-adjacent housing 66 when two housings 66 are mated together.

As shown in FIGS. 25 and 28–30, the passages 165 are separated vertically one from the other by horizontal dividing walls 176. Accordingly, the passages 165 preferably define discreet mounting sites for the individual cable assemblies 67. The dividing walls 176 also could be omitted since the mounting sites could be defined by the side grooves 171.

To lock the contact plug 75 within the housing 66, each dividing wall 176 includes a recess 177 directly below each stop 172. When the contact plug 75 is fully inserted into the housing 66, the locking tabs 121 on the bottom surface thereof slide past the recess 177 until the rear stepped face 123 abuts against the recess and prevents inadvertent withdrawal of the cable assemblies 67. Additional recesses 177a also are provided in each passage 165 in the event that additional tabs 121 are provided.

As shown in phantom outline in FIG. 30, when the cable assemblies 67 and 67' are joined to the housing 66, the cable assembly 67 or 67' on one housing 66 is inverted relative to the cable assembly 67 or 67' on the other housing. As a result, the individual contact areas 141 of each of the separate electrical contacts 79 are disposed in opposing relation with the corresponding contacts of a serially adjacent CDA 43 as seen in FIGS. 20 and 21. These contact areas 41 normally are disposed in contact with each other such that the respective circuit continues through the housings 66 when joined together.

To protect and shield the contact assemblies 92 of the cable assemblies 67, 67', each housing 66 includes rectangular shrouds 181 which extend forwardly from alternate passages 165. Referring to FIGS. 23A, 25 and 30, the housing 66 preferably has three shrouds 181 which extend forwardly from the front edges of the passages 165.

When two housings 66 are disposed in an inverted relation as illustrated in FIG. 30, the shrouds 181 of one housing 66 are adapted to fit into the open areas 182 defined between the shrouds 181 of a serially adjacent housing 66. Thus, when two housings 66 are joined together, each of the six contact assemblies 92 of one housing 66 ultimately is shielded by a shroud 181 of either the housing 66 in which the contact assembly 67 is supported or the other housing 66 which is mated thereto.

Figure 35:
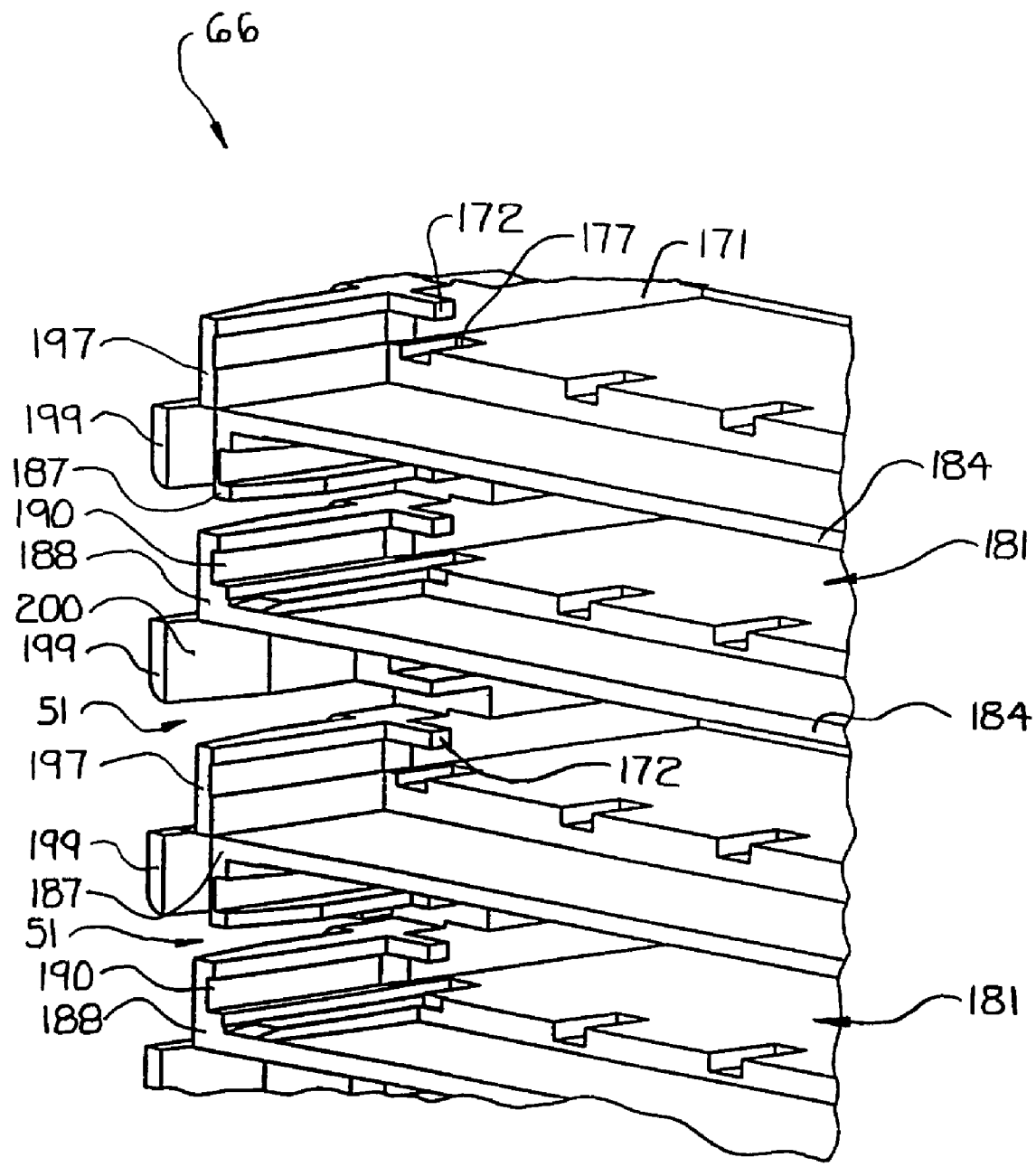
FIG. 35 is an enlarged, fragmentary perspective view of the housing.

Each shroud 181 includes a vertically spaced pair of horizontal walls 184 which define the top and bottom of the shroud 181, and an inner wall 185 which extends vertically therebetween. The outer side of the shroud 181 includes upper and lower outer wall sections 187 and 188 respectively. The upper wall section includes a groove 189 which forms an extension of the side groove 174 of the passage 165. The lower wall section 188 similarly includes a groove 190 which is an extension of the side groove 171. These grooves 189 and 190 therefore support the prongs 117 of two opposing cable assemblies 67 or 67' when two housings 66 are joined together. The upper and lower wall sections 187 and 188 are vertically spaced apart so as to define one of the access ports 51 (FIGS. 25, 33 and 35).

Figure 33:
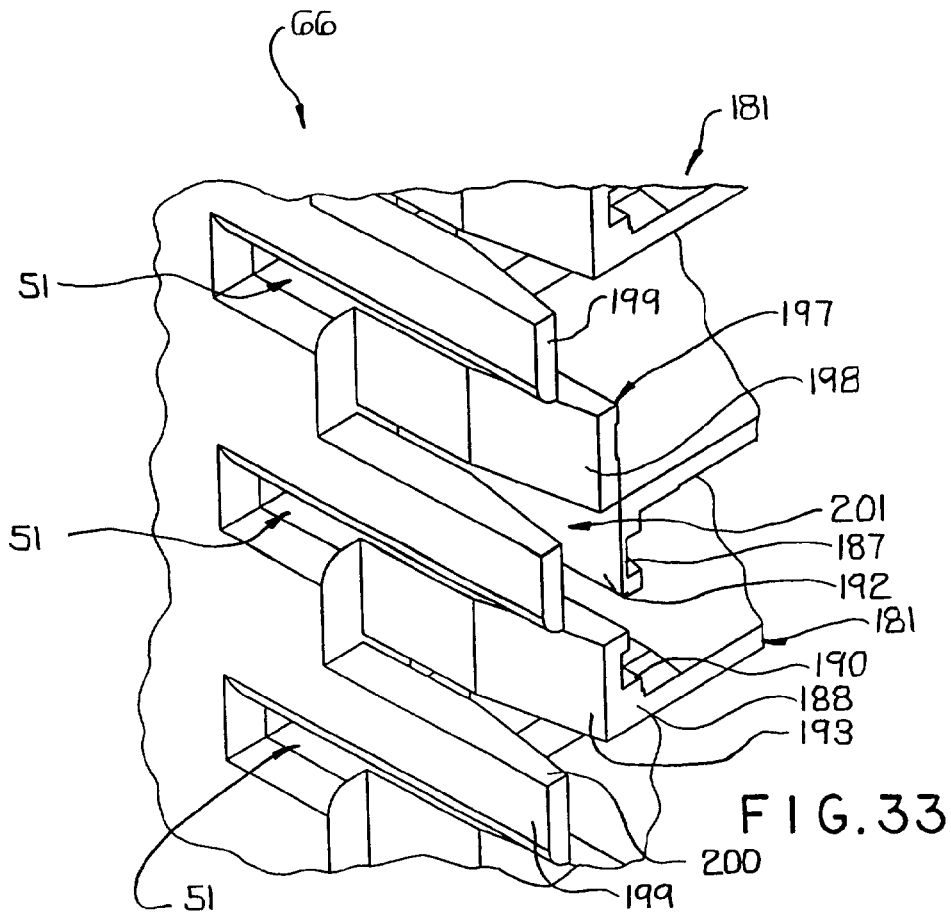
FIG. 33 is an enlarged, fragmentary perspective view of the outer side of the housing.

To facilitate the connection of two housings 66, the lower wall section 188 has a greater horizontal thickness than the upper wall section 187 so that the respective outer faces 192 and 193 thereof are offset sidewardly relative to each other as seen in FIGS. 25 and 33. The housings 66 include a staggered array of tabs which intermesh when joining two housings 66 together, and the offset between the outer faces 192 and 193 of the shroud 191 permits this connection as described herein. To facilitate this meshing, the outer face 193 is tapered near the front end thereof as seen in FIG. 33.

The outer side 167 of the housing 66 further includes intermediate tabs 197 and outer tabs 199 (FIGS. 33 to 35) which are staggered relative to each other to facilitate mating engagement of the housing 66. In particular, the housing 66 includes an intermediate tab 197 which is formed similar to the lower wall section 188. Each intermediate tab 197 is disposed in the area defined vertically between each vertically adjacent pair of shrouds 181. The intermediate tab 197 has an inclined outer face 198 and is vertically aligned with the lower wall section 188 to facilitate alignment of the housings 66.

Additionally, the outer housing side 167 includes an alternating arrangement of the outer tabs 199 which have an inclined interior surface 200. The outer tabs 199 are either spaced outwardly yet parallel to an upper wall section 187, or are disposed in the region between a vertically-spaced pair of shrouds 181.

When a housing 66 is inverted and mated with another housing, these outer tabs 199 are adapted to align with and slide horizontally along the corresponding outer face 193 of the lower wall section 188, or else the outer face 198 of an intermediate tab 197. More particularly, each housing 66 has outer tabs 199 disposed outwardly of respective upper wall sections 187. As a result, a space 201 is formed therebetween which is adapted to accommodate one of the intermediate tabs 197 therebetween when two housings 66 are joined together. Once two housings are joined, each access port 51 extends through the front side 167 into the interior of a corresponding shroud 181.

With respect to the inner side 168 of the housing 66 as seen in FIGS. 25 and 34, an inner tab 203 is provided in the space between each vertically spaced pair of shrouds 181. The inner tab 203 includes an inclined interior face 204. When a housing 66 is inverted, the interior face 204 aligns with one of the shrouds 181 of the other housing 66 and when engaged together, the inner tab 203 slides along and overlies the inner wall 185 of the shroud 181. The inclined interior face 204 serves to align the housing 66 during the engagement operation in combination with the tabs 197 and 199 and the wall sections 187 and 188. All of these cooperating parts frictionally fit together to help secure two housings 66 together while aligning the opposing contacts 79 thereof.

Each housing 66 further includes rough alignment means for guiding two housings 66 together. Referring to FIGS. 23A, 23B and 25, a horizontally elongate alignment tongue 207 projects forwardly from one end such as the bottom end of the housing 66. The opposite top end of the housing 66 includes a corresponding alignment slot 208 which extends therethrough. The slot 208 is generally rectangular when viewed from the front and is adapted to receive the tongue 207 therein.

The tongue 207 is a relatively flat blade which extends horizontally forwardly and has a tapered front edge 209 which facilitates alignment and insertion of the tongue 207 into the slot 208. The tongue and slot arrangement provides a rough alignment of the housing 66 as seen in FIG. 31B, particularly for preliminary alignment of the shrouds 181 prior to the final engagement of the housings 66 together. This ensures that the contact assemblies 92 are arranged in preliminary alignment before actually being brought into engagement with each other as generally seen in FIG. 31B.

Each tongue 207 further includes locking means thereon. As seen in FIG. 31, the locking means comprises an inclined tab 211 which defines a rearward facing abutment surface 212. The inclined tab 211 slides along the interior wall 213 of the slot 208 until the tab 211 is disposed rearwardly of the back end face 170 as generally illustrated in phantom outline in FIG. 31B. Thereafter, the abutment surface 212 prevents disengagement of the housing 66. However, each tongue 207 is flexible so as to permit manual vertical flexing of the tongue 207 and allow for disengagement of the tongue 207 from the slot 208. Other suitable locking means may be provided such as screws or the like.

In view of the foregoing, each housing 66 readily accommodates the mounting of a selected number of cable assemblies 67, 67' thereto. Once the cable assemblies 67, 67' are assembled to a pair of housings 66 disposed at the opposite ends thereof, the CDA 43 is formed. Namely, the bundle of cables 76, 76' together define the cabling 49 of the CDA 43 while the contact plug 75 and housings 66 define the connector units 50 on the opposite ends of the cabling 49.

Each housing 66 lockingly engages with a serially adjacent housing 66 so as to join two CDAs 43 together. Each pair of joined housings 66 further defines the access ports 51 therethrough which permit access to each one of the circuits defined by the cable assemblies 67, 67'.

During assembly of the CDAs 43, the plurality of cable assemblies 67 and 67', and in particular the support sections 77 thereof project rearwardly from the housing 66 as shown in FIGS. 5 and 6. While each cable assembly 67, 67' is positively secured in position, it is desirable to provide further rigidity to the overall connector unit assembly. Accordingly, a pair of connector blocks 68 are joined to all of the support sections 77 as described herein.

Connector Block

Referring to FIG. 6, when the cable assemblies 67 and 67' are mounted in the housing 66, the ribs 85 are arranged in parallel rows on opposite sides of the mounting sections 77. The mounting sections 77 are positioned one against the other in a vertical stack. The connector block 68 is adapted to slide onto the row of ribs 85 and tie the stack of contact plugs 75 together.

More particularly with respect to FIGS. 36 and 37, the connector block 68 is molded from plastic so as to include a parallel row of slots 220. The slots 220 extend forwardly and have an open front end 221. The slots 220 have an hourglass-shape which corresponds to the cross sectional shape of the ribs 85 such that the connector block 68 can be positioned near one end of the ribs 85 and then slid forwardly so that the ribs 85 slide into the slots 220 through the open front ends 221 thereof. To accommodate variations in tolerance of the ribs 85, the slot wall of each slot 220 includes a channel 222 therebetween so as to allow limited flexing of the slot walls.

To lock the connector block 68 to the contact plug 75, the rearward edge of the connector block 68 includes a plurality of detents 224 which project therefrom. The detents 224 are aligned with the slots 220 as well as corresponding notches 88 on the plug support section 77. The connector block 68 thereby is slid forwardly onto the ribs 85 until such time as the detents 224 snap-lockingly engage the notches 88 to prevent inadvertent disengagement of the connector block 68.

Since multiple lengths or runs of CDAs 43 may be provided in a single raceway, the connector block 68 can serve the additional function of coding or identifying the connected series of CDAs 43 so as to differentiate one connected series from another connected series. For example, the connector blocks 68 are provided in three different colors wherein a single first color is used along a single connected series (i.e. length or run) of CDAs 43. Similarly, a second color is used for another run of CDAs 43, and a third color is used for a third run of CDAs, such that each six-circuit grouping of circuits has its own distinct color coding which hence serves as an identifying indicia for the run.

Other types of indicia may also be used besides or in combination with the color coding to distinguish different runs of CDAs 43 one from the other. For example, letters, numbers or symbols may also be provided on the connector blocks 68 in a visible location. Alternatively, other components of the CDAs 43 could be provided with distinguishing indicia although preferably the indicia is removable to permit changing thereof.

When the connector blocks 68 are mounted in place as seen in FIG. 5, a space is provided between the front edge 225 of the connector block and the opposing back end face 170 of the housing. This space primarily serves as a keying space 226 as discussed herein.

Keying Block

Referring to FIGS. 4 and 5, the keying block typically is provided in three out of the four keying spaces 226 which would be defined on a single CDA 43. For example, in FIG. 4, three of the four keying spaces 226 are filled by the keying blocks 69 while a fourth space 226 on the rightward, front side of a connector unit 50 is left open. This keying space 226 will be described herein as used in conjunction with the tap module 46.

With respect to the keying block 69, this keying block 69 has a vertically elongate shape that is formed from molded plastic. The back side of the keying block 69 includes a plurality of pairs of upstanding slot walls 229. Each pair of slot walls 229 defines a slot 230 therebetween which has substantially the same cross sectional shape as the ribs 85.

An additional space 231 is provided between each pair of slots 230 so as to provide for limited flexing of the slot walls 229 and permit the sliding engagement of the keying block 69 with the ribs 85. If necessary, the flexible slot walls 229 also permit the keying blocks 69 to be snapped sidewardly onto the ribs 85.

In particular, the keying block 69 is mounted in an open keying space 226 typically before the connector block 68 is mounted in place. Thus, connection of the keying block is accomplished by sliding the keying block 69 forwardly onto the ribs 85 until interior detents 69a (FIG. 5) snap into the corresponding notches 87. The intermediate space 231 permits flexing of the slot walls 229 to accommodate variations in tolerance of the ribs 85.

The outer side 233 of each keying block 67 remains exposed and at least one of the keying blocks 67 includes an adhesive label 234 thereon. The adhesive label 234 serves as a circuit identification label and identifies a specific circuit number which has been assigned to the circuit that is disposed adjacent thereto. For example, if six cable assemblies 67 and 67' are mounted to a housing 66, each circuit can be labelled sequentially, for example, circuits one through six as seen in FIG. 38. This assists an installer in keeping track of what circuit a specific tap module 46 is being connected to. Further if three color coded lengths of CDAs are provided, the 18 circuits may be labeled sequentially 1 through 18 or else, each of the three 6-circuit groups might be labelled 1 through 6 and distinguished one from the other by the color coding.

Tap Module

Figure 40:
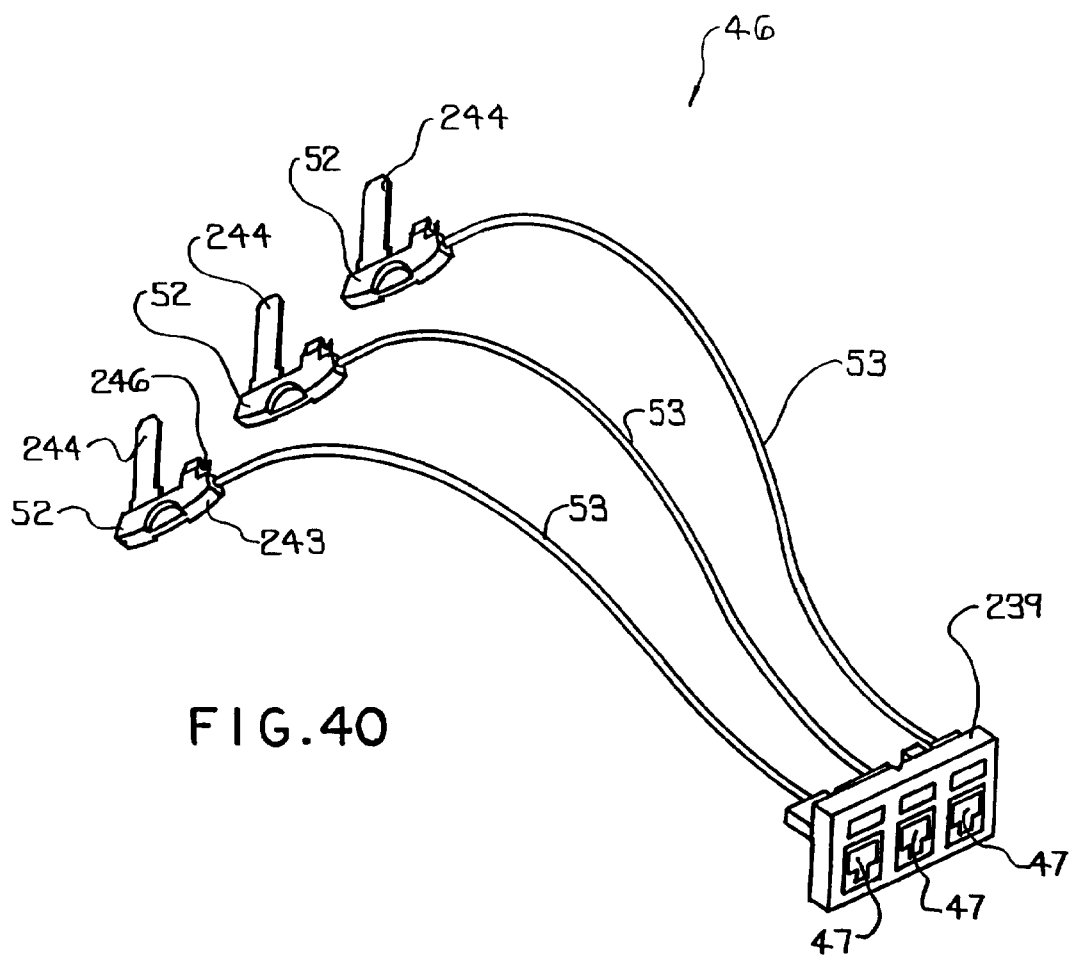
FIG. 40 is a perspective view of a tap module.
Figure 41:
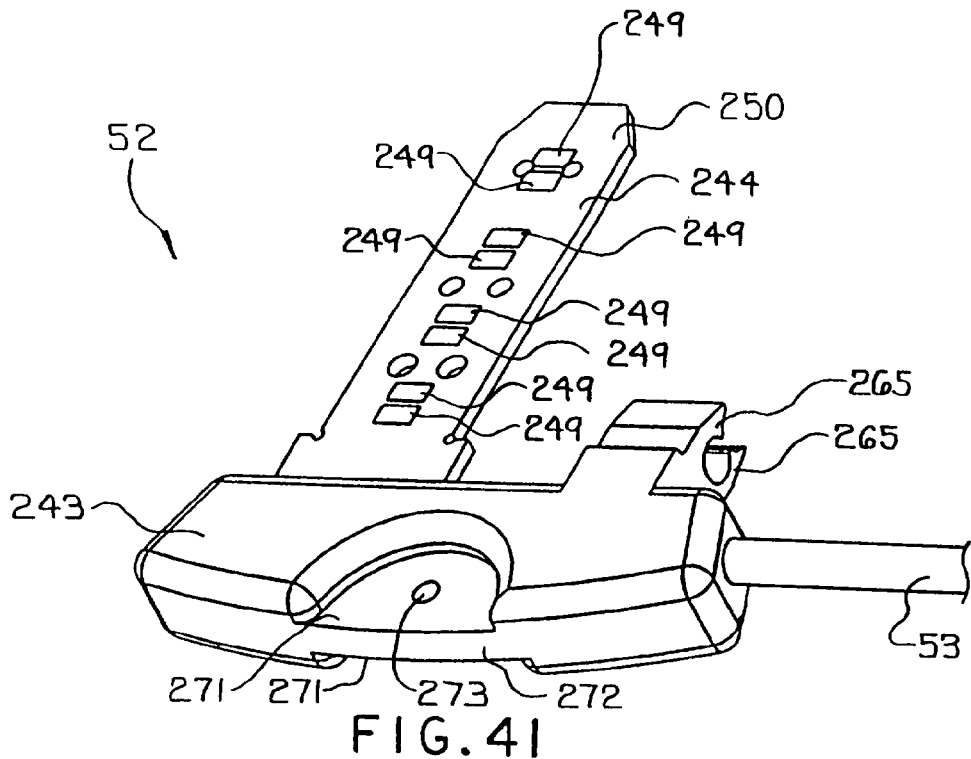
FIG. 41 is an enlarged perspective view of a tap assembly of the tap module.

An exemplary tap module 46 is illustrated in FIG. 40. In this tap module 46, a jack or outlet housing 239 supports three separate jacks 47 therein. The actual construction of the housing 239 can vary so as to accommodate more or less jacks 47 thereon.

The jack housing 239 is adapted to mount to a wall panel cover such as the raceway cover 55 or cover tile 62. Each jack 47 is operatively connected to a jack cable 53 which extends to a tap unit 52. As referenced herein, each individual jack cable 53 can be provided with any suitable length wherein a short cable 53 is illustrated in FIG. 1A and a longer cable 53' is illustrated in FIG. 1B.

Preferably, the jacks 47 are eight-position modular jacks. Alternative types of jacks 47 also can be provided other than the conventional phone jack illustrated, for example, in FIG. 40.

With respect to the specific construction of the tap unit 52, the tap unit 52 is adapted to be inserted into a connector unit 50 as diagrammatically illustrated in FIG. 5. The tap unit 52 generally includes a plastic head 243, a tap blade 244 projecting from an inner side 245, and a keying projection 246 which also projects from the inner side 245. During connection of the tap unit 52 to a specific circuit, the tap blade 244 is adapted to insert into one of the access ports 51 while the keying projection 246 is adapted to be fitted into the open keying space 226. Since only one keying space 226 is left open, the tap unit 52 can be engaged with the connector unit 50 in only one orientation.

With respect to the tap blade 244, the tap blade 244 includes pairs of electrical traces 249 on a first side 250 thereof. The opposite side 251, however, does not include these traces. Since the tap blade 244 is formed of an insulative material, the side 251 serves as an insulator.

When the tap blade 244 is inserted into an access port 51, the four pairs of traces 249 line up with and contact each individual contact 79 of the four pairs of contacts 79 supported on the contact assembly 92. During insertion of the tap blade 244, the leading edge thereof contacts the contact opening device 129 so as to deflect the contact opening device 129 downwardly as seen in FIG. 19 and separate two opposed sets of contacts 79. The tap blade 244 thereby is allowed to slide between the pairs of contacts 79 as seen in FIG. 21 wherein the traces 249 ultimately contact corresponding upstream contacts 79 so as to connect to an upstream CDA 43 from which communication signals are received. The other opposing downstream contacts 79 contact the opposite insulative side 251 of the tap blade 244.

Since the traces 249 are connected to the jack cable 53, the corresponding jack 47 is electrically connected to the circuit defined by the upstream contacts 79. Since the other downstream contacts 79 contact the insulated side 251, the circuit is broken downstream of the connection point. Thus, a particular circuit extends along the entire length of serially connected CDAs 43. However, once a tap module 46 and in particular, a tap blade 244 is inserted into an access port 51, the circuit associated with the access port 51 is broken downstream of this connection point and the circuit is instead connected to the jack cable 53 and consequently, the jack 47.

Since the endmost traces 249 (FIG. 5) slide temporarily across three of the pairs of contacts 79 before being aligned with the corresponding end contacts 79, it is desirable to maintain the contacts 79 separated from the traces 249 until the tap blade 244 is fully inserted into the access port 51. This is accomplished by providing the tap blade 244 with pairs of small, medium and large holes 253, 254 and 255 respectively. The small, medium and large holes 253 through 255 correspond respectively to the dimples 158a, 158b and 158c of the contact opening device 129.

The dimples 158a–158c when in contact with the tap blade 244 raise the contacts 79 away from the trace side 250 of the tap blade 244. However, once the dimples 158a to 158c are aligned with the corresponding small, medium and large holes 253 to 255, the dimples seat within these holes as seen in FIG. 21 and allow the upstream contacts 79 to press against the corresponding traces 249 and complete the electrical circuit therethrough. An earlier version of this tap arrangement is disclosed in U.S. patent application Ser. No. 08/651 414, filed May 22, 1996, the disclosure of which is incorporated herein in its entirety.

Preferably, the holes 253, 254 and 255 are oval with the maximal axis extending longitudinally or in other words, transversely relative to the sideward direction through which the tap unit 52 is inserted into an access port 51. This oval shape helps align the tap blade 244 during its insertion since tolerances can be accommodated.

To connect the individual traces 249 with the individual conductors of the jack cable 53, the traces 249 extend longitudinally through the length of the tap blade to corresponding bores 259 at the end thereof. The individual conductors of the jack cable 49 are inserted in electrical contact within these bores 259. Thereafter, the head 243 of the tap unit 52 is over molded in place.

The tap blade further includes serrated edges 260 on the opposite sides thereof which serve to positively secure the tap blade 244 within the tap head 243 after molding. Still further, each tap blade 244 includes a pair of inward facing stops 261 which are adapted to abut against the opposing surfaces 116 (FIG. 13) of two connected contact alignment bodies 91 when the tap blade 244 is fully inserted sidewardly. These stops 261 thereby serve to ensure proper sideward alignment of the traces 249 with the corresponding contacts 79. The free end 263 of the tap blade 244 also is tapered so as to provide rough alignment during insertion into one of the access ports 51.

The tap head 243 further is molded with the keying projection 246. The keying projection 246 projects from the inner side 245 and has a longitudinal width which allows it to be seated within an open keying space 226 when the connector block 68 is mounted in place.

Figure 42:
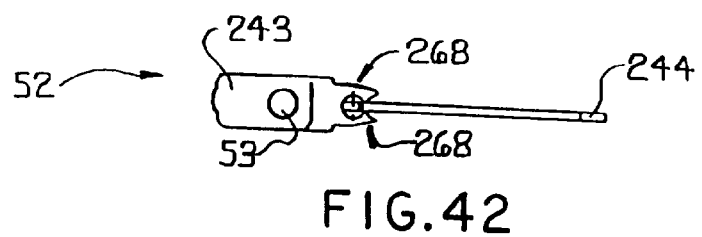
FIG. 42 is an end elevational view of the tap assembly.
Figure 43:
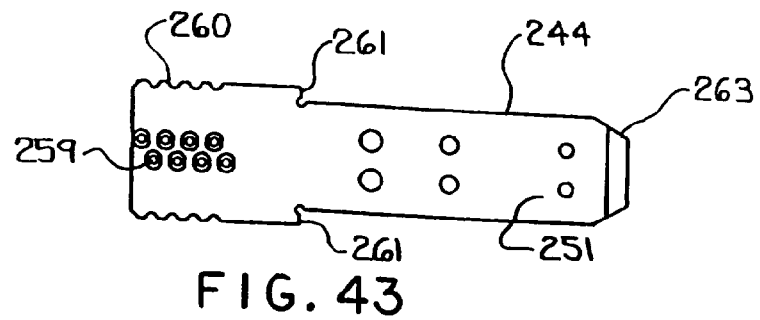
FIG. 43 is a plan view of an insert or blade of the tap assembly.

The keying projection 246 includes a pair of flexible prongs 265 which project sidewardly and are vertically spaced apart so as to define a slot 266 therebetween. As seen in FIG. 42, the slot 266 has the same cross sectional shape as the ribs 85, similar to the slots in the connector block 68 and the keying block 69. The prongs 265 are sufficiently flexible so as to allow flexing thereof and snapping engagement of the prongs 265 onto a corresponding one of the ribs 85. This keying projection 246 thereby serves to hold the tap unit 52 stationary and prevent inadvertent disengagement thereof. Further, since there is only one open keying space 226 on the upstream connector unit 50, the tap unit 52 can only be plugged in one orientation whereby the tap unit 52 connects to the upstream contacts 79.

Since a plurality of tap modules 46 may be mounted to a connector unit 50 and these tap modules 46 may be positioned in adjacent access ports 51, the prongs 265 have a reduced width relative to the width of the tap head 243 so as to define clearance spaces 268 (FIG. 42) on the opposite sides thereof. The clearance spaces 268 permit outward flexing of the prongs 265 without interference with the prongs 265 of an adjacent tap unit 52.

Preferably, the central axes of the tap blade 244 and the keying projection 246 are spaced at substantially the same distances from a central axis 267 (FIG. 5) of the tap head 243. Thus, while the tap blade 244 is off center relative to this axis 267, the tap unit 52 can be removed relatively straight without twisting. Further, opposite end faces 269 of the tap head 243 are preferably spaced at equal distances from the central axis 267 so as to also facilitate balancing of the forces as the tap unit 52 is removed.

To facilitate removal of the tap unit 52, the opposite end faces 269 of the tap head 243 converge inwardly toward each other or are slanted so as to facilitate manual gripping of the tap head 243 during its removal. Preferably, these end faces 269 also include parallel ribs 270 which provide a better grip.

Additionally, the head 243 can have a reduced thickness along a central portion thereof so as to define recesses 271 on the opposite sides. The recesses 271 define a reduced thickness flange 272. The flange can either be used for manual gripping or can be engaged with a removal tool which passes through a bore 273 provided therein. The removal tool preferably has a wire-like hook which can be slid into the bore 273 for pulling of the tap module 46 out of the connector unit 50.

The cables 53 associated with the tap module 46 can be of any desired length depending on the desired mode of use. Alternatively, the tap unit 52 and outlet part 54 can be directly joined together in these use situations where remote location of the outlet part is not required.

Alternative Contact Plug

Figure 44:
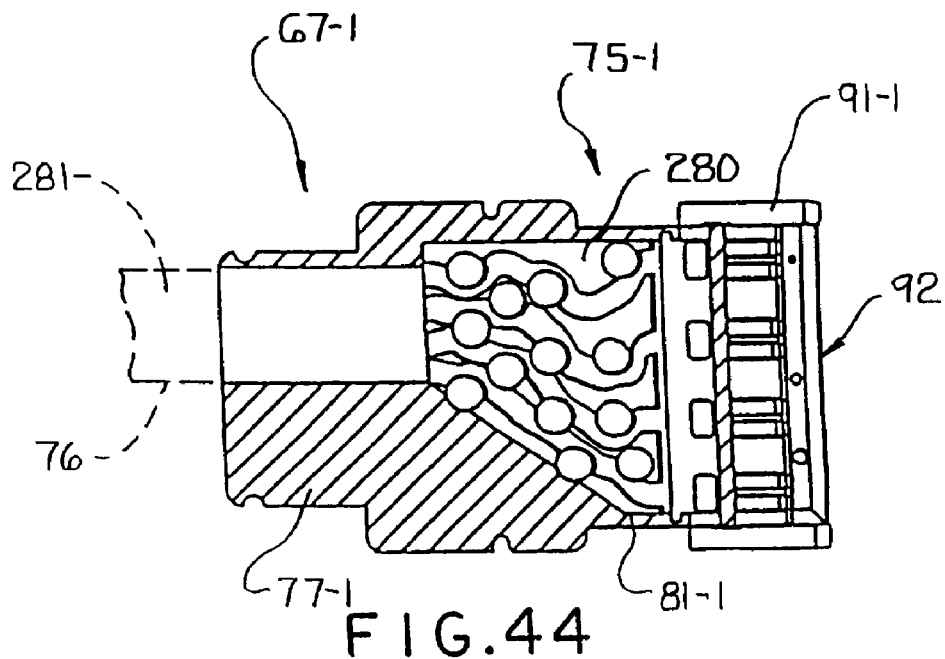
FIG. 44 is a top cross-sectional view of a second embodiment for the cable assembly.
Figure 45:
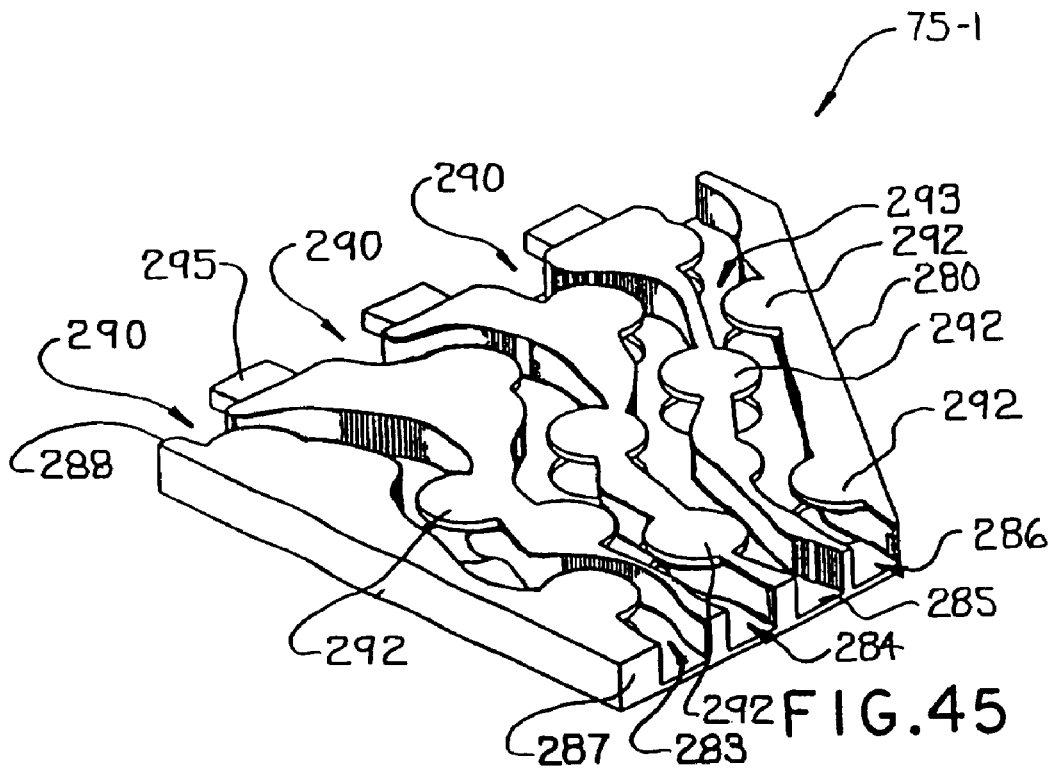
FIG. 45 is a perspective view of a wire manager for the cable assembly of FIG. 44.

Referring to FIGS. 44 and 45, an alternative construction for the contact plug is identified by reference numeral 75-1. The primary difference between the contact plug 75-1 and the above-described contact plug 75 is the inclusion of a wire manager or guide 280 so as to align the distal ends of the individual conductors 94 of a cable 76 one next to the other prior to their insertion into the contact support 91-1.

In particular, since the cable 76 is offset relative to the longitudinal axis of the cable assembly 67-1, and the contact support 91-1 has a greater width than the width of the cable 76, the individual conductors 94 are fanned laterally after they have exited the outer sheath 281 of the cable 76. Thus, the conductors on one side of the cable 76 travel a shorter distance between the end of the cable 76 and the contact support 91-1 while the conductors 94 on the opposite edge of the cable 76 have a steeper bend and thus must travel a farther distance between the cable 76 and the contact support 91-1.

The wire manager 280 is constructed so as to provide relatively equal path lengths for each of the conductors 94 as they extend from the cable 76 to the contact support 91-1. In particular, a wire manager 280 includes first to fourth passages 283 to 286 which extend longitudinally therethrough. The passages 283 to 286 wind sidewardly as they extend from the back end 287 to the front end 288 thereof. Notably, the back end 287 has a width which corresponds generally to the cable width 76 while the front end 288 has a substantially greater width which corresponds to the width of the contact support 91-1.

To provide substantially equal path lengths for each pair of conductors 94 as they pass through a respective one of the passages 283 to 286, all of the passages 283 to 286 define substantially equal path lengths for the conductors 94. This is accomplished by providing the left most passage 283 with a greater curvature than the right most passage 286 which is more linear, although it still has some curvature. Thus, the conductors 94 can be cut to equal lengths since they will exit the outlets a substantially equal distance from the cable 76.

The wire manager 280 is formed from molded plastic. To secure the conductors 94 within the respective passages 283 to 286, the wire manager 280 is molded on the top surface thereof with flanges 292 which partially overlie the respective passages 283 to 286. Since the flanges 292 do not completely overlie a passage 283 to 286, a space 293 is formed adjacent thereto to permit the conductors 94 to be laid into the passages from the open top sides thereof.

The front end 288 of the wire manager 280 also includes three rectangular projections 295 which plug into respective openings in the back end face of the contact support 91-1. Thereafter, the wire manager 280 is completely covered during the molding of the support section 77-1 and the engagement section 81-1 which are formed the same as the support and engagement sections 77 and 81.

As disclosed herein, the communication cable arrangement 12 of the invention is readily adaptable to the space provided in office areas. The cable arrangement 12 also is readily usable to provide the necessary number of circuits required to supply communications connections to the individual workstations of an office area.

Wiring Harnesses

Referring to FIGS. 1A, 1B, 2A and 2B, the wiring harnesses 41 are formed substantially the same as the CDA 43 except that only a single connector unit 42 is provided on a preterminated end thereof for connection to a connector unit 50 of a CDA 43. The other end is adapted to be connected to the infeed hardware 38.

More particularly, the cabling 45 and connector unit 42 of each cabling harness 41 is formed substantially the same as the cabling 49 and connector units 50 of a CDA 43 as described herein. The connector unit 42 includes a housing 299 formed identical to the housing 66 of the connector unit 50. A plurality of parallel cable assemblies 300 and 300' also are provided to define said circuits. The cable assemblies are formed substantially the same as the cable assemblies 67 and 67' so as to include cables 76 or 76' wherein one end of the cable 76 or 76' includes a contact plug 75' thereon. The contact plug 75' and its connection to a cable 76 or 76' is substantially the same as the contact plug 75 described herein except that the contact plug 75' includes a modified tab 121' on the bottom surface thereof.

Figure 47:
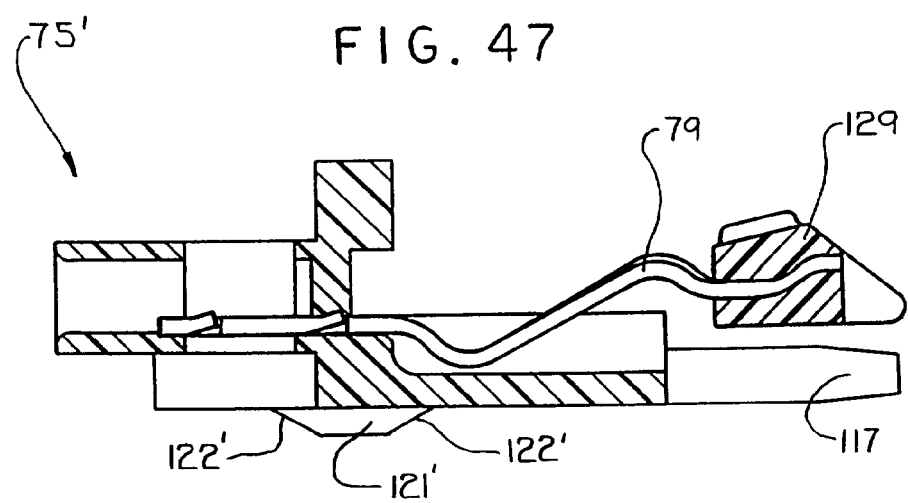
FIG. 47 is a side cross-sectional view of a contact plug for the wiring harness.

Referring to FIG. 47, the modified tab 121' includes an inclined surface 122' on both the front and back ends thereof. The inclined surface 122' on the front side facilitates sliding of the plug part 75' into one of the mounting sockets 95 on the housing 66. However, unlike the CDAs 43, it is desirable to be able to remove or unplug the contact plug 75' from the housing 299, and accordingly the back surface 122' of the tab 121' also is inclined. Thus, the connector unit 42 is formed substantially identical to the connector units 50 except that the individual contact plugs 75' in each harness connector unit 42 are removable from the respective housing 299 to selectively route the circuits leftwardly or rightwardly as described in more detail herein. Since the previous discussion herein with respect to the cabling 49 and connector units 50 of a CDA 43 is equally applicable to the cabling harness 41, a more detailed discussion with respect to the construction of these components is not necessary.

When a cabling harness 41 is connected to a CDA 43, a mounting site is defined whereby a tap 52 can be inserted into one of the access ports 51 which are defined by the connector unit 42 of the cabling harness 41 and the interconnected connector unit 50 of the CDA 43.

With respect to the opposite end of the cabling 45 of the harness 41, this free end may not have a connector unit thereon. Rather, the individual conductors such as the conductors 94 can be mounted to the punch block connectors of the connector hardware 38. Typically, an installer will individually connect these conductors 94 to the punch blocks such that each cabling harness 41 ultimately is connected to the building cabling 28 or 28'. Alternatively, the free end of the harness cabling 45 also can be provided with a preterminated connector such as an amphenol connector or a modular jack so as to allow for a plug-like connection between the harness 41 and the connector hardware 38.

In the illustrated embodiments of FIGS. 1A, 1B, 2A and 2B, the wiring harnesses 41 are provided at the beginning of the individual cable runs or lengths of interconnected CDAs 43.

Figure 46:
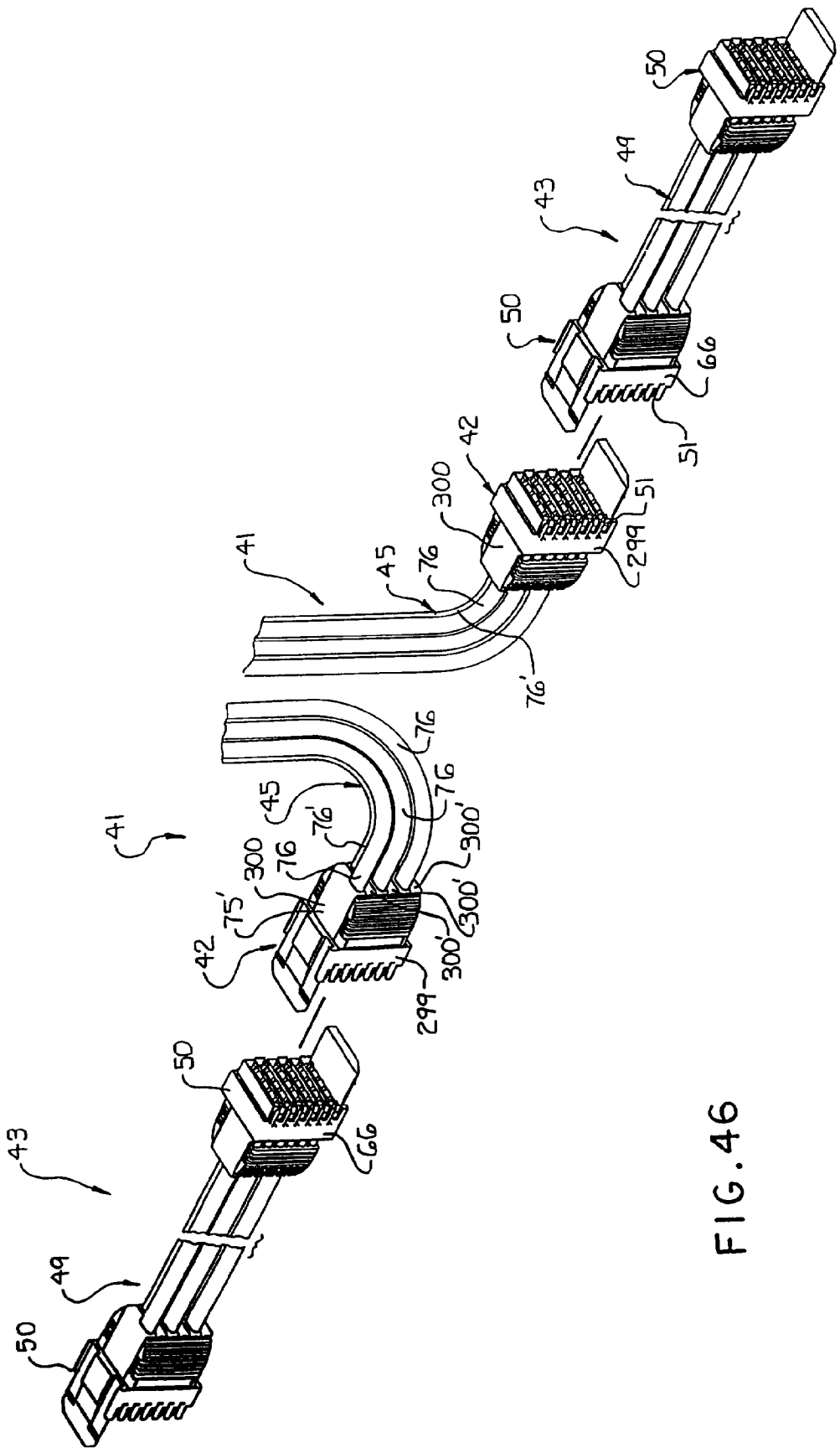
FIG. 46 is a perspective view of an infeed wiring harness.

When installing the communication cabling system of the invention 10, it also may be desirable to provide CDAs 43 which extend both leftwardly and rightwardly away from the harnesses 41 along a raceway as seen in FIG. 46. For example, while FIG. 1A illustrates three lengths of CDAs 43 extending rightwardly away from three separate harnesses 41, a first harness 41 may be connected to one run of CDAs 43 which also extend rightwardly along a raceway, while another harness 41 could be provided in the raceway so as to extend leftwardly from an infeed unit and allow for at least a second run of CDAs 43 to extend leftwardly from an infeed location.

Further, it may also be desirable, depending upon the requirements of a specific office area, to provide six or more wiring harnesses 41 such that at least three runs of cabling 43 extend rightwardly and an additional three runs of CDAs 43 extend leftwardly so that six separate six-circuit groups are routed throughout a furniture arrangement. The skilled artisan will appreciate that more or less cabling harnesses 41 can be provided to route more or less cable runs throughout the wall panels or other furniture.

Still further, the use of multiple cabling harnesses 41 permits the infeed location to be moved, for example, to the middle of a run of CDAs 43 as generally illustrated in FIG. 46. If this is required, two serially adjacent CDAs 43 can be disconnected, and leftward and rightward wiring harnesses 41 provided so as to route a six-circuit group to the leftward run of CDAs 43 and an additional six-circuit group to the rightwardly extending run of CDAs 43.

Figure 48:
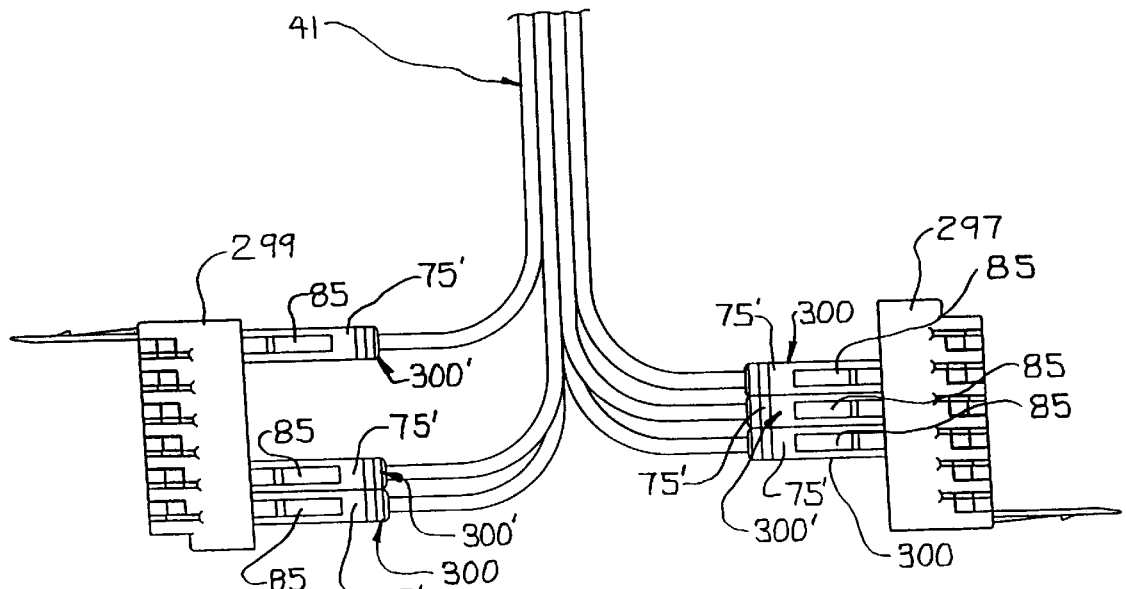
FIG. 48 is a side elevational view of a wiring harness arrangement having circuits routed leftwardly and rightwardly.

It may also be desirable to route less than six circuits to a single run of CDAs 43 as seen in FIG. 48. This can be accomplished by providing the housing 299 of a harness connector unit 42 with only three cable assemblies 300 or 300' plugged therein. In other words, while a connector unit 42 has a six-circuit capacity, less than all of the circuits of this unit can be utilized. Thus, the downstream CDAs 43 would only have three live circuits extending therealong, while the remaining three circuits in this run would be dead.

This splitting or rerouting of the circuits can be accomplished by providing a single six circuit harness 41 and one additional housing 299. Since the plugs 75' are removable from the original housing 299 such as the rightward housing 299 of FIG. 48, three plugs 75' can be removed from the original housing and plugged into the additional leftward housing 299. As a result, the original housing 299 and the additional housing 299 would have the cable assemblies 300 and 300' split therebetween.

Once the plugs 75' have been selectively plugged into either the leftward or the rightward housing 299, the plugs 75' are then tied together by sliding a connector block 68 onto the ribs 85 as previously described herein. Since the connector block 68 has a slot corresponding to each rib 85, the connector block 68 is positively connected to each of the plugs 75'. Thus, as seen on the left side of FIG. 48, the plug 75' could be positioned in spaced relation such as in the first, second and sixth mounting sites. While the uppermost plugs 75' in the sixth mounting site is spaced apart from the plug 75' in the first and second mounting sites, the connector block 68 rigidly connects the plugs 75' together since the connector block 68 bridges the space between the mounting sites which are being used.

Alternatively, the connector block 68 can be used to tie all of the plugs 75' together when they are disposed one next to the other as illustrated on the rightward housing 299 of FIG. 48.

The wiring harnesses 41 can also be provided with predefined lengths wherein the wiring harnesses 41 can then be shortened depending upon the distance between an infeed unit 27 and the first connector unit 50 of the closest CDA 43. The length of the harnesses can be shortened by cutting off a suitable length from a free end of the harness cabling 45. Thus, circuits can readily be provided to the CDAs 43, even if the CDAs 43 are already installed in a wall panel arrangement 10.

Further, the infeed units 27 and 27' may be eliminated. Instead, the wiring harnesses 43 may be provided with a sufficient and typically long length so as to be connected directly to the wiring closet. As can be seen, the wiring harnesses 41 or 41' also provide significant flexibility in supplying circuits to an office area.

End Cap

Figure 49:
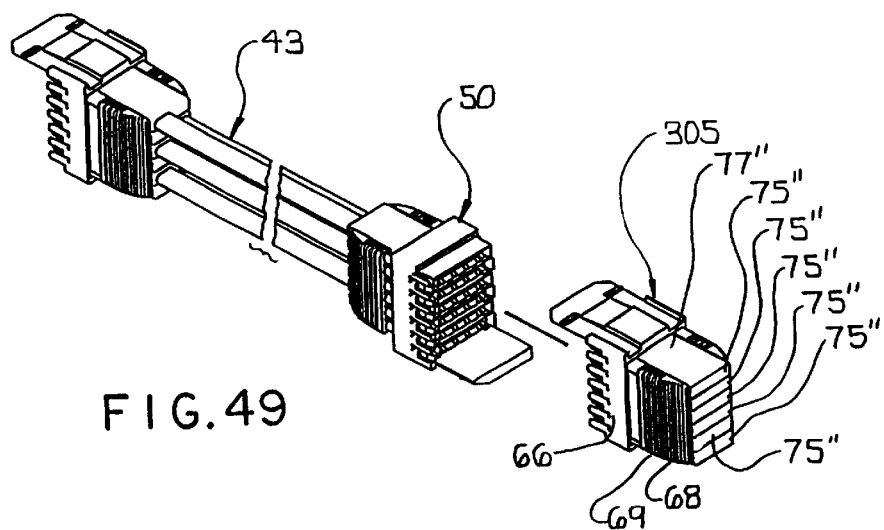
FIG. 49 is a perspective view of an end cap at an end of a run of CDAs.

Referring to FIG. 49, each run of CDAs 43 preferably is provided with an end cap 305 so as to permit access to circuits at the terminal end of a run of CDAs 43. The end cap 305 is formed substantially the same as a connector unit 50 except that cables 76 or 76' are not provided thereon.

More particularly, the end cap 305 includes a housing 66, connector block 68 and keying block 69. The end cap 305 also includes a plurality, and preferably six plugs 75" which are formed identical to the plugs 75 as described herein. The only difference between the plugs 75" and the plugs 75 is that the plugs 75" do not have a cable 76 or 76' connected thereto. Rather, the engagement section 77" is molded as a substantially solid block of plastic. Each plug 75" still includes contacts which are supported identical to the contacts 79 of the connector units 50. The contacts in the end cap 305 are necessary so that opposing sets of contacts are provided when an end cap 305 is joined to an end connector unit 50 so as to permit a tap unit 52 to be inserted therebetween.

Infeed Unit

Figure 51:
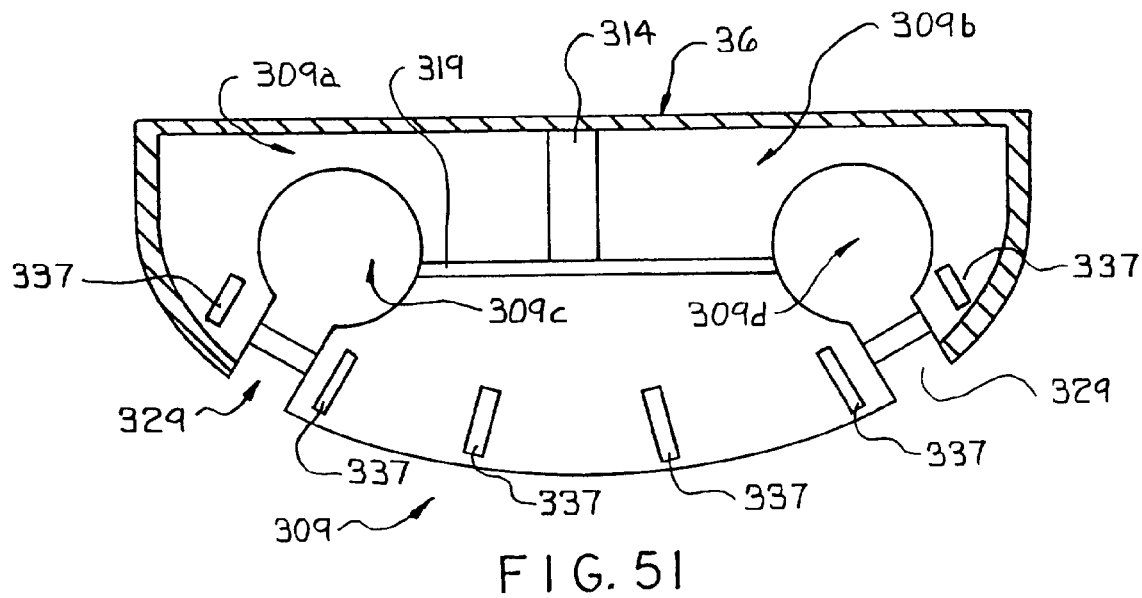
FIG. 51 is a cross-sectional plan view of the infeed unit of FIG. 50.

The infeed unit 27 (FIG. 1A) is illustrated in further detail in FIGS. 50 and 51. In particular, the infeed unit 27 includes the hollow enclosure 36, the access cover 37 which mounts to an open front side 309 of the enclosure 36, and a skirt 310 which extends downwardly from the bottom of the enclosure 36.

The enclosure includes top, bottom, side and back walls formed of sheet metal. The access cover 37 is removably secured over the open front side 309 by screws 312 which engage corresponding holes 313 formed in the opposite side walls of the enclosure 36.

To support the connector hardware 38 within the open interior of the enclosure 36, a plurality and preferably three tubular nylon spacers 314 are secured to the back wall by screws 316 which project forwardly through screw holes 317 formed in the back wall. The spacers 314 are located in a vertical row disposed centrally of the back wall, and the spacers 314 project forwardly therefrom.

The enclosure 36 also includes a rectangular mounting plate 319 which is adapted to support various types of connector hardware 38 thereon. The mounting plate 319 is secured to the nylon spacers 314 by screws 320 which extend through screw holes 321 in the mounting plate 319 and are screwed into the forward ends of the spacers 314. Thus, the spacers 314 not only space the mounting plate 319 from the back wall of the enclosure 36 but also support the connector hardware 38 on the metal enclosure 36.

When the mounting plate 319 is secured in place, the open interior 309 behind the plate is divided into left and right storage spaces 309a and 309b respectively (FIG. 52) by the spacers 314. Further, the mounting plate 319 has a width which is smaller than the width of the enclosure 36 such that side passages 309c and 309d are defined to permit cabling to be routed into and out of the storage spaces 309a and 309b.

The mounting plate 319 also includes a large plurality of screw holes, an exemplary one of which is identified by reference numeral 322. In the illustrated arrangement of FIG. 50, eight of the screw holes 322 are used to secure two plastic mounting brackets 323 thereto by suitable fasteners 324. The mounting bracket 323 defines a horizontally elongate rail 325 thereon. The connector hardware 38 includes corresponding slots 326 which are adapted to be snap-fit onto the rails 325. Thus, the connector hardware 38 is supported on the mounting plate 319.

While the brackets 323 are oriented horizontally, the additional screw holes 322 permit the brackets 323 to be oriented vertically. Also, the connector hardware 38 may be screwed directly to the plate 319.

In FIG. 50, the specific connector hardware 38 comprise three vertically elongate punch blocks 327 which are each connected to a corresponding infeed harness 41. As generally seen in FIG. 1A, the connector hardware 38 is connected to building cabling 28.

The mounting plate 319 also includes three vertically spaced apart rectangular openings 328 which are provided to allow the cabling 45 of the wiring harnesses 41 to be routed from the back side of the mounting plate 319 and through the openings 328 for connection to the connector hardware 38.

To permit the wiring harnesses 41 to be routed out of the infeed unit 27, the bottom wall of the enclosure 36 includes a pair of keyhole-shaped cable ports 329. The cable ports 329 are accessible from the front edge of the bottom wall to permit the building cabling 28 and harness cabling 45 to be inserted therein through the left and right ports 329 respectively. The cabling 45 then extends down to the space enclosed by the skirt 35 and exits this space out of the open bottom thereof so as to pass into a suitable passageway in a furniture component, such as the raceways 21 or 22 of FIG. 1A. Any excess cabling 28 or 45 can be coiled up inside of the storage spaces 309a and 309b respectively. Further, slots 337 are provided in the bottom and back walls which receive plastic or velcro ties to secure the cabling to the rigid enclosure 36.

After the cabling 28 or 45 is laid in the ports 329, the skirt 35 is secured to the bottom of the enclosure 36. The skirt 35 is open on the bottom and back sides to permit the cabling 28 or 45 to be routed to or from the raceway 22, typically through an opening in the raceway cover 55. The skirt 35 thereby covers the cabling from view.

The infeed unit 27 is removably mountable to the exterior of a furniture component, such as the wall panels 14 of FIG. 1A. To removably connect the infeed unit 27 to a wall panel 14, a support bracket 331 is removably secured to the back wall of the enclosure 36. In particular, the back wall of the enclosure 36 includes four apertures 331 along each of the left and right side edges of the back wall, the left side apertures 331 being illustrated in FIG. 50. The apertures 331 thereby define two mounting locations for the support bracket 330.

The support bracket 330 also includes apertures 332 which correspond to the apertures 331 and permit mounting of the support bracket 330 to either the left edge or right edge mounting locations by fasteners 333.

Referring to FIGS. 50 and 52, the support bracket 330 also includes a plurality and preferably four mounting hooks 335 which are adapted to connect to a vertical post 17 of a wall panel 14. In particular, the vertical posts 17 include a plurality of vertically spaced slots 336 which is a conventional arrangement. The hooks 335 are adapted to slide rearwardly into the slots 336 and then downwardly into a secure position so as to secure the infeed unit 27 to the wall panel 14.

To permit the support bracket 330 to be used either on the left or the right side edge of the enclosure 36, the hooks 335 include upward and downwardly extending projections 335*a* such that the hooks 335 are generally T-shaped. Thus, the support bracket 330 can be mounted to the enclosure 36 either in the position illustrated in FIG. 50 or can be flipped 180° for mounting to the opposite left edge of the enclosure 36. Thus, the hook sections 335*a* can be used when the support bracket 330 is in the rightward position while the opposite hooks 335*b* can be used to engage the slots 336 of the posts 17 when the support bracket 330 is in the leftward position.

Since conventional wall panels use various types of hook and slot arrangements to secure components to the wall panels, the support bracket 330 can be constructed with a modified arrangement of hooks 335 so as to accommodate any type of conventional system.

Assembly and Operation

The individual CDAs 43 preferably are assembled by the manufacturer prior to their installation. Despite this preferred method of assembly, it will also be understood that the components can be provided separately and then assembled on site.

More particularly, the CDAs 43 are assembled by first positioning two housings 66 so that they face away from each other and are inverted in opposite orientations.

Thereafter, a plurality and preferably six cable assemblies 67 and 67' are provided. More particularly, three right-hand cable assemblies 67 and three left-hand cable assemblies 67' are positioned between the housings 66. Thereafter, the individual plugs 75 of the cable assemblies 67 or 67' are inserted one above the other into the openings or sockets 95 in the housings 66, with the assemblies 67 and 67' being vertically alternated. When each individual plug 75 is fully inserted into the housing 66, the projection 121 thereof snap-lockingly secures the plug 75 into the housing 66. The cable assemblies 67 and 67' are also alternatingly connected one after the other to the other of the housings 66.

Thereafter, at each end of each cable assembly 67 and 67', two connector blocks 68 are slid forwardly onto the ribs 85 defined on opposite sides of the stacked plugs. The ribs 85 are exposed and project rearwardly from the back end of the housing 66. These connector blocks 68 are slid forwardly onto the ribs 85 until the detent ribs 224 snap into the corresponding detent grooves 88 on the plugs 75. Once the connector blocks 68 are installed, all of the plugs 75 are tied securely together so as to provide for a rigid connector unit 50.

Once the connector blocks 68 are secured in place, four keying spaces 226 are defined on each CDA 43. The keying spaces 226 on the back side of the housing 66 are not required for the keying of the tap module 46. However, the keying spaces 226 on the front side of the CDA 43 are used for keying of the tap module 46, and thus one of the keying spaces 226 preferably is filled with one of the keying blocks 69 which can be snapped into the space.

Since each CDA 43 can be reversed end to end, the keying block 69 can be positioned in either one of the keying spaces 226 at the opposite ends of the CDA 43. The keying space 226 which is left open, however, preferably defines the upstream side of two interconnected connector units 50 when the CDAs are serially joined. Once the keying blocks 69 are installed, the CDA 43 essentially becomes handed in that the open keying space 226 is provided on only one end of the CDA 43. The CDAs 43, however, still are non-handed in that they can be flipped end to end and connected to existing CDAs 43 without modifying the other CDAs 43. If the keying blocks 69 are already installed, the only modification that would be required when a CDA 43 is flipped end to end is to reposition one of the keying blocks 69 so as to define a keying space 226 on the upstream side of two interconnected connector units 50.

If the CDA 43 is not installed correctly or if the arrangement of CDAs 43 is modified, it is also possible to pry one of the keying blocks 69 from one end of the CDA 43 and insert the keying block 69 into the keying space 226 at the opposite end thereof. While the keying blocks 69 preferably are assembled in position by the manufacturer, it is also possible to leave all of the keying spaces 226 open, and then assemble the keying block 69 when installing the communication cabling arrangement.

In this manner, each CDA 43 is assembled. Then, a suitable number of CDAs 43 and tap modules 46 are provided to a customer for installation.

Installation of the communication cabling components may occur during installation of the wall panel arrangement 10 or other furniture components such as desks. Alternatively, the cabling components may be installed in a pre-existing arrangement of furniture 10 or alternatively, the furniture may be rearranged which thus causes rearrangement of the communication cabling components.

If the furniture arrangement 10 is already installed, the installer will typically route the building cabling 28 to a location proximate to the location of the furniture arrangement for infeed of the cabling to the wall panels 14 or 14'. An infeed unit, for example, 27 or 27' is either mounted to the exterior of a wall panel or to the interior thereof. The building cabling 28 and 28' is connected to the electrical panels contained within the infeed unit and thereafter, a suitable number of wiring harnesses 41 are also connected to these electrical panels. Once the wiring harnesses 41 are connected thereto, the wiring harnesses 41 are laid into suitable raceways or passages within the furniture components.

For example, FIG. 1A illustrates the wiring harnesses 41 extending from the exterior of the wall panels 14 and into the interior thereof. FIG. 1B illustrates the wiring harnesses 41 extending from a beltline raceway 21 to a base raceway 22 wherein the cabling harnesses 41 pass over the exterior face of the wall panel frame in a space defined between the frame and a cover panel 60. FIGS. 2A and 2B illustrate the wiring harnesses 41 as they pass vertically through interior passages or raceways.

In the illustrated arrangements, three wiring harnesses 41 are provided to supply three separate groups of six circuits. Thereafter, three separate parallel runs of CDAs 43 are provided. In particular, each run is defined by a selected number of CDAs 43 which are serially-connected in end-to-end relation.

Figure 31A:
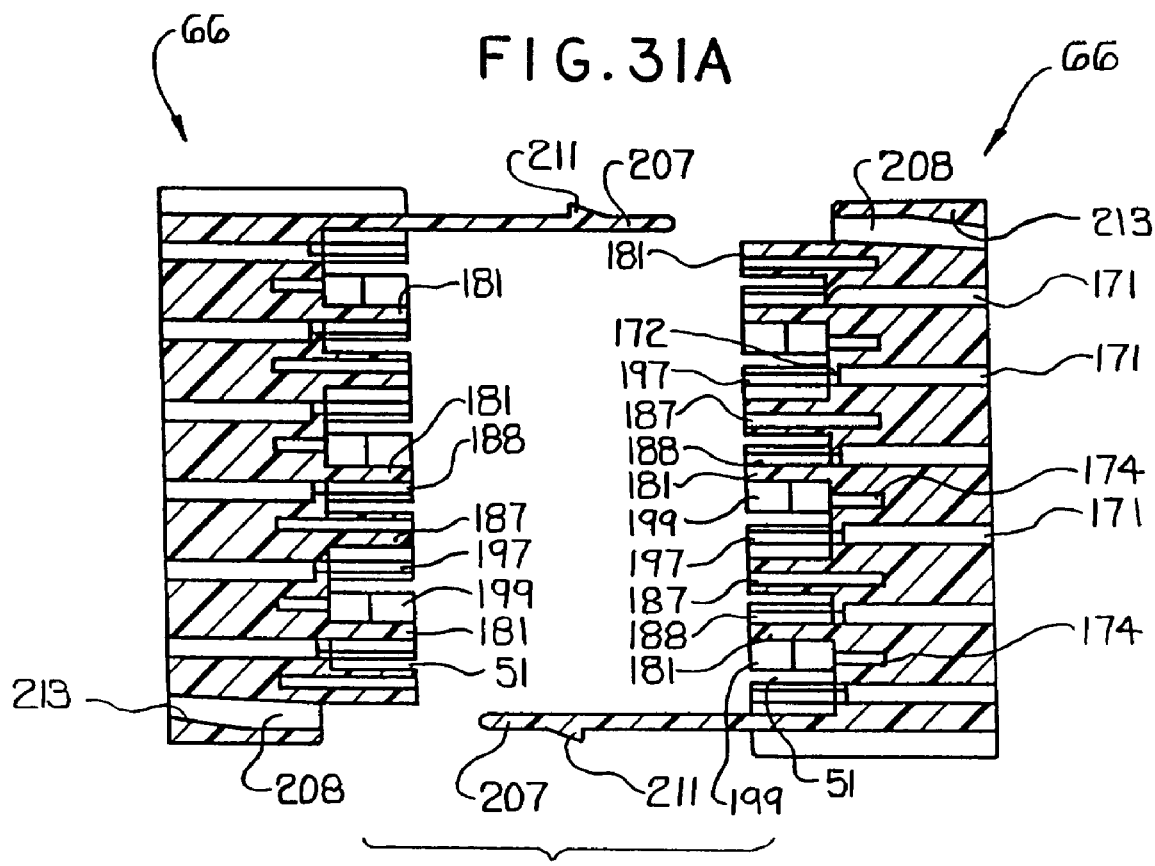
FIG. 31A is a cross-sectional view of the two housings in cross section as taken along line 31A—31A of FIG. 25.
Figure 32:
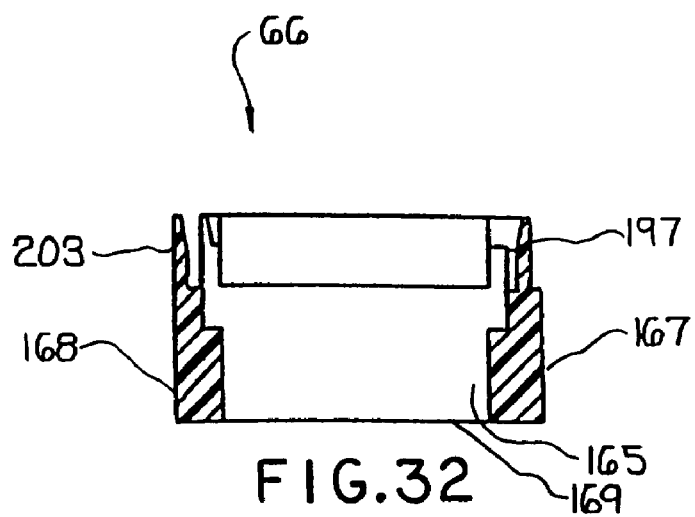
FIG. 32 is a cross-sectional view as taken along line 32—32 of FIG. 25.

Referring generally to FIGS. 31A and 31B, the connection of two serially-adjacent CDAs 43 is accomplished by aligning the tongues 207 of two adjacent connector units 50 with the slots 213 that correspond thereto. The tongues 207 are inserted into the corresponding slots 213 to provide a rough alignment for the individual contacts 79. Once the contacts are in this rough alignment, the connector units 50 are pushed longitudinally together until the individual shields 181 slide together and interfit. At this time, the individual tabs and the shields 181 further align the contacts and the contacts are brought into final engagement with each other. The tongues 207 also provide a snap-locking engagement of the two joined housings 66.

Once the CDAs 43 are serially interconnected, each interconnected pair of connector units 50 defines an access site for accessing the circuits being carried along the cable run. To access selected circuits, the tap unit 52 of a tap module is inserted into a selected one of the access ports 51 so as to access the circuit associated with this access port. In particular, upon insertion of the tap unit 52, the outlet 47 of the tap module 46 is connected to the circuit and provides a communication connection for a telephone computer, modem or the like. Depending upon the requirements of an office, three tap units of a three-jack tap module 46 (FIG. 40) can either be connected to three separate ports 52 of a single pair of interconnected connector units 50, or alternatively the three separate tap units can be connected separately to three different lengths of CDAs 43. Thus, a three-jack tap module can provide three separate outlets for a single workstation. Additional outlets may be provided where necessary.

Preferably the CDAs 43 are provided in three parallel runs so as to define three separate six-circuit groups. To differentiate one six-circuit group from another, each run of CDAs 43 preferably is differentiated by a surface indicator such as the color coded connector blocks 68. Thus, all of the CDAs 43 of one run will have connector blocks 68 of a single color while all of the connector blocks 68 of another parallel run of CDAs 43 will have a different color. Still further, each individual run will also identify the circuit being carried therealong by the indicia provided on a keying block 69. Thus, as an example, an installer could plan out a workstation area such that a first workstation would use circuit "1" from a run of CDAs 43 that is color coded red. The installer would then know that circuit "1" from the red length of CDAs 43 was dead downstream thereof and that this circuit no longer could be accessed downstream.

In another example, a new individual may be moved into an existing workstation. Thus, while it is still desirable to provide a tap module 46 in this workstation, the person now assigned to this workstation may require connection to different circuits than the circuit used by the person previously located in this area. In this instance, an installer could move a tap unit 52 so that, for example, it is connected to circuit "3" of the red run of CDAs 43, or in another example, to a selected circuit of a different run of CDAs 43, such as a run that is color coded as green or any other suitable color.

The person previously assigned to this workstation area could then be moved to a new workstation area and a tap module 46 provided in this new workstation area which again is connected to circuit "1" of the red run of CDAs 43. Thus, an installer can readily track the individual circuits as they pass through the enclosed raceways 21 or 22.

With respect to the three separate runs of CDAs 43, the circuits in each of these runs can carry either voice or data signals. In one arrangement, for example, all of the circuits of a single run of CDAs 43 could be dedicated to voice while the circuits of a separate parallel run of CDAs 43 could be dedicated to data transmission. Still further, a single run of CDAs 43 could carry voice through some of the circuits defined thereby and data along the other of the circuits defined thereby.

In view of the foregoing, the communication cabling arrangement 12 of the invention can be readily installed in a workstation area. Further, the communication cabling arrangement 12 can be readily modified and reconfigured depending upon the changing requirements of an office area.

It will be appreciated that the communication cabling arrangement of this invention, as described above, while highly desired for use in conjunction with office furniture which defines workstations, is also highly desired for use in many other manners and modes, particularly in work areas which require high density and/or simplicity of access to communication circuits. For example, the cabling arrangement of this invention can be fed through existing walls, under false or raised floors, or above drop ceilings, and still provide simplified installation, access and rearrangement of the system.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A communication cabling arrangement comprising: elongate cabling which defines a plurality of communication circuits, said cabling having first and second cable sections and at least one housing means joining said first and second cable sections together and defining a plurality of access ports for permitting external access to said circuits, each of said first and second cable sections including a plurality of separate elongate cable units which each define at least one circuit, each said cable unit including at least one flexible multi-conductor cable which defines at least one of said circuits and a contact plug on at least one end of said cable, each said plug including contacts connected to said circuit, said housing means including first and second mounting sections which are each open on one side to permit access to a predetermined number of mounting sites, said plugs of said first and second cable sections being inserted into said mounting sites of said first and second mounting sections respectively, such that said contacts of each one of said plugs of said first cable section is connected serially to said contacts of said second cable section such that said circuits pass through said housing means, said serially connected contacts being accessible through said access ports, and a tap module which is insertable into a selected one of said access ports for connection to at least one of said circuits, said tap module including a respective outlet which is connected to said circuit.

2. A communication cabling arrangement according to claim 1, wherein said housing means comprise first and second separable housings which each define a plurality of parallel separated passages which extend therethrough to define said mounting sites, said plug being inserted into said passages at one end thereof and said contacts being serially connected together through opposite ends of said passages.

3. A communication cabling arrangement according to claim 1, wherein said plugs have respective exposed portions which project exteriorly of said housing means on opposite sides of said access ports, said tap module including a blade and a keying part projecting from one side thereof, said blade being insertable into one of said access ports for connection to said circuit associated therewith and said keying part being engagable with the exposed portion of at least one of said plugs.

4. A communication cabling arrangement according to claim 3, including a support block which connects to said plugs on one side of said access ports to prevent the connection of said keying part to said plugs on a first side of said access ports while permitting the connection of said keying part to said plugs on the other side of said access ports.

5. A communication cabling arrangement according to claim 1, wherein said contacts are supported on a front end of said plug, a back end portion of said plug being disposed exteriorly of the housing means when connected to a respective one of said mounting sites, said communication distribution assembly further including a removable support part which is removably connected to said back end portions of said plugs to rigidly tie said plugs together.

6. A communication cabling arrangement according to claim 5, wherein said support part and each said plug are rigidly joined together by cooperating rows of ribs and slots wherein said ribs are formed on one of said plugs and said support part and said slots are formed on the other of said plugs and said support part.

7. In a communication cabling arrangement which defines a plurality of communication circuits extending therethrough and permits access to said circuits from adjacent workstations, said communication cabling arrangement including a plurality of elongate communication distribution assemblies which serially couple together, each said communication distribution assembly including an elongate intermediate cabling having a connector unit at each end thereof, said cabling defining a plurality of said circuits extending longitudinally therethrough and terminating at respective contacts disposed in the connector units provided at the opposite ends thereof, a pair of serially adjacent connector units of a serially adjacent pair of said communication distribution assemblies being joined together, said pair of joined connector units defining a housing having a plurality of access ports, each said access port permitting access to one of said circuits associated with said housing, comprising the improvement wherein said housing includes at least a pair of keying spaces on opposite sides of said access ports and a removable insert being disposed in one of said keying spaces to block access to said keying space, said cabling arrangement further including a tap unit which includes a tap head having a blade and a keying projection projecting from one side of said tap head, said blade having tap contacts on one side thereof and being insertable into one of said access ports so that said tap contacts are connectable with said contacts of a first said communication distribution assembly when said tap unit is in a first position and connectable with said contacts of a second said communication distribution assembly when said tap unit is in a second position, said keying projection being insertable into one of said keying spaces, one of said keying spaces being blocked by said insert such that said tap unit is engagable with said opening in only one of said first and second positions.

8. A communication cabling arrangement according to claim 7, wherein opposite end surfaces of said tap head converge toward said one side thereof to define gripping surfaces for manual removal of said tap unit from said access port.

9. A communication cabling arrangement according to claim 8, wherein said gripping surfaces and said insert and said keying projection are disposed on opposite sides of a central axis of said tap head in symmetrical relation therewith for balancing of pulling forces.

10. A communication cabling arrangement according to claim 8, wherein each said connector unit includes a plurality of ribs in said keying space wherein each said rib corresponds to one of said access ports, said keying projection including engagement means for engaging a corresponding one of said ribs to removably secure said tap unit to said connector unit.

11. A communication cabling arrangement according to claim 10, wherein said engagement means comprises a pair of prongs adapted to snap onto said rib, a space being defined on an outer side of each said prong to provide space for flexing of said prong.

12. A communication cabling arrangement for routing a plurality of communication circuits, comprising:

a plurality of flexible elongate communication distribution assemblies which are connectable serially together and extend longitudinally to supply communication circuits throughout area, each of said communication distribution assemblies including a flexible length of cabling and a connector unit on at least one end of said cabling so as to define a plurality of communication circuits extending through said communication distribution assembly, said connector units including an engagement end for permitting a serially adjacent pair of said connector units from a serially adjacent pair of said communication distribution assemblies to be connected together and each of said engagement ends including a plurality of contacts projecting therefrom for connection to said contacts of the serially adjacent connector unit, each said engagement end including a slot and a tongue which engage the tongue and slot respectively of said serially adjacent connector unit to align said serially adjacent contacts while said serially adjacent contacts are separated.

13. The communication cabling arrangement according to claim 12, wherein said serially adjacent connector units interfit together to further align said contacts.

14. The communication cabling arrangement according to claim 12, wherein said serially adjacent connector units are moved longitudinally into engagement with each other, said tongues projecting longitudinally and said slots opening longitudinally such that each said slot receives said tongue longitudinally therein.

15. The communication cabling arrangement according to claim 12, which includes locking means for locking said serially adjacent connector units together.

16. The communication cabling arrangement according to claim 15, wherein said locking means comprise snap locking connector parts on said tongue and said slot aligned therewith, said tongue being resiliently deflectable for disengaging said snap locking connector parts.

17. In a modular communication cabling arrangement which defines a plurality of communication circuits, the cabling arrangement including a plurality of elongate communication distribution assemblies which serially couple together, each communication distribution assembly including elongate intermediate cabling having connector units at opposite ends thereof, said cabling defining said plurality of said circuits which extend along said serially coupled communication distribution assemblies, serially adjacent pairs of said connector units being joined together and defining access ports to permit access to said circuits, and a tap module insertable into a selected on of said access ports for connection to at least one of said circuits, said tap module including a respective outlet which is connected to said circuit, comprising the improvement wherein said communication distribution assembly includes a plurality of separate elongate cable units, each said cable unit including at least one flexible multi-conductor cable which defines at least one of said circuits and a contact plug at each opposite end of said cable, each said plug including contacts connected to said circuit, said cable units being disposed side by side in parallel, and a housing being provided at each opposite end of said cable units to join the contact plugs together, said housing including a mounting section which includes a predetermined number of predefined openings into which said contact plugs are removably plugged to define one said connector unit, said housing also including an engagement section which is engagable with a serially-adjacent one of said housings for serially joining adjacent communication distribution assemblies together, said contacts of said contact plugs of each said housing being accessible through said engagement section of said housing, said contacts of one said housing being connected to said contacts of a serially adjacent housing such that said circuits pass between said communication distribution assemblies through said housings.

18. A communication cabling arrangement according to claim 17, wherein said housing defines a plurality of parallel separated passages which extend therethrough, said plugs being inserted into said passages.

19. A communication cabling arrangement according to claim 17, wherein said contact plugs have respective exposed portions which project exteriorly of said joined housings, said tap module including a blade insertable into one of said access ports for connection to said circuit associated therewith and a keying part engagable with the exposed portion of at least one of said contact plugs.

20. A communication cabling arrangement according to claim 17, wherein said contacts of said contact plug are supported on a front end of said plug, a back end portion of said plug being disposed exteriorly of the housing when connected to said housing, said communication distribution assembly further including a support part which is removably connected to said back end portions of said plugs of said cable assemblies to rigidly tie said contact plugs together.

21. A communication cabling arrangement according to claim 20, wherein said support part and each said contact plug are rigidly joined together by cooperating rows of ribs and slots wherein said ribs are formed on one of said plugs and said support part and said slots are formed on the other of said plugs and said support part.

22. A communication cabling arrangement according to claim 17, wherein each said access port opens sidewardly of and is defined at the interface between the serially joined housings to permit access to the engaged contacts defining one of said circuits.

* * * * *

UNITED STATES PATENT AND TRADEMARK OFFICE
CERTIFICATE OF CORRECTION

PATENT NO : 6 089 892
DATED : July 18, 2000
INVENTOR(S) : Richard Herbert SNOW, et al.

It is certified that error appears in the above-identified patent and that said Letters Patent are hereby corrected as shown below:

On the face sheet, item 75; delete "David E. Emery, North Muskegon, Mich.".

Column 32, line 32; after "throughout" insert ---an---.

Signed and Sealed this

Twenty-second Day of May, 2001

*Attest:*

NICHOLAS P. GODICI

*Attesting Officer*  *Acting Director of the United States Patent and Trademark Office*